(12) United States Patent
Park et al.

(10) Patent No.: US 11,036,101 B2
(45) Date of Patent: Jun. 15, 2021

(54) DISPLAY DEVICE AND MANUFACTURING METHOD THEREOF

(71) Applicant: Samsung Display Co., Ltd., Yongin-Si (KR)

(72) Inventors: Seunghyun Park, Seoul (KR); Junho Song, Seongnam-si (KR)

(73) Assignee: Samsung Display Co., Ltd.

( * ) Notice: Subject to any disclaimer, the term of this patent is extended or adjusted under 35 U.S.C. 154(b) by 2 days.

(21) Appl. No.: 16/294,708

(22) Filed: Mar. 6, 2019

(65) Prior Publication Data

US 2020/0019029 A1    Jan. 16, 2020

(30) Foreign Application Priority Data

Jul. 10, 2018    (KR) .......................... 10-2018-0080084

(51) Int. Cl.
| | |
|---|---|
| *G02F 1/1362* | (2006.01) |
| *G09G 3/36* | (2006.01) |
| *G02F 1/1335* | (2006.01) |
| *G02F 1/1333* | (2006.01) |

(52) U.S. Cl.
CPC .. *G02F 1/136209* (2013.01); *G02F 1/133371* (2013.01); *G02F 1/133512* (2013.01); *G02F 1/133514* (2013.01); *G02F 1/133516* (2013.01); *G02F 1/136277* (2013.01); *G02F 1/136286* (2013.01); *G09G 3/3607* (2013.01); *G02F 1/136222* (2021.01); *G02F 2201/123* (2013.01);
(Continued)

(58) Field of Classification Search
CPC ... G02F 1/133371; G02F 2001/136222; G02F 1/136222; G02F 1/136209; G02F 1/133514; G02F 2201/123; G02F 2203/02; G02F 2201/52; G02F 1/133512; G02F 1/133516; G09G 3/3607; G09G 2300/0452
See application file for complete search history.

(56) References Cited

U.S. PATENT DOCUMENTS

| | | | | |
|---|---|---|---|---|
| 4,632,514 | A | * | 12/1986 | Ogawa .............. G02F 1/133371 349/107 |
| 7,764,347 | B2 | | 7/2010 | Park |
| 8,130,344 | B2 | | 3/2012 | Tsuchiya et al. |

(Continued)

FOREIGN PATENT DOCUMENTS

| | | |
|---|---|---|
| JP | 5200795 B2 | 3/2010 |
| KR | 10-0990500 B1 | 10/2010 |

(Continued)

OTHER PUBLICATIONS

Extended European Search Report, Application No. 19176013.1, dated Oct. 2, 2019 , 6 pages.

*Primary Examiner* — Jessica M Merlin
(74) *Attorney, Agent, or Firm* — Innovation Counsel LLP

(57) ABSTRACT

A display device includes: a substrate at which red, green, blue, and white display areas are defined; first, second, and third organic layers having transmittance for white light and disposed on the substrate at the green, blue, and white display areas, respectively; a red color filter on the substrate at the red display area; a green color filter on the first organic layer at the green display area; and blue color filter on the second organic layer at the blue display area. A thickness of the third organic layer is greater than each of thicknesses of the first and second organic layers.

36 Claims, 29 Drawing Sheets

(52) U.S. Cl.
CPC ...... *G02F 2201/52* (2013.01); *G02F 2203/02* (2013.01); *G09G 2300/0452* (2013.01)

(56) References Cited

U.S. PATENT DOCUMENTS

| | | |
|---|---|---|
| 9,103,982 B2 | 8/2015 | Su et al. |
| 2010/0238389 A1* | 9/2010 | Chan ................. G02F 1/133514 |
| | | 349/107 |
| 2017/0010503 A1* | 1/2017 | Song ................. G02F 1/133514 |
| 2017/0153510 A1* | 6/2017 | Choi ................. G02F 1/133512 |
| 2019/0064616 A1* | 2/2019 | Liu ................... G02F 1/133512 |
| 2019/0079329 A1* | 3/2019 | Li ..................... G02F 1/133553 |

FOREIGN PATENT DOCUMENTS

| | | |
|---|---|---|
| KR | 10-1064191 B1 | 9/2011 |
| KR | 10-1321172 B1 | 10/2013 |
| KR | 10-2015-0018144 A | 2/2015 |

\* cited by examiner

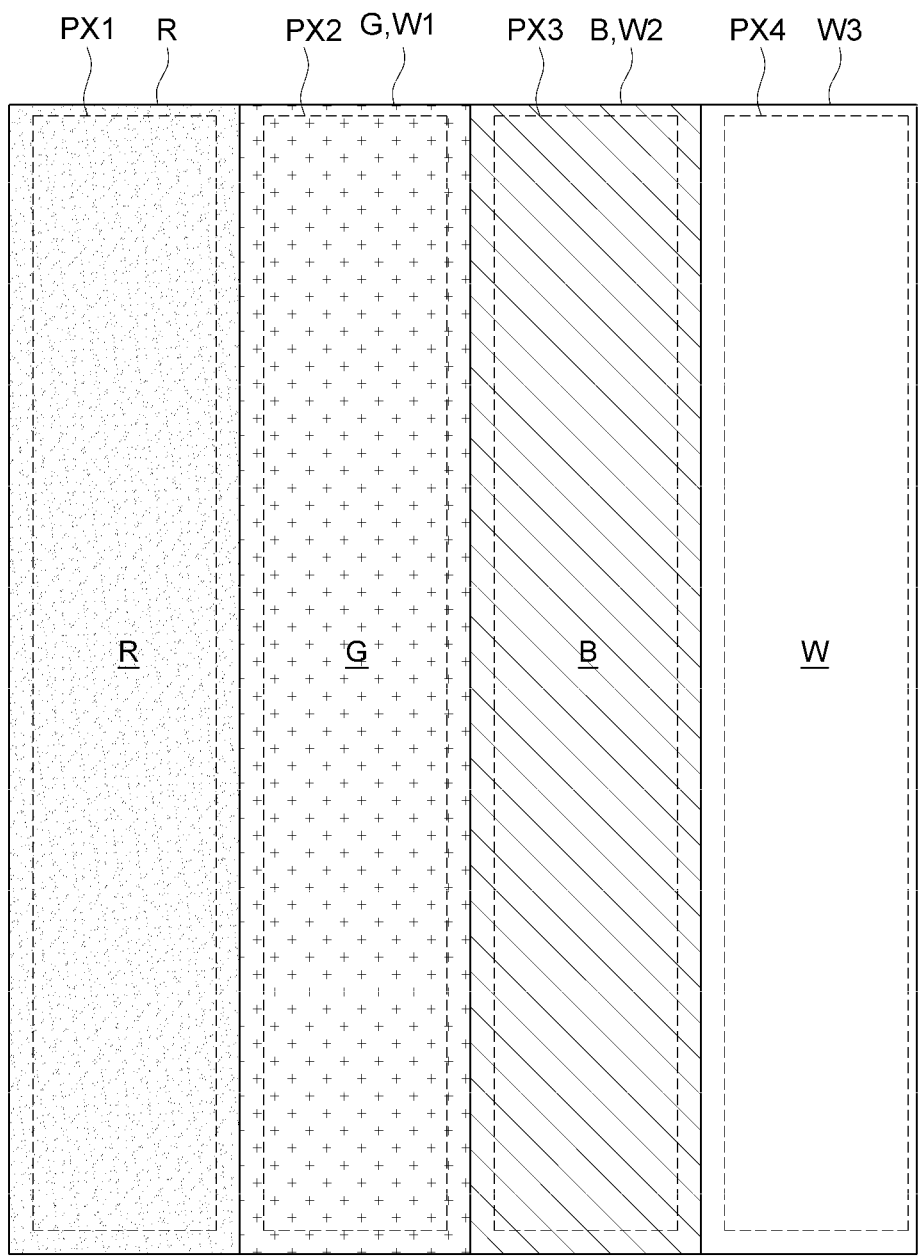

DISPLAY DEVICE AND MANUFACTURING METHOD THEREOF

CROSS-REFERENCE TO RELATED APPLICATION

This application claims priority under 35 U.S.C. § 119 to Korean Patent Application No. 10-2018-0080084, filed on Jul. 10, 2018, in the Korean Intellectual Property Office (KIPO), the disclosure of which is incorporated by reference herein in its entirety.

1. TECHNICAL FIELD

Embodiments of the present inventive concept relate to a display device, and more particularly, to a reflective LCD device having multi-cell gaps.

2. DISCUSSION OF RELATED ART

Display devices are classified into liquid crystal display ("LCD") devices, organic light emitting diode ("OLED") display devices, plasma display panel ("PDP") display devices and electrophoretic display devices based on a light emitting scheme thereof.

In general, an LCD panel includes a pixel electrode, a common electrode, and a liquid crystal layer. When a voltage is applied to the pixel electrode and the common electrode, the arrangement of liquid crystal molecules in the liquid crystal layer is changed, and the transmittance of light is adjusted accordingly, thereby displaying images.

The LCD device is a light-receiving type display device which cannot emit light by itself. Accordingly, a typical transmissive LCD device includes a backlight assembly that provides light to an LCD panel. However, there is an issue that the backlight assembly not only has a large power consumption but also increases the thickness and weight of the device. In particular, portable devices such as electronic books and electronic newspapers require small thickness, light weight, and low power consumption. Accordingly, the large power consumption or heavy weight of the backlight assembly may lower the competitiveness of the LCD device.

Dissimilar to the transmissive LCD device, a reflective LCD devices is a device that controls the light transmittance by reflecting natural light or external artificial light using a reflector, without a separate backlight assembly. Accordingly, the reflective LCD devices has lower power consumption and light weight, and is more suitable as a display device for electronic books.

It is to be understood that this background of the technology section is intended to provide useful background for understanding the technology and as such disclosed herein, the technology background section may include ideas, concepts or recognitions that were not portion of what was known or appreciated by those skilled in the pertinent art prior to a corresponding effective filing date of subject matter disclosed herein.

SUMMARY

Embodiments of the present inventive concept may be directed to a display device that may easily realize a desired color sense and to a method of manufacturing the display device.

According to an embodiment, a display device includes: a substrate at which red, green, blue, and white display areas are defined; first, second, and third organic layers having transmittance for white light and disposed on the substrate at the green, blue, and white display areas, respectively; a red color filter on the substrate at the red display area; a green color filter on the first organic layer at the green display area; and blue color filter on the second organic layer at the blue display area. A thickness of the third organic layer is greater than each of thicknesses of the first and second organic layers.

An upper surface of the third organic layer may be lower than an upper surface of the blue color filter.

An upper surface of the third organic layer may be higher than upper surfaces of the red, green, and blue color filters.

A height difference between the upper surface of the third organic layer and the upper surface of the red color filter may be in a range from about 0.64 µm to about 0.96 µm.

Upper surfaces of the green and blue color filters may be higher than an upper surface of the red color filter.

A height difference between the upper surface of the green color filter and the upper surface of the red color filter may be in a range from about 0.4 µm to about 0.6 µm.

The upper surface of the green color filter and the upper surface of the blue color filter may have a substantially equal height.

The upper surface of the blue color filter may be higher than the upper surface of the green color filter.

The first and second organic layers may have a substantially equal thickness, and the blue color filter may be thicker than the green color filter.

The second organic layer may be thicker than the first organic layer, and the blue color filter and the green color filter may have a substantially equal thickness.

A lower surface of the red color filter and lower surfaces of the first, second, and third organic layers may have a substantially equal height.

The red, green, and blue color filters may have a substantially equal thickness.

The red, green, and blue color filters and the third organic layer may be disposed in a first direction in a plan view, and any one of the red, green, and blue color filters and the third organic layer may contact two of the others of the red, green, and blue color filters and the third organic layer.

The first, second, and third organic layers may be formed in one piece.

Each of the second and third organic layers may include a plurality of organic layers.

The display device may further include a fourth organic layer between the substrate and the red color filter and between the substrate and the first, second, and third organic layers.

The display device may further include a reflective layer between the substrate and the red color filter and between the substrate and the first, second, and third organic layers.

The display device may further include an opposing substrate that opposes the substrate; and a liquid crystal layer between the substrate and the opposing substrate. A sum of thicknesses of the liquid crystal layer and the red color filter at the red display area, a sum of thicknesses of the liquid crystal layer, the green color filter, and the first organic layer at the green display area, a sum of thicknesses of the liquid crystal layer, the blue color filter, and the second organic layer at the blue display area, and a sum of thicknesses of the liquid crystal layer and the third organic layer at the white display area may be substantially equal to each other.

According to an embodiment, a reflective liquid crystal display device includes: a first substrate and a second substrate at which red, green, blue, and white display areas are defined and which oppose each other; and a liquid crystal layer between the first substrate and the second substrate. The first substrate includes: a reflective layer on the first substrate; first, second, and third organic layers having transmittance for white light and disposed on the reflective layer at the green, blue, and white display areas, respectively; a red color filter on the reflective layer at the red display area; a green color filter on the first organic layer at the green display area; and a blue color filter on the second organic layer at the blue display area. A thickness of the third organic layer is greater than each of thicknesses of the first and second organic layers.

The reflective liquid crystal display device may further include a planarization layer on the first substrate. The reflective layer may be disposed on the planarization layer.

The reflective liquid crystal display device may further include a pixel electrode disposed on each of the red, green, and blue color filters and the third organic layer.

A common voltage may be applied to at least a portion of the reflective layer.

At least a portion of the reflective layer may be connected to the pixel electrode.

An upper surface of the third organic layer may be higher than upper surfaces of the red, green, and blue color filters.

An upper surface of the green color filter and an upper surface of the blue color filter may have a substantially equal height.

An upper surface of the blue color filter may be higher than an upper surface of the green color filter.

The first and second organic layers may have a substantially equal thickness, and the blue color filter may be thicker than the green color filter.

The second organic layer may be thicker than the first organic layer, and the blue color filter and the green color filter may have a substantially equal thickness.

The red, green, and blue color filters may have a substantially equal thickness.

A sum of thicknesses of the liquid crystal layer and the red color filter at the red display area, a sum of thicknesses of the liquid crystal layer, the green color filter, and the first organic layer at the green display area, a sum of thicknesses of the liquid crystal layer, the blue color filter, and the second organic layer at the blue display area, and a sum of thicknesses of the liquid crystal layer and the third organic layer at the white display area may be substantially equal to each other.

The red, green, and blue color filters and the third organic layer may be disposed in a first direction in a plan view, and any one of the red, green, and blue color filters and the third organic layer may contact two of the others of the red, green, and blue color filters and the third organic layer.

According to an embodiment, a reflective liquid crystal display device includes: a first substrate and a second substrate at which red, green, blue, and white display areas are defined and which oppose each other; and a liquid crystal layer between the first substrate and the second substrate. The first substrate includes a reflective layer on the first substrate. The second substrate includes: first, second, and third organic layers disposed on the second substrate at the green, blue, and white display areas, respectively; a red color filter on the second substrate at the red display area; a green color filter on the first organic layer at the green display area; and a blue color filter on the second organic layer at the blue display area. A thickness of the third organic layer is greater than each of thicknesses of the first and second organic layers.

An upper surface of the third organic layer may be higher than upper surfaces of the red, green, and blue color filters.

An upper surface of the green color filter and an upper surface of the blue color filter may have a substantially equal height.

An upper surface of the blue color filter may be higher than an upper surface of the green color filter.

The first and second organic layers may have a substantially equal thickness, and the blue color filter may be thicker than the green color filter.

The second organic layer may be thicker than the first organic layer, and the blue color filter and the green color filter may have a substantially equal thickness.

A sum of thicknesses of the liquid crystal layer and the red color filter at the red display area, a sum of thicknesses of the liquid crystal layer, the green color filter, and the first organic layer at the green display area, a sum of thicknesses of the liquid crystal layer, the blue color filter, and the second organic layer at the blue display area, and a sum of thicknesses of the liquid crystal layer and the third organic layer at the white display area may be substantially equal to each other.

According to an embodiment, a method of manufacturing a display device includes: preparing a substrate at which red, green, blue, and white display areas are defined; forming first, second, and third organic layers on the substrate at the green, blue, and white display areas, respectively; forming a red color filter on the substrate at the red display area; forming a green color filter on the first organic layer at the green display area; and forming a blue color filter on the second organic layer at the blue display area.

The first, second, and third organic layers may be formed substantially simultaneously using a same mask having a transmissive area corresponding to the white display area and a semi-transmissive area corresponding to the green and blue display areas.

A transmittance of the semi-transmissive area corresponding to the green display area may be less than a transmittance of the semi-transmissive area corresponding to the blue display area.

Forming of the first, second, and third organic layers may include: forming a first organic layer on the substrate at the green, blue, and white display areas; forming a second organic layer on the first organic layer at the blue and white display areas; and forming a third organic layer on the second organic layer at the white display area.

Forming of the first, second, and third organic layers may include: forming a first organic layer on the substrate at the green, blue, and white display areas; and forming a second organic layer on the first organic layer at the white display area.

According to an embodiment, a display device includes: a substrate at which first, second, third, and fourth display areas are defined; first, second, and third organic layers on the substrate at the second, third, and fourth display areas, respectively; a first color filter on the substrate at the first display area; a second color filter on the first organic layer at the second display area; and a third color filter on the second organic layer at the third display area. The first, second, and third color filters have different chromatic colors. A thickness of the third organic layer is greater than each of thicknesses of the first and second organic layers.

According to an embodiment, a display device includes: a substrate including a first display area displaying a first color, a second display area displaying a second color and a third display area displaying a third color; an organic layer disposed to overlap the second display area and the third display area in a plan view, the organic layer including a first portion having a first thickness and overlapping the second display area in a plan view and a second portion having a second thickness thicker than the first thickness and overlapping the third display area in a plan view; and a plurality of color filters disposed to overlap respective display areas in a plan view.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present inventive concept will become more apparent by describing in detail embodiments thereof with reference to the accompanying drawings, wherein:

FIG. 2A is a plan view schematically illustrating a lower substrate (array substrate) of

FIG. 1;

FIG. 3 is a plan view schematically illustrating a color filter of FIG. 1;

FIG. 29 is a cross-sectional view illustrating a display device taken along line I-I' in

FIG. 23;

DETAILED DESCRIPTION

Figure 1:
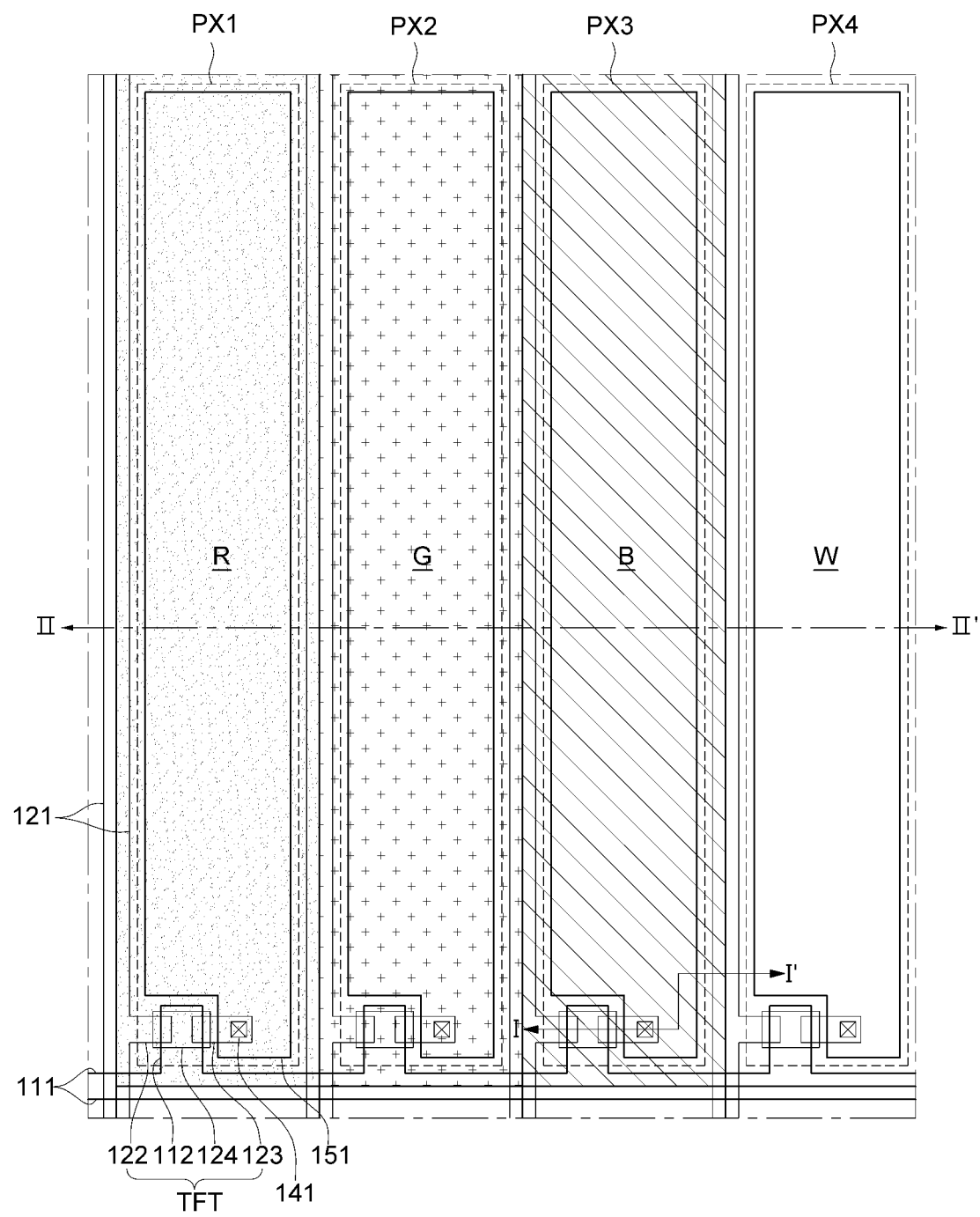
FIG. 1 is a plan view schematically illustrating a reflective LCD device according to an embodiment of the present inventive concept.

Embodiments will now be described more fully hereinafter with reference to the accompanying drawings. Although the inventive concept may be modified in various manners and have several embodiments, embodiments are illustrated in the accompanying drawings and will be mainly described in the specification. However, the scope of the inventive concept is not limited to the embodiments and should be construed as including all the changes, equivalents and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," or the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, ±20%, ±10%, ±5% of the stated value.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present inventive concept and like reference numerals refer to like elements throughout the specification.

Hereinafter, an embodiment of the present inventive concept will be described with reference to FIGS. 1 to 31. A display device according to an embodiment of the present inventive concept will be described with reference to a reflective LCD device by way of example. However, the application scope of the present inventive concept is not limited to the reflective LCD device. For example, the present inventive concept may be applied to a transflective or transmissive LCD device that includes a backlight unit.

Hereinafter, a reflective LCD device having a structure in which color filters R, G, B, W1, W2, and W3 are disposed on an upper substrate (color filter substrate) 200 will be described in detail below.

Figure 2A:
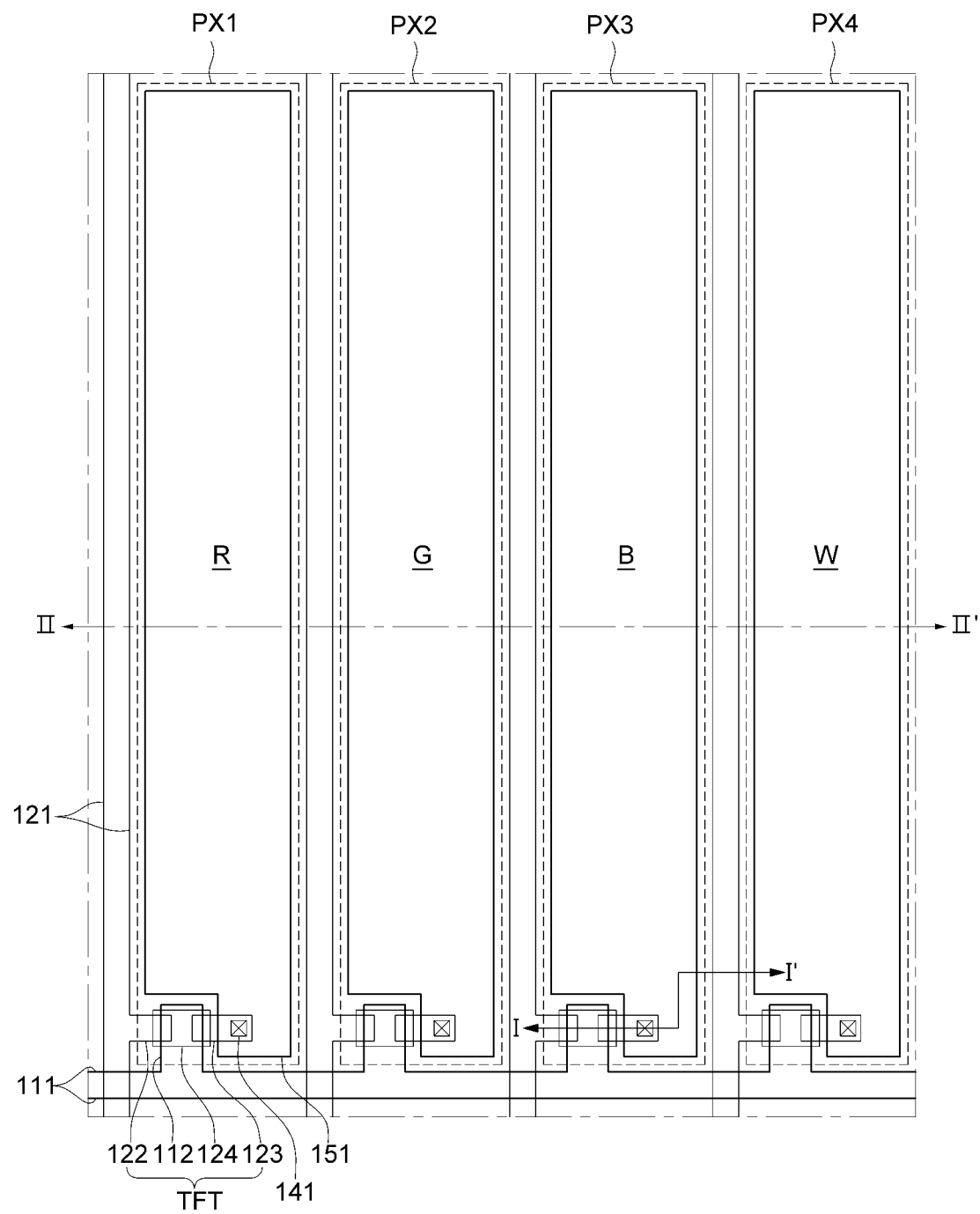
Figure 2B:
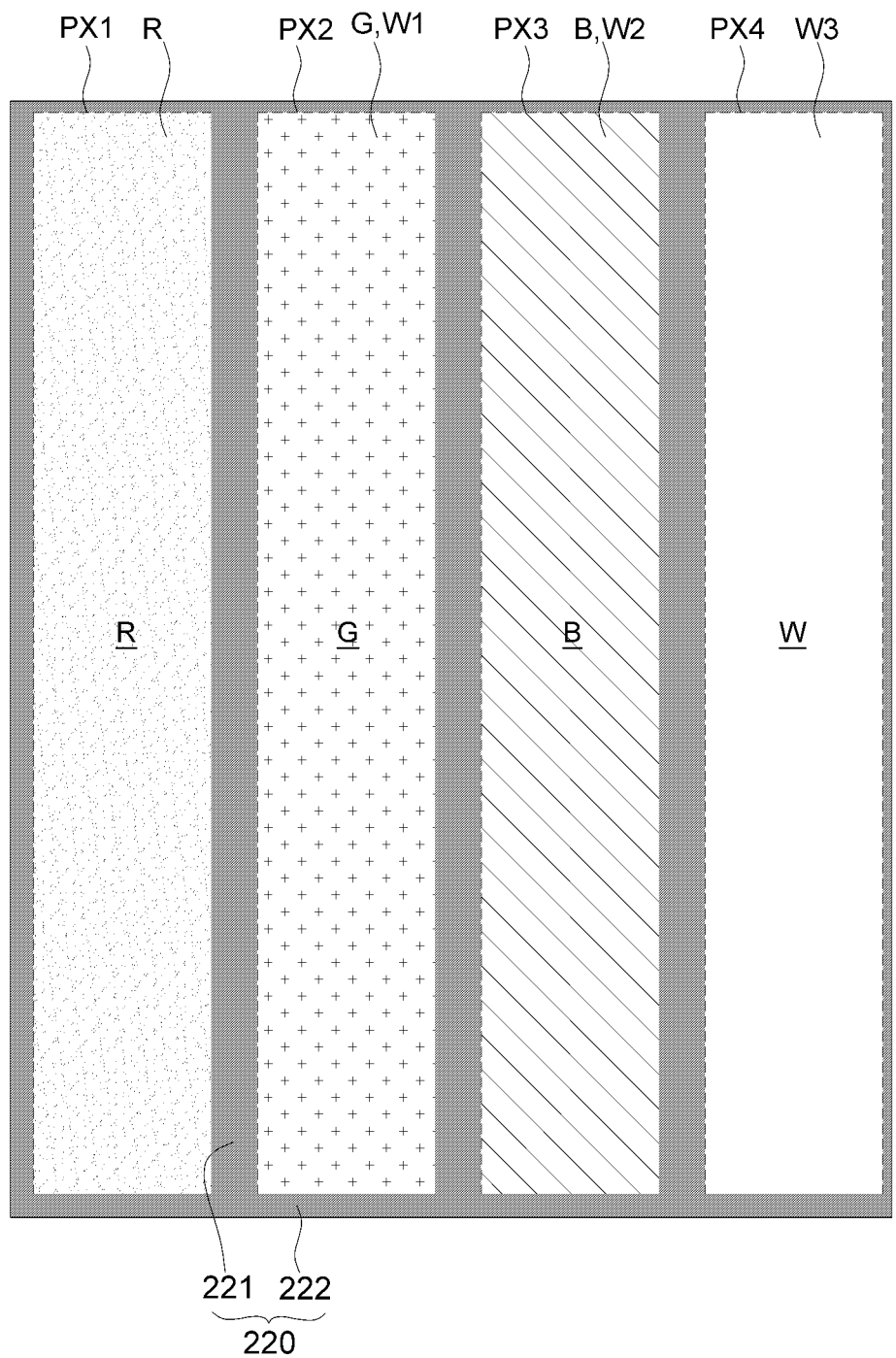
FIG. 2B is a plan view schematically illustrating an upper substrate (color filter substrate) of FIG. 1.
Figure 4:
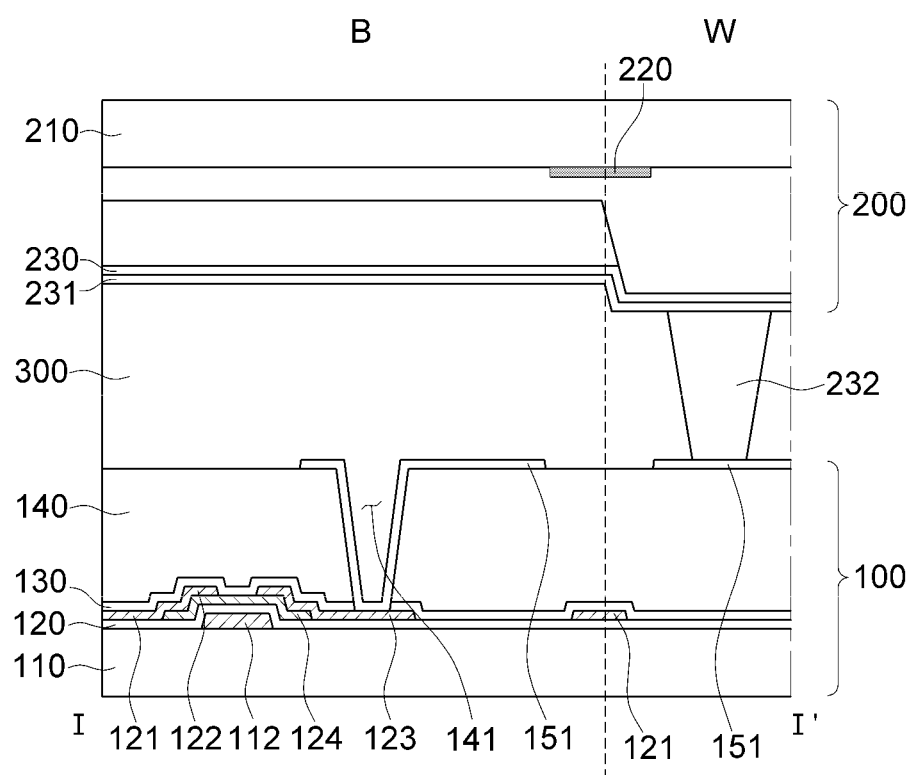
FIG. 4 is a cross-sectional view illustrating a display device taken along line I-I' in FIG. 1.
Figure 5:
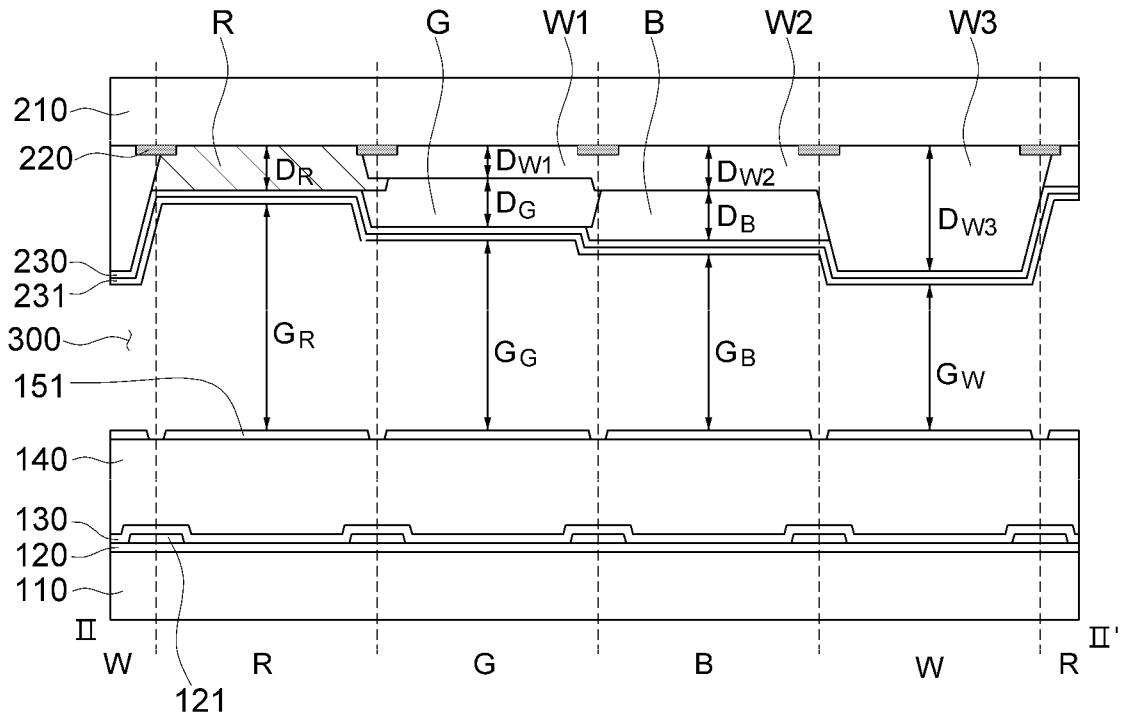
FIG. 5 is a cross-sectional view illustrating a display device taken along line II-IF in FIG. 1.

FIG. 1 is a plan view schematically illustrating a reflective LCD device according to an embodiment of the present inventive concept, FIG. 2A is a plan view schematically illustrating a lower substrate (array substrate) of FIG. 1, FIG. 2B is a plan view schematically illustrating an upper substrate (color filter substrate) of FIG. 1, FIG. 3 is a plan view schematically illustrating a color filter of FIG. 1, FIG. 4 is a cross-sectional view illustrating a display device taken along line I-I' in FIG. 1, and FIG. 5 is a cross-sectional view illustrating a display device taken along line II-IF in FIG. 1.

Referring to FIGS. 1 to 5, a reflective LCD device according to an embodiment of the present inventive concept includes a lower substrate or array substrate 100, an upper substrate or color filter substrate 200 opposing the lower substrate 100, and a liquid crystal layer 300 interposed between the upper substrate 200 and the lower substrate 100.

A display device according to an embodiment of the present inventive concept includes a plurality of unit pixels, each unit pixel including a display area for emitting light. In such an embodiment, first, second, third, and fourth pixels PX1, PX2, PX3, and PX4 may be defined as an R display area PX1 outputting a red light R, a G display area PX2 outputting a green light G, a B display area PX3 outputting a blue light B, and a W display area PX4 outputting a white light W, respectively.

A first substrate 110, a plurality of gate wires 111 and 112, a plurality of data wires 121, 122, and 123, a thin film transistor, a passivation layer 130, a planarization layer 140, a pixel electrode (reflective layer) 151, or the like may be disposed at the lower substrate 100.

The first substrate 110 may include an insulating material such as transparent glass, quartz, ceramic, silicon, and transparent plastic, which may be appropriately selected according to needs of those skilled in the art.

The gate wires 111 and 112 may include a plurality of gate lines 111 and a plurality of gate electrodes 112. The data wires 121, 122, and 123 may include a plurality of data lines 121, a plurality of source electrodes 122, and a plurality of drain electrodes 123.

The gate wires 111 and 112 and the data wires 121, 122, and 123 may include, for example, an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), titanium (Ti), and tantalum (Ta). In addition, the gate wires 111 and 112 and the data wires 121, 122, and 123 may have a multi-layer structure including two conductive layers (not illustrated) having different physical properties from each other. For example, one of the two conductive layers may include, for example, an aluminum-based metal, a silver-based metal, and a copper-based metal, and the other of the two conductive layers may include, for example, a molybdenum-based metal, chromium, titanium, and tantalum. Examples of such a combination may include a chromium lower layer and an aluminum upper layer, and an aluminum lower layer and a molybdenum upper layer. However, embodiments are not limited thereto, and the gate wires 111 and 112 and the data wires 121, 122, and 123 may include various metals and conductors.

Each gate line 111 may extend along a boundary of the pixel in a first direction, e.g., a horizontal direction, and each data line 121 may extend along a boundary of the pixel in a second direction, e.g., a vertical direction. The plurality of gate lines 111 and the plurality of data lines 121 may be arranged crossing each other to define a unit pixel area. The pixels PX1, PX2, PX3, and PX4 may be defined by areas surrounded by the gate lines 111 and the data lines 121. The pixels PX1, PX2, PX3, and PX4 that are defined by the gate lines 111 and the data lines 121 may have a constant/uniform size. However, it should be understood that the above description is merely given by way of example, and embodiments are not limited thereto.

At least one gate electrode 112 is connected to each gate line 111 for each pixel. The gate electrode 112 may branch from the gate line 111 toward a semiconductor layer 124, or the gate line 111 may extend to form the gate line 111. However, embodiments are not limited thereto, and the gate electrode 112 may be defined at an area on an extension path of the gate line 111 that overlaps the semiconductor layer 124.

At least one source electrode 122 is connected to each data line 121 for each pixel. The source electrode 122 may branch from the data line 121 toward the semiconductor layer 124, or the data line 121 may extend to form the source electrode 122. However, embodiments are not limited thereto, and the source electrode 122 may be defined at an area on an extension path of the data line 121 that overlaps the semiconductor layer 124. The drain electrode 123 may be spaced apart from the source electrode 122 with respect to the semiconductor layer 124. Further, the drain electrode 123 may be electrically connected to the pixel electrode 151 through a contact hole 141 defined through the passivation layer 130 and the planarization layer 140.

A gate insulating layer 120 may be disposed between the gate wires 111 and 112 and the data wires 121, 122, and 123. In an embodiment, the gate insulating layer 120 may be disposed on the gate wires 111 and 112, and the data wires 121, 122, and 123 may be disposed on the gate insulating layer 120. The gate insulating layer 120 may include, for example, silicon nitride ($SiN_x$), silicon oxide ($SiO_2$), silicon oxynitride (SiON), or laminated layers thereof. The gate insulating layer 120 may serve to maintain insulation between the gate wires 111 and 112 and conductive thin films such as the data line 121 located above the gate wires 111 and 112.

The semiconductor layer 124 may be disposed on the gate insulating layer 120 and may include, for example, hydrogenated amorphous silicon or polycrystalline silicon. The semiconductor layer 124 is disposed so that it overlaps at least a portion of the gate electrode 112. The semiconductor layer 124 constitutes a thin film transistor TFT together with the gate electrode 112, the source electrode 122, and the drain electrode 123. It is exemplified in an embodiment illustrated in FIG. 1 that the thin film transistors TFT at arranged at a predetermined position in each pixel, but embodiments are not limited thereto. The thin film transistors TFT may be disposed in a zigzag manner along a pixel column.

The semiconductor layer 124 may have various shapes such as an island shape or a linear shape. FIG. 4 exemplifies a case where the semiconductor layer 124 is formed in an island shape, but embodiments are not limited thereto. When the semiconductor layer 124 is formed into a linear shape, although not illustrated, the semiconductor layer 124 may overlap the data wires 121, 122, and 123.

An ohmic contact layer (not illustrated) including n+ hydrogenated amorphous silicon doped with an n-type impurity at a high concentration may be disposed on the semiconductor layer 124. The ohmic contact layer is positioned between the semiconductor layer 124 therebelow and the source and drain electrodes 122 and 123 thereabove to reduce contact resistance. The ohmic contact layer may have various shapes, such as an island shape and a linear shape, similar to the semiconductor layer 124. If the semiconductor layer 124 has an island shape, the ohmic contact layer may have an island-shape, and if the semiconductor layer 124 has a linear shape, the ohmic contact layer may also have a linear shape. Dissimilar to the semiconductor layer 124, the ohmic contact layer is disconnected at a space between the source electrode 122 and the drain electrode 123 where they are spaced apart from and face each other, and thus the semiconductor layer 124 therebetween may be exposed. A channel may be formed in the semiconductor layer 124 at an area where the source electrode 122 and the drain electrode 123 are spaced apart from and face each other.

When the gate electrode 111 receives a gate-on signal and a channel is formed in the semiconductor layer 124, the thin film transistor TFT is turned on, and the drain electrode 123 may receive a data signal from the source electrode 122 and transmit the data signal to the pixel electrode 151.

The passivation layer 130 is disposed on the data wires 121, 122, and 123 and an exposed portion of the semiconductor layer 124. The contact hole 141 that exposes at least a portion of the drain electrode 123 may be defined through the passivation layer 130 and the planarization layer 140, to be described below. At least a portion of the drain electrode 123 that is exposed through the contact hole 141 may contact the pixel electrode 151. Through the connection, the drain electrode 123 and the pixel electrode 151 may be electrically connected to each other. However, the above description is merely given by way of example, and the passivation layer 130 may be omitted.

In some embodiments, the contact hole 141 may be defined to expose only a portion of the drain electrode 123 as illustrated in FIGS. 1 to 4. However, the above description is merely given by way of example, and the contact hole 141 may be defined in a shape to expose a portion of the drain electrode 136 and a portion of the gate insulating layer 120.

The passivation layer 130 may include, for example, an inorganic material, such as silicon nitride and silicon oxide, and a material formed by plasma enhanced chemical vapor deposition (PECVD), such as a-Si:C:O and a-Si:O:F.

The planarization layer 140 may be disposed on the passivation layer 130. The planarization layer 140 may include a material having excellent planarizing characteristics and photosensitivity. The planarization layer 140 has the contact hole 141 that exposes at least a portion of the drain electrode 123.

The pixel electrode 151 may be disposed on the planarization layer 140. The pixel electrodes 151 may be provided for each unit pixel. The pixel electrode 151 may be formed in a uniform/constant size as illustrated in FIG. 1.

More specifically, the pixel electrode 151 may be formed in a uniform/uniform size irrespective of sizes of the color filters R, G, B, and W3. In other words, when viewed in a plan view, areas of the pixel electrodes 151 provided for each unit pixel may be uniform. However, it should be understood that the above description is merely given by way of example, and embodiments are not limited thereto. For example, the pixel electrodes 151 may have different areas corresponding to different areas of the color filters R, G, B, and W3 (see FIGS. 18, 23, and 27).

A portion of the pixel electrode 151 is also disposed in the contact hole 141. The portion of the pixel electrode 151 disposed in the contact hole 141 may contact the drain electrode 123 and be electrically connected thereto. Although not illustrated, when a portion of the drain electrode 123 and a portion of the gate insulating layer 120 are exposed by the contact hole 141, the pixel electrode 151 may include a portion that directly contacts the gate insulating layer 120.

When a data voltage is applied to the pixel electrode 151, the pixel electrode 151 may form an electric field together with the common electrode 231, thus capable of controlling an alignment direction of liquid crystal molecules included in the liquid crystal layer 300.

The pixel electrode 151 may serve as the reflective layer 151. That is, the pixel electrode 151 may serve as a reflective layer or a reflective electrode to reflect light that is incident from the outside. To this end, the pixel electrode 151 may include a highly reflective metal layer including, for example, silver (Ag) or aluminum (Al), but embodiments are not limited thereto. The pixel electrode 151 may be formed by laminating two or more metal layers or reflective layers.

Although not illustrated in FIGS. 1 to 5, the reflective layer (see FIGS. 17 to 31) may be further provided below the pixel electrode 151, and the pixel electrode 151 may include a transparent conductive material such as ITO or IZO.

A second substrate 210, a light blocking member 220, color filters R, G, B, and W3, a capping layer 230, a common electrode 231 and a column spacer 232 may be disposed at the upper substrate 200.

The light blocking member 220 serves to substantially prevent light leakage. The light blocking member 220 may be disposed at an area corresponding to each boundary of a red color filter R, a green color filter G, a blue color filter B, and a white color filter W3. Referring to FIG. 2B, the light blocking member 220 may be disposed in a lattice shape including a vertical light blocking member 221 and a horizontal light blocking member 222 that crosses the vertical light blocking member 221, at an area corresponding to the boundary.

Each of the unit pixel areas PX1, PX2, PX3, and PX4 or each of the R, G, B, and W display areas PX1, PX2, PX3, and PX4 may be defined by openings of the light blocking member 220 in a lattice shape. However, the above descriptions are merely given by way of example, and the disposition of the light blocking member 220 in the present embodiment is not limited thereto. For example, the light blocking member 220 may be provided in a linear type only between columns or rows of the color filters R, G, B, and W3. Each of the unit pixel areas PX1, PX2, PX3, and PX4 or each of the R, G, B, and W display areas PX1, PX2, PX3, and PX4 may be defined by the color filters R, G, B, and W3 and/or the pixel electrode 151.

The light blocking member 220 may be formed on the common electrode 231, to be described below, or may be disposed on the first substrate 110. The light blocking member 220 may include a black organic polymer material including a black dye or pigment, or a metal (metal oxide) such as chromium and chromium oxide.

Although not illustrated, an overcoat layer (see W4 in FIG. 10 and an overcoat layer 240 in an embodiment described with reference to FIGS. 18 to 31) may be disposed on the second substrate 210 and the light blocking member 220. The overcoat layer may serve to planarize an upper portion of the light blocking member 220.

The color filters R, G, B, W1, W2, and W3 are disposed on the second substrate 210 and the light blocking member 220, or on the overcoat layer (not illustrated). The color filters include chromatic color filters, e.g., a red color filter R, a green color filter G, and a blue color filter B. In addition, the color filters may include a white color filter W which includes W1, W2, and W3. The white color filters W1, W2, and W3 may include a first organic layer W1, a second organic layer W2, and a third organic layer W3 respectively disposed on the G display area PX1, the B display area PX2 and the W display area PX4.

Referring to FIGS. 1 to 5, in a planar structure, the red color filter G is disposed at the R display area PX1, the green color filter G and the first organic layer W1 are disposed at the G display area PX2, the blue color filter G and the second organic layer W2 are disposed at the B display area PX3, and the third organic layer W3 is disposed at the W display area PX4.

The color filters R, G, B, W1, W2, and W3 may contact color filters R, G, B, W1, W2, and W3 of other adjacent display areas PX1, PX2, PX3, and PX4. In addition, referring to FIG. 2B and FIG. 3, boundaries of the color filters R, G, B, W1, W2, and W3 overlap the light blocking member 220. Referring to FIG. 1, the boundaries of the color filters R, G, B, W1, W2, and W3 may overlap the gate line 111 and the data line 121. However, embodiments are not limited thereto, and the boundaries of the color filters R, G, B, W1, W2, and W3 may not overlap the gate line 111 and the data line 121.

In addition, the color filters R, G, B, W1, W2, and W3 may overlap other adjacent color filters R, G, B, W1, W2, and W3 in a same row or in a same column. For example, the green color filter G may overlap the red color filter R and the blue color filter B that are adjacent to the green color filter G in a same row by a predetermined width, e.g., about 4 µm.

Referring to FIG. 5, in a vertical structure, the red color filter R, the first organic layer W1, the second organic layer W2, and the third organic layer W3 are disposed on the second substrate and the light blocking member 220. The green color filter G is disposed on the first organic layer W1, and the blue color filter B is disposed on the second organic layer W2.

Each of the color filters R, G, B, W1, W2, and W3 may be disposed at one or more pixels. Each of the color filters R, G, B, W1, W2, and W3 may include a photosensitive organic material that includes a pigment of a corresponding color. The first, second, and third organic layers W1, W2, and W3 may include an achromatic transparent photosensitive organic material. However, embodiments are not limited thereto, and the first, second, and third organic layers W1, W2, and W3 may include a small amount of a chromatic pigment or a white pigment. In addition, the first, second, and third organic layers W1, W2, and W3 may include any organic material that transmits white light.

The first, second, and third organic layers may include a substantially same organic material. In addition, the first, second, and third organic layers may be formed of a same material, formed in one piece and formed at the same time (see FIGS. 15A to 15D).

In addition, each organic layer may include a plurality of organic layers (see FIGS. 14A to 14G). For example, the first, second, and third organic layers may include a first organic layer that is formed in one piece, formed at the same time and has a uniform thickness, and the second and third organic layers may include a second organic layer that is formed in one piece, formed on the first organic layer, formed at the same time and has a uniform thickness. In addition, the third organic layer may include a third organic layer that is formed in one piece, formed on the second organic layer, formed at the same time and has a uniform thickness. In an embodiment, the second or third organic layer may be omitted.

At least part of the color filters R, G, B, W1, W2, and W3 may be disposed to overlap the pixel electrode 151. Light incident from the outside is reflected by the pixel electrode (or reflective layer) 151. As the aforementioned light is transmitted through the color filters R, G, B, W1, W2, and W3 and reflected, colors corresponding to the red, green, blue, and white color filters R, G, B, W1, W2, and W3 may be displayed.

The more detailed structure of the color filters R, G, B, W1, W2, and W3 will be described in detail below.

The capping layer 230 may be disposed on the color filters R, G, B, and W3. The capping layer 230 substantially prevents the color filters R, G, B, and W3 from being exposed. The capping layer 230 may include a material substantially the same as a material included in the gate insulating layer 140. For example, the capping layer 230 may include silicon nitride ($SiN_x$), silicon oxide ($SiO_2$), silicon oxynitride (SiON), or a laminated film thereof. The capping layer 230 substantially prevents components of the color filters R, G, B, and W3 from infiltrating into the liquid crystal layer 300, thereby substantially preventing image sticking. The capping layer 230 may have a substantially same thickness throughout the entire display areas PX1, PX2, PX3, and PX4.

The common electrode 231 may be disposed on the capping layer 230. The common electrode 231 may be formed unitarily throughout the entire display area in which a plurality of pixels are disposed. The common electrode 231 may include a polycrystalline, monocrystalline, or amorphous transparent conductive material such as indium tin oxide (ITO) and indium zinc oxide (IZO). The common electrode 231 receives a common voltage and generates an electric field together with the pixel electrode 151 to adjust the alignment direction of the liquid crystal molecules included in the liquid crystal layer 300.

The common electrode 231 may be implemented into a structure electrically connected to the reflective layer 160 disposed at the lower substrate 100 separately from the pixel electrode 151. A method of electrically connecting the common electrode 231 to the reflective layer 160 may employ various known methods, and the detailed description thereof will be omitted.

The column spacer 232 serves to maintain a cell gap and may be formed on the common electrode 231. It is illustrated in FIG. 4 that the column spacer 232 is disposed at the W display area, but the column spacer 232 may be disposed at other display areas. However, since cell gaps $G_r$, Gg, Gb, and GW may be different from each other depending on the display area, the column spacer 232 may be disposed only in the same area.

However, the above description is merely given by way of example, and the disposition of the column spacer 232 is not limited thereto. For example, the column spacer 232 may be disposed on the light blocking member 220, and when the light blocking member 220 is provided in a lattice shape, the column spacer 232 may be disposed at portions corresponding to intersections of the aforementioned lattice pattern. In addition, the column spacer 232 may not be disposed at all of the aforementioned intersections, but may be disposed only at part of the intersections.

In another embodiment, the column spacer 232 may include a material substantially the same as a material included in the light blocking member 220. Further, the column spacer 232 may be formed integrally with the light blocking member 220 into a unitary structure. For example, through exposure using a halftone mask or a slit mask, the column spacer 232 and the light blocking member 220 may be formed through a substantially same patterning process using a substantially same material. An end portion of the column spacer 232 may be in contact with the lower substrate 100.

An alignment layer (not illustrated) may be disposed both on one surface of the lower substrate 100 facing the liquid crystal layer 300 and on one surface of the upper substrate 200. That is, an alignment layer (not illustrated) that may align the liquid crystal layer 300 may be disposed on the pixel electrode 151, the planarization layer 140, the common electrode 231, and the column spacer 232.

The liquid crystal layer 300 that includes liquid crystal molecules (not illustrated) having positive dielectric anisotropy or negative dielectric anisotropy may be interposed between the lower substrate 100 and the upper substrate 200.

Hereinafter, the structure of the color filters R, G, B, W1, W2, and W3 of the LCD device according to an embodiment of the present inventive concept will be described in detail mainly with reference to FIG. 5.

As described above, in a planar structure, the red color filter G is disposed at the R display area PX1, the green color filter G and the first organic layer W1 are disposed at the G display area PX2, the blue color filter G and the second organic layer W2 are disposed at the B display area PX3, and the third organic layer W3 is disposed at the W display area PX4. In a vertical structure, the red color filter G, the first organic layer W1, the second organic layer W2, and the third organic layer W3 are disposed on the second substrate and the light blocking member 220. The green color filter G is disposed on the first organic layer W1, and the blue color filter B is disposed on the second organic layer W2.

Hereinbelow, the up/down and height of any element are defined with reference to a substrate at which the element is placed. For example, a lower surface of any element disposed at the second substrate 210 refers to a surface of the element that faces the second substrate 210, and an upper surface of the element refers to a surface opposite to the lower surface. In addition, a height of the lower surface or the upper surface of any element disposed at the second substrate 210 refers to a distance between the second substrate 210 and the lower surface or the upper surface. Similarly, a lower surface of any element disposed at the first substrate 110 refers to a surface of the element that faces the first substrate 110, and an upper surface of the element refers to a surface opposite to the lower surface. In addition, a height of the lower surface or the upper surface of any element disposed at the first substrate 110 refers to a distance between the first substrate 110 and the lower surface or the upper surface.

The color filters R, G, B, W1, W2, and W3 each have substantially planar upper and lower surfaces and have uniform thicknesses $D_R$, $D_G$, $D_B$, $D_{W1}$, $D_{W2}$, and $D_{W3}$, respectively, at each of the display areas PX1, PX2, PX3, and PX4. A lower surface of each of the color filters R, G, B, W1, W2, and W3 is defined as a surface facing the substrate at which the color filters R, G, B, W1, W2, and W3 are disposed, and an upper surface of each of the color filters R, G, B, W1, W2, and W3 is defined as a surface facing toward a direction opposite to the lower surface. For example, referring to FIG. 5, a surface of each of the color filters R, G, B, W1, W2, and W3 that faces the second substrate 210 is the lower surface thereof, and a surface of each of the color filters R, G, B, W1, W2, and W3 that faces the liquid crystal layer 300 is the upper surface thereof. In addition, for example, referring to FIG. 21, a surface of each of the color filters R, G, B, W1, W2, and W3 that faces the first substrate 110 is the lower surface thereof, and a surface of each of the color filters R, G, B, W1, W2, and W3 that faces the liquid crystal layer 300 is the upper surface thereof.

However, between each of the color filters R, G, B, W1, W2, and W3 or at a boundary therebetween, e.g., at a portion overlapping the light blocking member 220, each of the color filters R, G, B, W1, W2, and W3 may have portions of the upper surface or the lower surface that overlap each other and are not planar.

In addition, the upper surface or the lower surface of each of the color filters R, G, B, W1, W2, and W3 at each of the display areas PX1, PX2, PX3, and PX4 may not be substantially planar. Accordingly, the respective thicknesses $D_R$, $D_G$, $D_B$, $D_{W1}$, $D_{W2}$, $D_{W3}$, and $D_{W3}$ of the color filters R, G, B, W1, W2, and W3 may be non-uniform depending on the position in each of the display areas PX1, PX2, PX3, and PX4. For example, the respective thicknesses $D_R$, $D_G$, $D_B$, $D_{W1}$, $D_{W2}$, $D_{W3}$, and $D_{W3}$ of the color filters R, G, B, W1, W2, and W3 may increase or decrease, as further away from a center portion of each of the display areas PX1, PX2, PX3, and PX4 in a plan view. For example, the thickness of each of the color filters R, G, B, W1, W2, and W3 may be defined as an average thickness of the entire portion overlapping each corresponding one of the display areas PX1, PX2, PX3, and PX4 in a plan view.

The thickness of each of the color filters R, G, B, W1, W2, and W3 may be defined as an average thickness of a portion of corresponding one of the color filters R, G, B, W1, W2, and W3 that overlaps the display areas PX1, PX2, PX3, and PX4 in a plan view.

In addition, the thickness of each of the color filters R, G, B, W1, W2, and W3 may be defined as a thickness of a portion of each corresponding one of the color filters R, G, B, W1, W2, and W3 that overlaps the central portion of corresponding one of the display areas PX1, PX2, PX3, and PX4, e.g. a portion more adjacent to the central portions of the display areas PX1, PX2, PX3, and PX4 rather than edge portions (e.g., the light blocking member) of the display areas PX1, PX2, PX3, and PX4.

A height of the upper surface or the lower surface of each of the color filters R, G, B, W1, W2, and W3 may be defined as a distance from the substrate (the first substrate 110 or the second substrate 210) at which the color filters R, G, B, W1, W2, and W3 are disposed. Similar to the thickness of each of the color filters R, G, B, W1, W2, and W3, the height of the upper surface or the lower surface of each of the color filters R, G, B, W1, W2, and W3 may be defined as an average height of an entire portion of each corresponding one of the color filters R, G, B, W1, W2, and W3 that overlaps corresponding one of the display areas PX1, PX2, PX3, and PX4, an average height of part of the entire portion, or a height of a portion of each corresponding one of the color filters R, G, B, W1, W2, and W3 that overlaps the central portion of each corresponding one of the display areas PX1, PX2, PX3, and PX4.

Hereinafter, the thickness and height of each of the color filters R, G, B, W1, W2, and W3 to be described below may be in accordance with any one of the above definitions.

At the G display area PX2, the lower surface of the first organic layer W1 contacts the second substrate 210, and the upper surface thereof is substantially planar. Further, at the G display area PX2, a distance between the upper surface and the lower surface of the first organic layer W1, i.e., a thickness of the first organic layer W1, is $D_{W1}$. At the B display area PX3, the lower surface of the second organic layer W2 contacts the second substrate 210, and the upper surface thereof is substantially planar. Further, at the B display area PX3, a distance between the upper surface and the lower surface of the second organic layer W2, i.e., a thickness of the second organic layer W2, is $D_{W2}$. At the W display area PX4, the lower surface of the third organic layer W3 contacts the second substrate 210, and the upper surface thereof is substantially planar. Further, at the W display area PX4, a distance between the upper surface and the lower surface of the third organic layer W3, i.e., a thickness of the third organic layer W3, is $D_{W3}$.

At the R display area PX1, the lower surface of the red color filter R contacts the second substrate 210, and the upper surface thereof is substantially planar. Further, at the R display area PX1, a distance between the upper surface and the lower surface of the red color filter R, i.e., a thickness of the red color filter R, is $D_R$.

At the G display area PX2, the lower surface of the green color filter G contacts the upper surface of the first organic layer W1, and the upper surface thereof is substantially planar. Further, at the G display area PX2, a distance between the upper surface and the lower surface of the green color filter R, i.e., a thickness of the green color filter G, is $D_G$. At the B display area PX3, the lower surface of the blue color filter B contacts the upper surface of the second organic layer W2, and the upper surface thereof is substantially planar. Further, at the B display area PX3, a distance between the upper surface and the lower surface of the blue color filter R, i.e., a thickness of the blue color filter B, is $D_B$.

At each of the display areas PX1, PX2, PX3, and PX4, the lower surfaces of the red color filter R and the first, second, and third organic layers W1, W2, and W3 all contact the second substrate 210, but embodiments are not limited thereto. In an embodiment, at each of the display areas PX1, PX2, PX3, and PX4, the lower surfaces of the red color filter R and the first, second, and third organic layers W1, W2, and W3 may be spaced apart from the second substrate 210 by a substantially equal distance A. That is, at each of the display areas PX1, PX2, PX3, and PX4, the lower surfaces of the red color filter R and the first, second, and third organic layers W1, W2, and W3 all have a substantially equal height A from the second substrate 210. For example, a fourth organic layer W4 (see FIG. 10) or any layers that have a thickness A may be disposed between the second substrate 210 and the first, second, and third organic layers W1, W2, and W3 and between the second substrate 210 and the red color filter R.

Accordingly, the heights of the lower surfaces of the green and blue color filters G and B are higher than the height of the lower surface of the red color filter R by the thickness $D_{W1}$ of the first organic layer W1 and the thickness $D_{W2}$ of the second organic layer W2, respectively. For example, the heights of the lower surfaces of the red, green, and blue color filters R, G, and B are 0, $D_{W1}$, and $D_{W2}$, respectively. Alternatively, the heights of the lower surfaces of the red, green, and blue color filters R, G, and B are A, A+$D_{W1}$, and A+$D_{W2}$, respectively, where A is an arbitrary positive number.

The heights of the upper surfaces of the red, green, and blue color filters and the third organic layer R, G, B, and W3 are $D_R$, $D_G$+$D_{W1}$, $D_B$+$D_{W2}$, and $D_{W3}$, respectively. Alternatively, the heights of the upper surfaces of the red, green, and blue color filters and the third organic layer R, G, B, and W3 are A+$D_R$, A+$D_G$+$D_{W1}$, A+$D_B$+$D_{W2}$, and A+$D_{W3}$, respectively. The respective thicknesses $D_R$, $D_G$, $D_B$, $D_{W1}$, $D_{W2}$ and $D_{W3}$ of the color filters R, G, B, W1, W2, and W3 may have various values.

Referring to FIG. 5, the thicknesses $D_R$, $D_G$, and $D_B$ of the red, green, and blue color filters R, G, and B have substantially same values. Herein, the thicknesses of two of the color filters R, G, B, W1, W2, and W3 being substantially the same means that it allows an error rate less than about 10%, more preferably less than about 5%. That is, a thickness difference between two color filters may be less than about 1/10 of the thickness of any color filter, more preferably, less than about 1/20 thereof. The thickness $D_{W3}$ of the third organic layer W3 is greater than the thickness $D_R$ of the red color filter R, the thickness $D_{W1}$ of the first organic layer W1, and the thickness $D_{W2}$ of the second organic layer W2. The thickness $D_{W2}$ of the second organic layer W2 is greater than the thickness $D_{W1}$ of the first organic layer W1. The thickness $D_{W3}$ of the third organic layer W3 is greater than a sum $D_G+D_{W1}$ of the thicknesses of the green color filter G and the first organic layer W1. The thickness $D_{W3}$ of the third organic layer W3 is greater than a sum $D_B+D_{W2}$ of the thicknesses of the blue color filter B and the second organic layer W2.

Referring to FIG. 5, heights of the upper surfaces of the red, green, and blue color filters and the third organic layer R, G, B, and W3 have different values from each other. The upper surface of the red color filter R is lower than the upper surface of the green color filter G, the upper surface of the green color filter G is lower than the upper surface of the blue color filter B, and the upper surface of the blue color filter B is lower than the upper surface of the third organic layer W3.

The cell gaps $G_R$, $G_G$, $G_B$ and $G_W$ of the display areas PX1, PX2, PX3, and PX4 are defined as thicknesses of the liquid crystal layer 300 at the display areas PX1, PX2, PX3, and PX4, respectively. Accordingly, referring to FIG. 5, the respective cell gaps $G_R$, $G_G$, $G_B$, and $G_W$ of the display areas PX1, PX2, PX3, and PX4 may be defined as a distance between the pixel electrode 151 and the common electrode 231 at each display area. Similarly, the cell gap may be uniform at all points of the display area. Alternatively, the cell gap may not be uniform at each point of the display area. Accordingly, the respective cell gaps $G_R$, $G_G$, $G_B$ and $G_W$ of the display areas PX1, PX2, PX3, and PX4 may be defined as an average cell gap of all points in each of the display areas PX1, PX2, PX3, and PX4, an average cell gap of part of the all points, or a cell gap of a central point thereof.

A distance between the first substrate 110 and the second substrate 210 may be uniform. In addition, the pixel electrodes 151 may be disposed on the planarization layer 140 with a uniform thickness. Accordingly, the upper surface of the pixel electrode 151 has a substantially same height at all display areas PX1, PX2, PX3, and PX4. The capping layer 230 and the common electrode 231 may have a substantially same thickness at all the display areas PX1, PX2, PX3, and PX4.

Accordingly, differences between the respective cell gaps $G_R$, $G_G$, $G_B$, and $G_W$ of the display areas PX1, PX2, PX3, and PX4 are determined by differences between the heights of the upper surfaces of the red, green, and blue color filters and the third organic layer R, G, B, and W3. Accordingly, the differences between the respective cell gaps $G_R$, $G_G$, $G_B$, and $G_W$ of the display areas PX1, PX2, PX3, and PX4 are determined by the respective thicknesses $D_R$, $D_G$, $D_B$, $D_{W1}$, $D_{W2}$, and $D_{W3}$ of the color filters R, G, B, W1, W2, and W3. In addition, referring to FIG. 5, since the thicknesses $D_R$, $D_G$ and $D_B$ of the red, green and blue color filters R, G and B have a substantially same value, the differences between the cell gaps $G_R$, $G_G$, $G_B$, and $G_W$ of the display areas PX1, PX2, PX3, and PX4 may be determined by the thicknesses $D_{W1}$, $D_{W2}$ and $D_{W3}$ of the first, second, and third organic layers W1, W2, and W3.

In an embodiment, the thicknesses $D_{W1}$, $D_{W2}$, and $D_{W3}$ of the first, second, and third organic layers W1, W2, and W3 have three different positive values. Herein, $D_{W1}$ may be less than $D_{W2}$, and $D_{W2}$ may be less than $D_{W3}$. For example, the thicknesses $D_{W1}$, $D_{W2}$ and $D_{W3}$ may be in a range from about 0.4 μm to about 0.6 μm, in a range from about 0.52 μm to about 0.78 μm and in a range from about 1.44 μm to about 2.16 μm, respectively. For example, $D_{W1}$, $D_{W2}$, and $D_{W3}$ may be about 0.5 μm, about 0.65 μm, and about 1.8 μm, respectively. That is, the thicknesses of the first, second, and third organic layers are different from each other. Further, the thicknesses $D_R$, $D_G$ and $D_B$ of the red, green and blue color filters R, G, and B have a substantially same value. The thickness $D_R$, $D_G$, and $D_B$ of the red, green, and blue color filters R, G, and B may be in a range from about 0.8 μm to about 1.2 μm. For example, the thickness $D_R$, $D_G$, and $D_B$ of the red, green, and blue colors R, G, and B may be about 1 μm. The upper surface of the green color filter G may be higher than the upper surface of the red color filter R by about 0.4 μm to about 0.6 μm, for example, by about 0.5 μm. The upper surface of the blue color filter B may be higher than the upper surface of the red color filter R, by about 0.52 μm to about 0.78 μm, for example, by about 0.65 μm. The upper surface of the third organic layer W3 may be higher than the upper surface of the red color filter R by about 0.64 μm to about 0.96 μm, for example, by about 0.8 μm.

For example, the cell gaps $G_R$, $G_G$, $G_B$, and $G_W$ of the display areas PX1, PX2, PX3, and PX4 in the present embodiment may be in a range from about 2.24 μm to about 3.36 μm, in a range from about 1.84 μm to about 2.76 μm, in a range from about 1.72 μm to about 2.58 μm, and in a range from about 1.6 μm to 2.4 μm, respectively. For example, the cell gaps $G_R$, $G_G$, $G_B$, and $G_W$ of the display areas PX1, PX2, PX3, and PX4 may be about 2.8 μm, about 2.3 μm, about 2.15 μm, and about 2.0 μm, respectively.

Herein, having a value of "about" A may be defined to have a value of 70% to 130%, preferably 80% to 120%, more preferably 90% to 110%, of the value of A.

As described above, by the arrangement of each of the color filters R, G, B, W1, W2, and W3 and their thicknesses $D_R$, $D_G$, $D_B$, $D_{W1}$, $D_{W2}$, and $D_{W3}$, the respective cell gaps $G_R$, $G_G$, $G_B$, and $G_W$ of the display areas PX1, PX2, PX3, and PX4 may have different sizes from each other. Accordingly, the LCD device according to an embodiment of the present inventive concept has multi-cell gaps between the pixel electrode 151 and the common electrode 231. In an embodiment, the respective sizes of the cell gaps $G_R$, $G_G$, $G_B$, and $G_W$ at the R display area PX1, the G display area PX2, the B display area PX3, and the W display area PX4 are as below.

$$G_R>G_G>G_B>G_W$$

In general, light incident through corresponding ones of the color filters R, G, B, W1, W2, and W3 to the liquid crystal layer 300 at each of the display areas PX1, PX2, PX3, and PX4 have different wavelengths, i.e., red, green, blue, and white (overlap of red, green, and blue) wavelengths. In an embodiment, since the red, green, blue, and white light have different wavelengths, phase retardation due to the liquid crystal layer 300 is also different at each of the display areas PX1, PX2, PX3, and PX4. Accordingly, as described above, when the thicknesses of the red, green, blue, and white color filters are differently formed so that the display areas PX1, PX2, PX3, and PX4 have the multi-cell gaps, it is possible to match the points where the luminance becomes minimum or maximum, thereby capable of improving the luminance.

In an embodiment, in order to optimize phase retardation of the multi-cell gap, the thicknesses of the green and blue color filters G and B may be increased without forming the first and second organic layers W1 and W2. However, the amount of light output through each of the color filters G and B may be reduced due to the pigment contained therein. For example, if the thickness of the green or blue color filters G or B is made greater than the thickness of the red color filter R to optimize phase retardation of each of the display areas PX1, PX2, PX3, and PX4, the reflectance of the green or blue display areas PX2 or PX3 may rather be reduced.

In addition, the thicknesses of the red, green, and blue color filters R, G, and B may be adjusted to shift the hue of light output from each of the display areas PX1, PX2, PX3, and PX4 into a desired direction on the chromatic coordinates. However, the reflectance of the display area may be reduced as the thickness of the color filter increases as described above. Further, the phase difference in the liquid crystal layer may be changed as the cell gap is changed, and accordingly, the luminance in the display area may be reduced.

As such, it is difficult to achieve a desired color composition on the chromatic coordinates only with the thickness adjustment of the color filters R, G, and B because the reflectivity varies depending on the thickness of the color filter, and the luminance varies due to the cell gap variation.

According to an embodiment of the present inventive concept, the first organic layer W1 is disposed below the green color filter G, and the second organic layer w2 is disposed below the blue color filter B, without increasing the thicknesses $D_R$, $D_G$, and $D_B$ of the color filters R, G, and B. Accordingly, the cell gaps $G_R$, $G_G$, and $G_B$ of the red, green, and blue display areas PX1, PX2, and PX3 may be set to the optimum values without reducing the reflectance by the color filters R, G, B and without reducing the luminance due to the phase difference. In addition, the cell gap of the W display area PX4 may be independently set to an optimum value by the third organic layer W3.

Hereinafter, a vertical structure of the color filters R, G, B, W1, W2, and W3 according to another embodiment of the present inventive concept will be described in detail.

FIGS. 6 to 10 are cross-sectional views illustrating color filters R, G, B, W1, W2, and W3 according to embodiments of the present inventive concept. For ease of description, elements other than a second substrate 210, a light blocking member 220, and color filters R, G, B, W1, W2, and W3 are omitted in FIGS. 6 to 10.

As in an embodiment described hereinabove with reference to FIG. 5, in a planar structure of embodiments to be described with reference to FIGS. 6 to 10, the red color filter G is disposed at an R display area PX1, the green color filter G and the first organic layer W1 are disposed at a G display area PX2, the blue color filter B and the second organic layer W2 are disposed at a B display area PX3, and the third organic layer W3 is disposed at a W display area PX4. In a vertical structure, the red color filter G, the first organic layer W1, the second organic layer W2, and the third organic layer W3 are disposed on a second substrate and the light blocking member 220. The green color filter G is disposed on the first organic layer W1, and the blue color filter B is disposed on the second organic layer W2.

The description of the same configuration as that of an embodiment described hereinabove with reference to FIG. 5 will be omitted, and only different configurations will be described in detail below.

Figure 6:
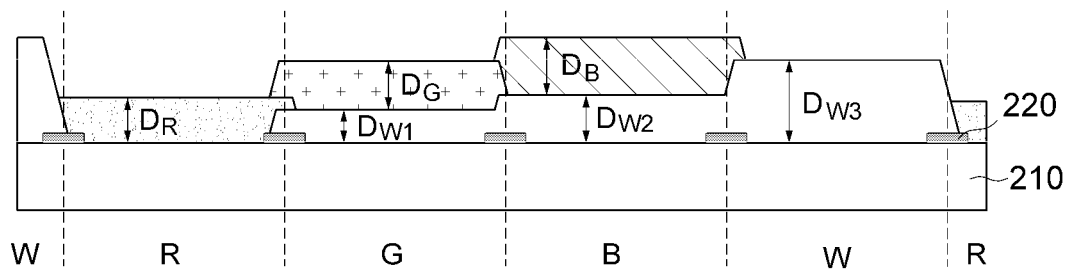
FIGS. 6, 7, 8, 9 and 10 are cross-sectional views illustrating color filters R, G, B, W1, W2, and W3 according to embodiments of the present inventive concept.

Referring to FIG. 6, heights of upper surfaces of the red, green, and blue color filters and the third organic layer R, G, B, and W3 are $D_R$, $D_G+D_{W1}$, $D_B+D_{W2}$, and $D_{W3}$, respectively. The upper surface of the third organic layer W3 in an embodiment illustrated in FIG. 6 has a lower height than that of the upper surface of blue color filter, e.g., a height between the upper surface of the red color filter R and the upper surface of the blue color filter B.

Thicknesses $D_R$, $D_G$ and $D_B$ of the red, green and blue color filters R, G, and B have a substantially same value.

A thickness $D_{W2}$ of the second organic layer W2 is greater than a thickness $D_{W1}$ of the first organic layer W1.

The height $D_{W3}$ of the upper surface of the third organic layer W3 is greater than the height $D_R$ of the upper surface of the red color filter R and less than the height $D_B+D_{W2}$ of the upper surface of the blue color filter B. The height $D_{W3}$ of the upper surface of the third organic layer W3 may be substantially equal to the height $D_G+D_{W1}$ of the upper surface of the green color filter G.

$$D_R=D_G=D_B$$

$$D_{W1}<D_{W2}<D_{W3}$$

$$D_R<D_{W3}=D_G+D_{W1}<D_B+D_{W2}$$

$$G_R>G_G=G_W>G_B$$

For example, the thicknesses $D_{W1}$, $D_{W2}$ and $D_{W3}$ of the first, second, and third organic layers W1, W2, and W3 may be in a range from about 0.4 μm to about 0.6 μm, in a range from about 0.52 μm to about 0.78 μm, and in a range from about 1.2 μm to about 1.8 μm, respectively. For example, the thicknesses $D_{W1}$, $D_{W2}$, and $D_{W3}$ of the first, second, and third organic layers W1, W2, and W3 may be about 0.5 μm, about 0.65 μm, and about 1.5 μm, respectively. The thicknesses $D_R$, $D_G$ and $D_B$ of the red, green and blue color filters R, G, and B have a substantially same value. For example, the thickness $D_R$, $D_G$, and $D_B$ of the red, green, and blue color filters R, G, and B may be in a range from about 0.8 μm to about 1.2 μm, more specifically, about 1 μm. The upper surface of the green color filter G may be higher than the upper surface of the red color filter R by about 0.4 μm to about 0.6 μm, for example, by about 0.5 μm. The upper surface of the blue color filter B may be higher than the upper surface of the red color filter R, by about 0.52 μm to about 0.78 μm, for example, by about 0.65 μm. The upper surface of the third organic layer W3 may be higher than the upper surface of the red color filter R by about 0.4 μm to about 0.6 μm, for example, by about 0.5 μm.

In an exemplary embodiment, cell gaps $G_R$, $G_G$, $G_B$, and $G_W$ of the display areas PX1, PX2, PX3, and PX4 may be in a range from about 2.24 μm to about 3.36 μm, in a range from about 1.84 μm to about 2.76 μm, in a range from about 1.72 μm to about 2.58 μm, and in a range from about 1.84 μm to 2.76 μm, respectively. For example, the cell gaps $G_R$, $G_G$, $G_B$, and $G_W$ of the display areas PX1, PX2, PX3, and PX4 may be about 2.8 μm, about 2.3 μm, about 2.15 μm, and about 2.3 μm, respectively.

Figure 7:
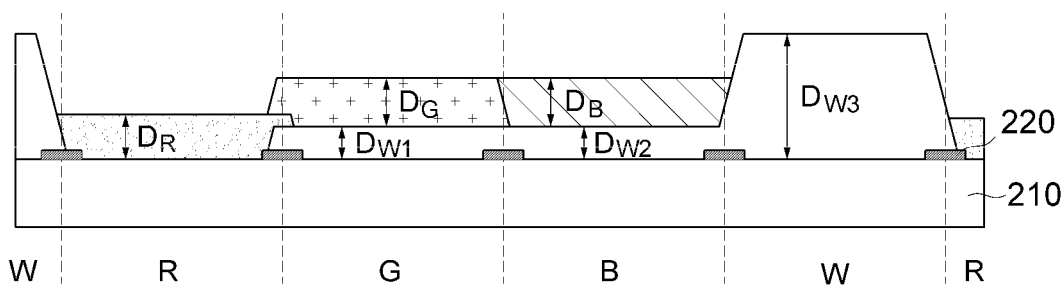

Referring to FIG. 7, heights of upper surfaces of the red, green, and blue color filters and the third organic layer R, G, B, and W3 are $D_R$, $D_G+D_{W1}$, $D_B+D_{W2}$, and $D_{W3}$, respectively. Thicknesses $D_{W1}$ and $D_{W2}$ of the first organic layer W1 and the second organic layer W2, i.e., the heights of the upper surfaces of the first organic layer W1 and the second organic layer W2, in the present embodiment are substantially equal to each other, Thicknesses $D_R$, $D_G$ and $D_B$ of the red, green and blue color filters R, G, and B have a substantially same value.

The thickness $D_{W2}$ of the second organic layer W2 is substantially equal to the thickness $D_{W1}$ of the first organic layer W1.

The height $D_{W3}$ of the upper surface of the third organic layer W3 is greater than the height $D_R$ of the upper surface of the red color filter R, the height $D_G+D_{W1}$ of the upper surface of the green color filter G, and the height $D_B+D_{W2}$ of the upper surface of the blue color filter B. The height $D_G+D_{W1}$ of the upper surface of the green color filter G and the height $D_B+D_{W2}$ of the upper surface of the blue color filter B are substantially equal to each other.

$$D_{W1}=D_{W2}$$

$$D_R=D_G=D_B$$

$$D_R<D_G+D_{W1}=D_B+D_{W2}<D_{W3}$$

$$G_R>G_G=G_B>G_W$$

For example, the thicknesses $D_{W1}$, $D_{W2}$ and $D_{W3}$ of the first, second, and third organic layers W1, W2, and W3 may be in a range from about 0.4 µm to about 0.6 µm, in a range from about 0.4 µm to about 0.6 µm, and in a range from about 1.2 µm to about 1.8 µm, respectively. For example, the thicknesses $D_{W1}$, $D_{W2}$, and $D_{W3}$ of the first, second, and third organic layers W1, W2, and W3 may be about 0.5 µm, about 0.5 µm, and about 1.5 µm, respectively. For example, the thicknesses $D_R$, $D_G$ and $D_B$ of the red, green and blue color filters R, G, and B are in a range from about 0.8 µm to about 1.2 µm. For example, the thickness $D_R$, $D_G$, and $D_B$ of the red, green, and blue colors R, G, and B may be about 1 µm. The upper surface of the green color filter G and the upper surface of the blue color filter B have a substantially same height. Herein, two of the color filters R, G, B, W1, W2, and W3 having a substantially same height means that it allows a height different less than about 0.1 µm, more preferably less than 0.05 µm, considering a process margin. The upper surfaces of the green and blue color filters G and B may be higher than the upper surface of the red color filter R by about 0.4 µm to about 0.6 µm, for example, by about 0.5 µm. The upper surface of the third organic layer W3 may be higher than the upper surface of the red color filter R by about 0.64 µm to about 0.96 µm, for example, by about 0.8 µm.

In an exemplary embodiment, cell gaps $G_R$, $G_G$, $G_B$, and $G_W$ of the display areas PX1, PX2, PX3, and PX4 may be in a range from about 2.24 µm to about 3.36 µm, in a range from about 1.84 µm to about 2.76 µm, in a range from about 1.84 µm to about 2.76 µm, and in a range from about 1.6 µm to 2.4 µm, respectively. For example, the cell gaps $G_R$, $G_G$, $G_B$, and $G_W$ of the display areas PX1, PX2, PX3, and PX4 may be about 2.8 µm, about 2.3 µm, about 2.3 µm, and about 2.0 µm, respectively.

Figure 8:
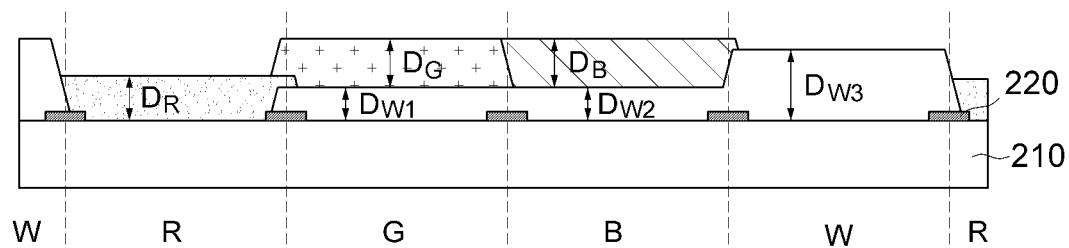

Referring to FIG. 8, heights of upper surfaces of the red, green, and blue color filters and the third organic layer R, G, B, and W3 are $D_R$, $D_G+D_{W1}$, $D_B+D_{W2}$, and $D_{W3}$, respectively. The upper surface of the third organic layer W3 in the present embodiment illustrated in FIG. 8 has a lower height, e.g., a height between the upper surface of the red color filter R and the upper surface of the blue color filter B.

Thicknesses $D_R$, $D_G$ and $D_B$ of the red, green and blue color filters R, G, and B have a substantially same value.

A thickness $D_{W2}$ of the second organic layer W2 is substantially equal to a thickness $D_{W1}$ of the first organic layer W1.

The height $D_{W3}$ of the upper surface of the third organic layer W3 is greater than the height $D_R$ of the upper surface of the red color filter R. The height $D_{W3}$ of the upper surface of the third organic layer W3 is less than the height $D_G+D_{W1}$ of the upper surface of the green color filter G and the height $D_B+D_{W2}$ of the upper surface of the blue color filter B. The height $D_G+D_{W1}$ of the upper surface of the green color filter G is substantially equal to the height $D_B+D_{W2}$ of the upper surface of the blue color filter B.

$$D_{W1}=D_{W2}$$

$$D_R=D_G=D_B$$

$$D_R<D_{W3}<D_G+D_{W1}=D_B+D_{W2}$$

$$G_R>G_W>G_G=G_B$$

For example, the thicknesses $D_{W1}$, $D_{W2}$ and $D_{W3}$ of the first, second, and third organic layers W1, W2, and W3 may be in a range from about 0.4 µm to about 0.6 µm, in a range from about 0.4 µm to about 0.6 µm, and in a range from about 1.04 µm to about 1.56 µm, respectively. For example, the thicknesses $D_{W1}$, $D_{W2}$, and $D_{W3}$ of the first, second, and third organic layers W1, W2, and W3 may be about 0.5 µm, about 0.5 µm, and about 1.3 µm, respectively. For example, the thicknesses $D_R$, $D_G$ and $D_B$ of the red, green and blue color filters R, G, and B are in a range from about 0.8 µm to about 1.2 µm. For example, the thickness $D_R$, $D_G$, and $D_B$ of the red, green, and blue colors R, G, and B may be about 1 µm. The upper surfaces of the green and blue color filters G and B may be higher than the upper surface of the red color filter R by about 0.4 µm to about 0.6 µm, for example, by about 0.5 µm. The upper surface of the third organic layer W3 may be higher than the upper surface of the red color filter R by about 0.64 µm to about 0.96 µm, for example, by about 0.8 µm.

In an exemplary embodiment, cell gaps $G_R$, $G_G$, $G_B$, and $G_W$ of the display areas PX1, PX2, PX3, and PX4 may be in a range from about 2.24 µm to about 3.36 µm, in a range from about 1.84 µm to about 2.76 µm, in a range from about 1.84 µm to about 2.76 µm, and in a range from about 2.0 µm to 3.0 µm, respectively. For example, the cell gaps $G_R$, $G_G$, $G_B$, and $G_W$ of the display areas PX1, PX2, PX3, and PX4 may be about 2.8 µm, about 2.3 µm, about 2.3 µm, and about 2.5 µm, respectively.

Figure 9:
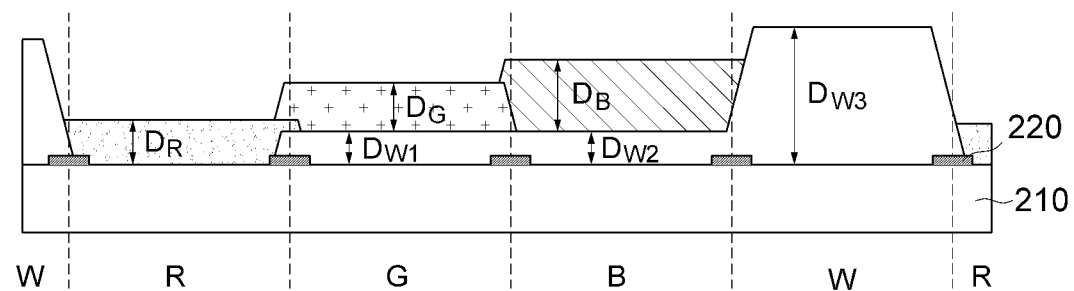

Referring to FIG. 9, heights of upper surfaces of the red, green, and blue color filters and the third organic layer R, G, B, and W3 are $D_R$, $D_G+D_{W1}$, $D_B+D_{W2}$, and $D_{W3}$, respectively. A thickness $D_B$ of the blue color filter B in the present embodiment illustrated in FIG. 9 is greater than a thickness $D_G$ of the green color filter G.

The thickness $D_B$ of the blue color filter B is greater than the thickness $D_G$ of the green color filter G. A thickness $D_R$ of the red color filter R and the thickness $D_G$ of the green color filter G have a substantially same value as each other.

A thickness $D_{W2}$ of the second organic layer W2 is substantially equal to a thickness $D_{W1}$ of the first organic layer W1.

The height $D_{W3}$ of the upper surface of the third organic layer W3 is greater than the height $D_R$ of the upper surface of the red color filter R, the height $D_G+D_{W1}$ of the upper surface of the green color filter G, and the height $D_B+D_{W2}$ of the upper surface of the blue color filter B. The height $D_B+D_{W2}$ of the upper surface of the blue color filter B is greater than the height $D_G+D_{W1}$ of the upper surface of the green color filter G.

$$D_{W1}=D_{W2}$$

$$D_R=D_G<D_B$$

$$D_R<D_G+D_{W1}<D_B+D_{W2}<D_{W3}$$

$$G_R>G_G>G_B>G_W$$

For example, the thicknesses $D_{W1}$, $D_{W2}$ and $D_{W3}$ of the first, second, and third organic layers W1, W2, and W3 may be in a range from about 0.4 µm to about 0.6 µm, in a range from about 0.4 µm to about 0.6 µm, and in a range from about 1.44 µm to about 2.16 µm, respectively. For example, the thicknesses $D_{W1}$, $D_{W2}$, and $D_{W3}$ of the first, second, and third organic layers W1, W2, and W3 may be about 0.5 µm, about 0.5 µm, and about 1.8 µm, respectively. The thicknesses $D_R$, $D_G$ and $D_B$ of the red, green and blue color filters R, G, and B are in a range from about 0.8 µm to about 1.2 µm, in a range from about 0.8 µm to about 1.2 µm, and in a range from about 0.92 µm to about 1.44 µm, respectively. For example, the thickness $D_R$, $D_G$, and $D_B$ of the red, green, and blue colors R, G, and B may be about 1 µm, about 1 µm, and about 1.15 µm, respectively. The upper surface of the green color filter G may be higher than the upper surface of the red color filter R by about 0.4 µm to about 0.6 µm, for example, by about 0.5 µm. The upper surface of the blue color filter B may be higher than the upper surface of the red color filter R, by about 0.52 µm to about 0.78 µm, for example, by about 0.65 µm. The upper surface of the third organic layer W3 may be higher than the upper surface of the red color filter R by about 0.64 µm to about 0.96 µm, for example, by about 0.8 µm.

In an exemplary embodiment, cell gaps $G_R$, $G_G$, $G_B$, and $G_W$ of the display areas PX1, PX2, PX3, and PX4 may be in a range from about 2.24 µm to about 3.36 µm, in a range from about 1.84 µm to about 2.76 µm, in a range from about 1.72 µm to about 2.58 µm, and in a range from about 1.6 µm to 2.4 µm, respectively. For example, the cell gaps $G_R$, $G_G$, $G_B$, and $G_W$ of the display areas PX1, PX2, PX3, and PX4 may be about 2.8 µm, about 2.3 µm, about 2.15 µm, and about 2.0 µm, respectively.

However, embodiments are not limited thereto. For example, the height $D_{W3}$ of the upper surface of the third organic layer W3 may be greater than the height $D_R$ of the upper surface of the red color filter R and less than the height $D_B+D_{W2}$ of the upper surface of the blue color filter B. The height $D_{W3}$ of the upper surface of the third organic layer W3 may be substantially equal to the height $D_G+D_{W1}$ of the upper surface of the green color filter G.

$$D_{W1}=D_{W2}$$

$$D_R=D_G<D_B$$

$$D_R<D_G+D_{W1}=D_{W3}<D_B+D_{W2}$$

$$G_R>G_G=G_W>G_B$$

Figure 10:
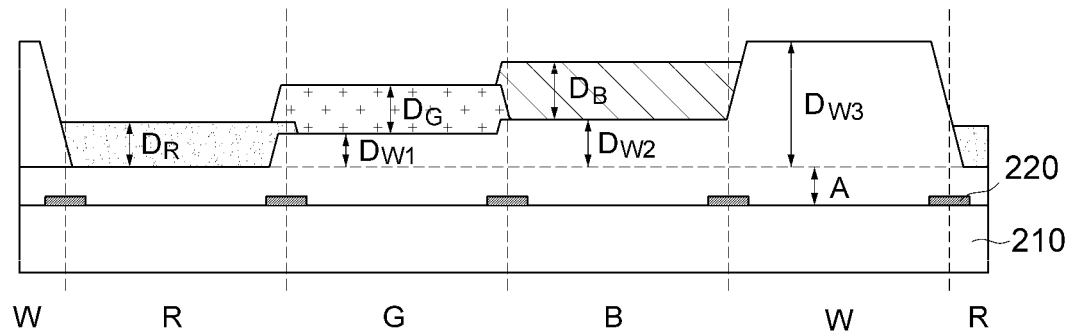

Referring to FIG. 10, heights of upper surfaces of the red, green and blue color filters and the third organic layer R, G, B, and W3 are $A+D_R$, $A+D_G+D_{W1}$, $A+D_B+D_{W2}$, and $A+D_{W3}$, respectively. In an embodiment to be described with reference to FIG. 10 further includes a fourth organic layer W4 disposed on the second substrate 210 throughout all the display areas PX1, PX2, PX3, and PX4. Herein, A is a thickness of the fourth organic layer W4. All of embodiments described with reference to FIGS. 5 to 9 may further include the aforementioned fourth organic layer W4. For convenience of explanation, the description hereinbelow will be provided with reference to an embodiment of FIG. 5.

More specifically, the fourth organic layer W4 is vertically disposed on the second substrate 210 at all the display areas PX1, PX2, PX3, and PX4 in a plan view. The fourth organic layer W4 may have a substantially planar upper surface. The fourth organic layer W4 and the first, second, and third organic layers may be formed substantially simultaneously using a substantially same material. Alternatively, the fourth organic layer W4 may be formed separately from the first, second, and third organic layers W1, W2, and W3, and an arbitrary layer, e.g., a wire, an insulating layer, a planarization layer, or a reflective layer, may be disposed between the red color filter R and the fourth organic layer W4, and between the first, second, and third organic layers W1, W2, and W3 and the fourth organic layer W4, or between the fourth organic layer W4 and the second substrate 210. Thicknesses of all layers between the red color filter R and the second substrate 210 and between the first, second, and third organic layers W1, W2, and W3 and the second substrate 210 may be denoted as A. The red color filter R and the first, second, and third organic layers W1, W2, and W3 described above are disposed on the fourth organic layer W4, and the green color filter G is disposed on the first organic layer W1, and the blue color filter B is disposed on the second organic layer W2.

Thicknesses $D_R$, $D_G$ and $D_B$ of the red, green and blue color filters R, G, and B have a substantially same value.

A thickness $D_{W2}$ of the second organic layer W2 is greater than a thickness $D_{W1}$ of the first organic layer W1.

The height $D_{W3}$ of the upper surface of the third organic layer W3 is greater than the height $D_R$ of the upper surface of the red color filter R, the height $D_G+D_{W1}$ of the upper surface of the green color filter G, and the height $D_B+D_{W2}$ of the upper surface of the blue color filter B.

$$D_R=D_G=D_B$$

$$D_{W1}<D_{W2}$$

$$A+D_R<A+D_G+D_{W1}<A+D_B+D_{W2}<A+D_{W3}$$

$$G_RG_G<G_B<G_W$$

For example, the thicknesses $D_{W1}$, $D_{W2}$ and $D_{W3}$ of the first, second, and third organic layers W1, W2, and W3 may be in a range from about 0.4 µm to about 0.6 µm, in a range from about 0.52 µm to about 0.78 µm, and in a range from about 1.44 µm to about 2.16 µm, respectively. For example, the thicknesses $D_{W1}$, $D_{W2}$, and $D_{W3}$ of the first, second, and third organic layers W1, W2, and W3 may be about 0.5 µm, about 0.65 µm, and about 1.8 µm, respectively. In addition, the thicknesses $D_R$, $D_G$ and $D_B$ of the red, green and blue color filters R, G, and B may have a substantially same value. The thicknesses $D_R$, $D_G$ and $D_B$ of the red, green and blue color filters R, G, and B may be in a range from about 0.8 µm to about 1.2 µm. For example, the thickness $D_R$, $D_G$, and $D_B$ of the red, green, and blue colors R, G, and B may be about 1 µm.

In an exemplary embodiment, cell gaps $G_R$, $G_G$, $G_B$, and $G_W$ of the display areas PX1, PX2, PX3, and PX4 may be in a range from about 2.24 µm to about 3.36 µm, in a range from about 1.84 µm to about 2.76 µm, in a range from about 1.72 µm to about 2.58 µm, and in a range from about 1.6 µm to 2.4 µm, respectively. For example, the cell gaps $G_R$, $G_G$, $G_B$, and $G_W$ of the display areas PX1, PX2, PX3, and PX4 may be about 2.8 μm, about 2.3 μm, about 2.15 μm, and about 2.0 μm, respectively.

Figure 11:
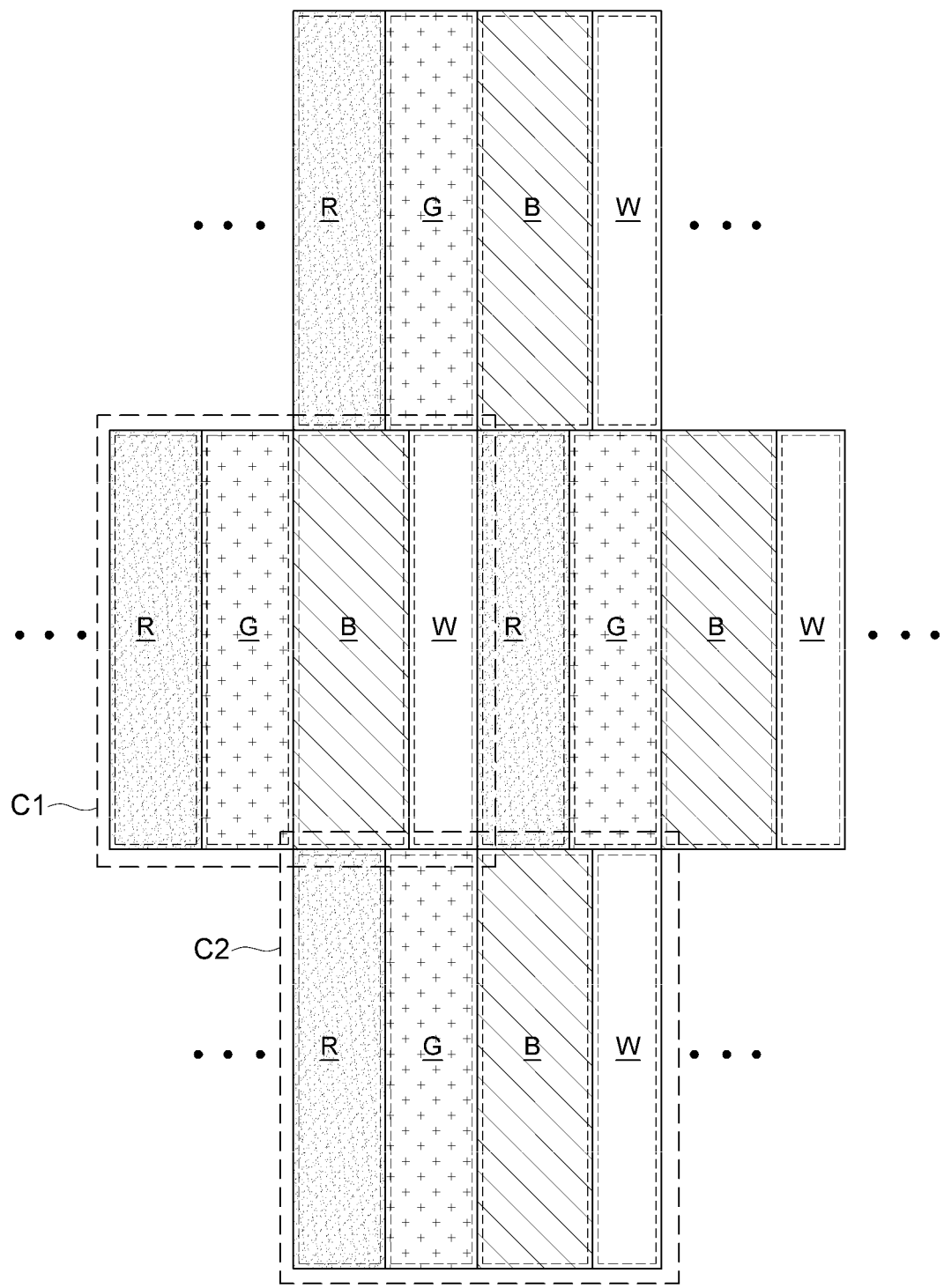
FIG. 11 is a plan view illustrating an arrangement of color filters according to an embodiment of the present inventive concept.
Figure 12:
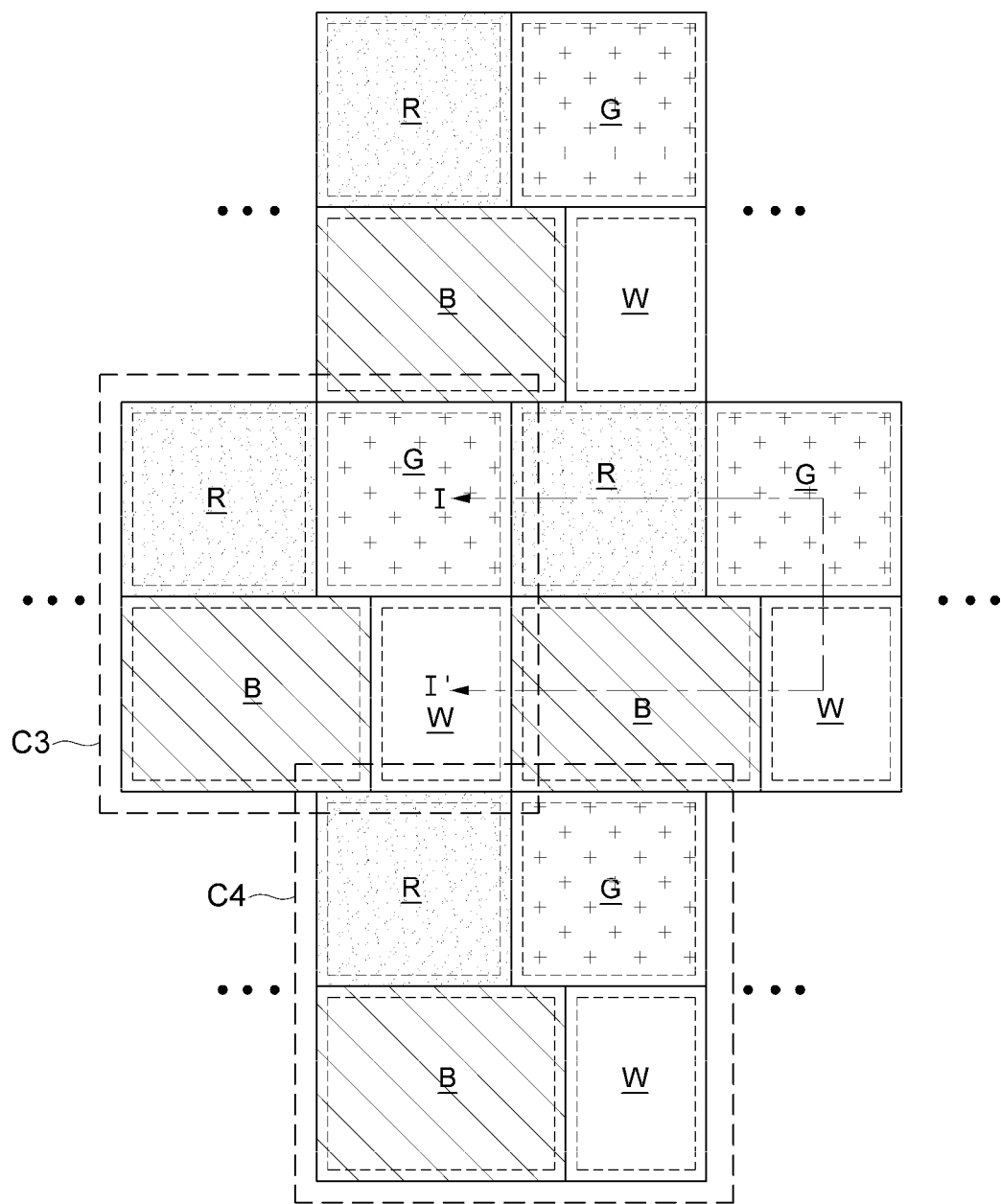
FIG. 12 is a plan view illustrating an arrangement of color filters according to another embodiment of the present inventive concept.
Figure 13:
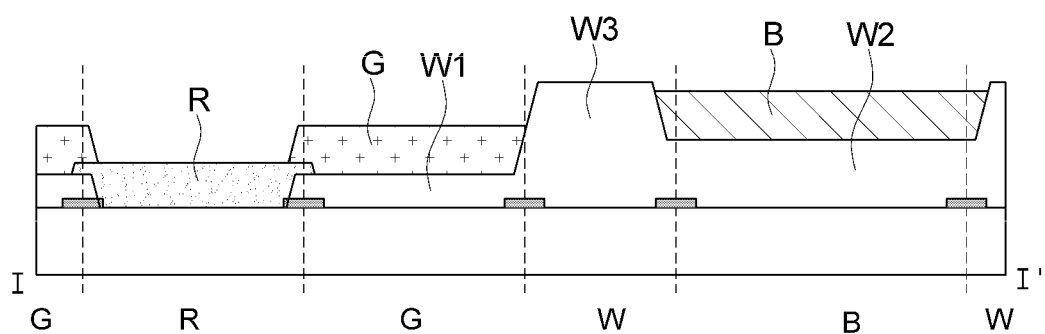
FIG. 13 is a cross-sectional view taken along line I-I' in FIG. 12.

FIG. 11 is a plan view illustrating an arrangement of color filters according to an embodiment of the present inventive concept, FIG. 12 is a plan view illustrating an arrangement of color filters according to another embodiment of the present inventive concept, and FIG. 13 is a cross-sectional view taken along line I-I' in FIG. 12. Since a cross-sectional view of a combination C1 of color filters in FIG. 11 is substantially the same as those in FIGS. 5 to 10 except for widths of a blue color filter B and a white color filter W3, and thus it will be omitted. Hereinafter, in describing the disposition in a plan view, the first and second organic layers W1 and W2 overlap the green and blue color filters G and B, respectively, and the description thereof will be omitted. Unless stated otherwise, a white color filter is only limited to the third organic layer W3.

First, referring to FIG. 11, red, green, blue, and white color filters R, G, B, and W3 may be disposed in the order listed in a same row when viewed in a plan view. A combination C1 of the red, green, blue, and white color filters R, G, B, and W3 may be a quadrangular or square shape in a plan view. In other words, the combination C1 of the red, green, blue, and white color filters R, G, B, and W3 may be arranged in one row and four columns, as illustrated in FIG. 1.

Since the cross-sectional view of the combination C1 of the color filters is substantially the same as those in FIGS. 5 to 10 except for the widths of the blue color filter B and the white color filter W3, and thus it will be omitted.

The combination C1 of the red, green, blue, and white color filters R, G, B, and W3 may be arranged repeatedly and alternately (in a staggered manner). Specifically, the combination C1 of the red, green, blue, and white color filters R, G, B, and W3 may be repeatedly arranged in a row direction. The aforementioned combination C1 of red, green, blue, and white color filters R, G, B, and W3 and another combination C2 disposed adjacent to and below (or above) the combination C1 may be arranged alternately with each other, as illustrated in FIGS. 11 and 12.

The red, green, blue, and white color filters R, G, B, and W3 may be continuously arranged as illustrated in FIGS. 3 and 11. That is, a structure in which a boundary of one color filter contacts a boundary of another color filter may be included. Accordingly, the red, green, blue, and white color filters R, G, B, and W3 may be continuously arranged throughout the entire area including the display areas PX1, PX2, PX3, and PX4.

When viewed in a plan view, of the combinations C1 and C2 of the red, green, blue, and white color filters R, G, B, and W3, an area of the blue color filter B may be larger than an area of the red color filter R, an area of the green color filter G, and an area of the white color filter W3. When viewed in a plan view, the area of the red color filter R and the area of the green color filter G may be larger than the area of the white color filter W. When viewed in a plan view, of one of the combinations C1 and C2 of the red, green, blue, and white color filters R, G, B, and W3, the area of the red color filter R and the area of the green color filter G may be substantially equal to each other.

An area ratio of the red, green, blue, and white color filters R, G, B, and W3 may be determined in consideration of reflection characteristics of the pixel electrode 151 or the reflection layer 160. For example, an area ratio of the red, green, blue, and white color filters R, G, B, and W3 may be about 1:1:1.2:0.8. That is, as the area of the blue color filter B becomes relatively large, the area of the white color filter W3 may become relatively small. When the gate line 111 and the data line 121 are provided at a constant/uniform interval regardless of the size of each of the color filters R, G, B, and W, as illustrated in FIG. 1, an area surrounded by the gate line 111 and the data line 121 may be different from the display areas PX1, PX2, PX3, and PX4 corresponding to the red, green, blue, and white color filters R, G, B, and W. Accordingly, the gate line 111 and the data line 121 connected to the thin film transistor TFT corresponding to the W display area PX4 may be disposed at the B display area PX3, which will be described in detail below with reference to FIGS. 17 to 30.

Referring to FIG. 12, when the color filters R, G, B, and W3 are viewed in a plan view, the red color filter R and the green color filter G may be arranged alternately and repeatedly in a same row. In another row different from the aforementioned row, i.e., a previous row and/or a succeeding row, the blue color filter B and the white color filter W3 may be arranged alternately and repeatedly. When viewed in a plan view, one combination C3 of the red, green, blue, and white color filters R, G, B, and W3 may have a quadrangular or square shape. In other words, the one combination C3 of the red, green, blue, and white color filters R, G, B, and W3 may be arranged in 2 rows and 2 columns. However, the arrangement of the combination of the red, green, blue, and white color filters R, G, B, and W3 illustrated in FIGS. 11 and 12 is merely given by way of example, and the present inventive concept may be applied to various other arrangements.

Arrangements and area ratios of combinations C3 and C4 of the red, green, blue, and white color filters R, G, B, and W3 are as in the description with reference to FIG. 11, and a detailed description thereof will be omitted.

Referring to FIGS. 12 and 13, in the combinations C3 and C4 of the red, green, blue and white color filters R, G, B, and W3, the red color filter R and the green color filter G contact each other in a row or horizontal direction, and the blue color filter B and the white color filter W3 contact each other in the horizontal direction. In addition, the red color filter R and the blue color filter B contact each other in a column or vertical direction, and the green color filter G and the white color filter W contact each other in the vertical direction. In addition, the green color filter G and the blue color filter B may contact each other in the vertical direction.

As in an embodiment described above with reference to FIG. 5, in an embodiment illustrated in FIGS. 12 and 13, the red color filter G is disposed at the R display area PX1, and the green color filter G and the first organic layer W1 are disposed at the G display area PX2, the blue color filter B and the second organic layer W2 are disposed at the B display area PX3, and the third organic layer W3 is disposed at the W display area PX4. In addition, the red color filter G, the first organic layer W1, the second organic layer W2, and the third organic layer W3 are disposed on the second substrate and the light blocking member 220. The green color filter G is disposed on the first organic layer W1, and the blue color filter B is disposed on the second organic layer W2. In addition, respective thicknesses of the color filters R, G, B, W1, W2 and W3 are as described above with reference to FIGS. 5 to 10.

The reflective layer 151 of the reflective LCD device may give a user the feeling that is visually different from that for the paper. However, with the structure where the area of the blue color filter B is larger than the area of the red color filter R and the area of the green color filter G, the color sense similar to that of an actual paper may be achieved.

In addition, a luminance of a light reflected through the white color filter W3 may be greater than each of luminances of lights reflected through the red color filter R, the green color filter G and the blue color filter B. As the area of the white color filter W3 is less than each of the areas of the red color filter R, the green color filter G and the blue color filter B, the reflection characteristics of the aforementioned reflection layer 151 may be effectively improved.

However, the area of each of the color filters R, G, B, W1, W2, and W3 is not limited thereto. A desired color sense may be achieved by adjusting the thickness and the area of each of the color filters R, G, B, W1, W2, and W3 independently of each other.

Hereinafter, a method of manufacturing a color filter according to an embodiment of the present inventive concept will be described with reference to FIGS. 14A to 17B. The color filters R, G, B, W1, W2, and W3 formed on the second substrate 210 and the light blocking member 220 are mainly described below, but embodiments are not limited thereto. For example, as in an embodiment to be described below with reference to FIGS. 17 to 31, the color filters R, G, B, W1, W2, and W3 may also be formed on reflective layers 160, 161R, 161G, 161B, 161W, 162, 164, 167R, 167G, 167B, 167W on the first substrate 110 as in a method to be described below.

FIGS. 14A to 14G are cross-sectional views illustrating a process of manufacturing a color filter according to an embodiment of the present inventive concept.

Figure 14A:
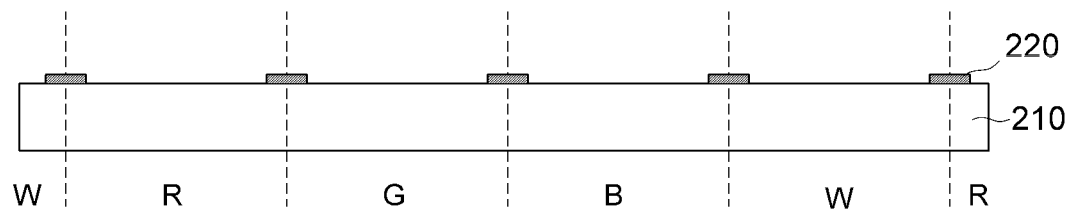
FIGS. 14A, 14B, 14C, 14D, 14E, 14F and 14G are cross-sectional views illustrating a process of manufacturing a color filter according to an embodiment of the present inventive concept.

Referring to FIG. 14A, a light blocking member 220 is formed on a surface of the second substrate 210. The light blocking member 220 may serve to partition the second substrate into the red, green, blue, and white display areas PX1, PX2, PX3, and PX4. Although not illustrated, an overcoat layer having a planar upper surface may be formed on the light blocking member 220.

Figure 14B:
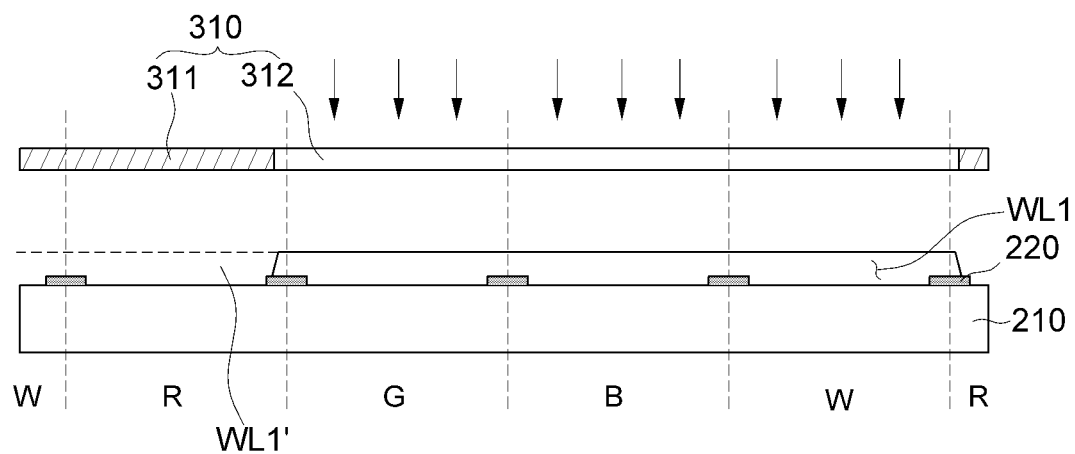

Referring to FIG. 14B, a light transmitting resin WL1' is coated on the second substrate 210 on which the light blocking member 220 is formed. Herein, the light transmitting resin WL1' may be a photosensitive polymer material (negative photoresist) that is photocurable. A thickness of the organic layer is determined in consideration of the thickness $D_{W1}$ of the first organic layer W1 after curing.

Then, an exposure mask 310 for forming a first organic layer pattern WL1 is disposed on the light transmitting resin WL1'. Herein, the exposure mask 310 has an opening 312 corresponding to the G, B and W display areas PX2, PX3, and PX4, and a light blocking portion 311 corresponding to the R display area PX1.

Then, the light transmitting resin WL1' is irradiated with a UV light using the exposure mask 310 to selectively expose the light transmitting resin WL1'. In such an embodiment, since the light transmitting resin WL1' is of a negative type, a portion irradiated with light remains after development.

Next, a predetermined cleaning process is performed on the resultant structure to form the first organic layer pattern WL1. The first organic layer pattern WL1 has the thickness $D_{W1}$ of the aforementioned first organic layer W1.

Figure 14C:
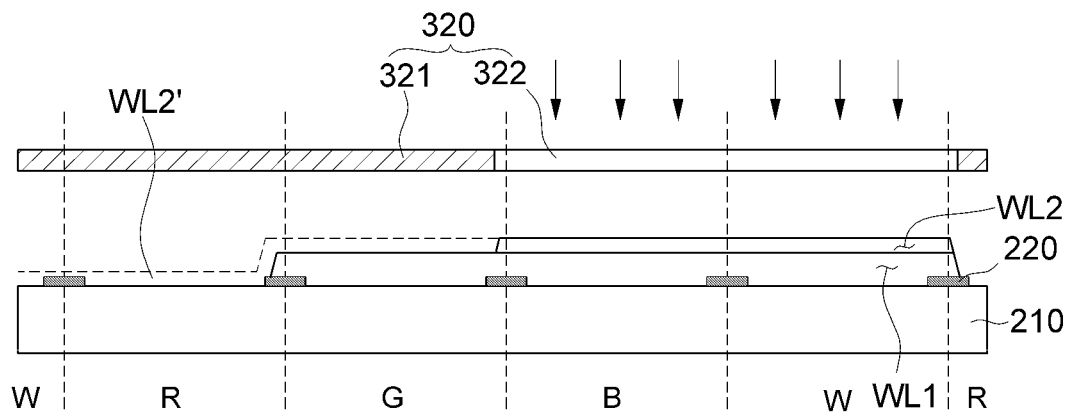

Referring to FIG. 14C, a light transmitting resin WL2' is coated on the second substrate 210 on which the first organic layer pattern WL1 is formed. Herein, the light transmitting resin WL2' may include a material substantially the same as a material included in the light transmitting resin WL1'. A thickness of the organic layer is determined in consideration of the thickness $D_{W2}$ of the second organic layer W2.

Then, an exposure mask 320 for forming a second organic layer pattern WL2 is placed on the light transmitting resin WL2'. Herein, the exposure mask 320 has an opening 322 corresponding to the B and W display areas PX3, and PX4, and a light blocking portion 321 corresponding to the R and G display areas PX1 and PX2.

Then, the light transmitting resin WL2' is irradiated with a UV light using the exposure mask 320 to selectively expose the light transmitting resin WL2', and a predetermined cleaning process is performed on the resultant structure to form the second organic layer pattern WL2 at the blue and white display areas PX3 and PX4. The second organic layer pattern WL2 has a thickness $D_{W2}-D_{W1}$ which is a difference value between the thickness $D_{W1}$ of the first organic layer W1 and the thickness $D_{W2}$ of the second organic layer W2.

In a case where the thicknesses $D_{W1}$ and $D_{W2}$ of the first organic layer W1 and the second organic layer W2 are the same, the process described above with reference to FIG. 14C may be omitted.

Figure 14D:
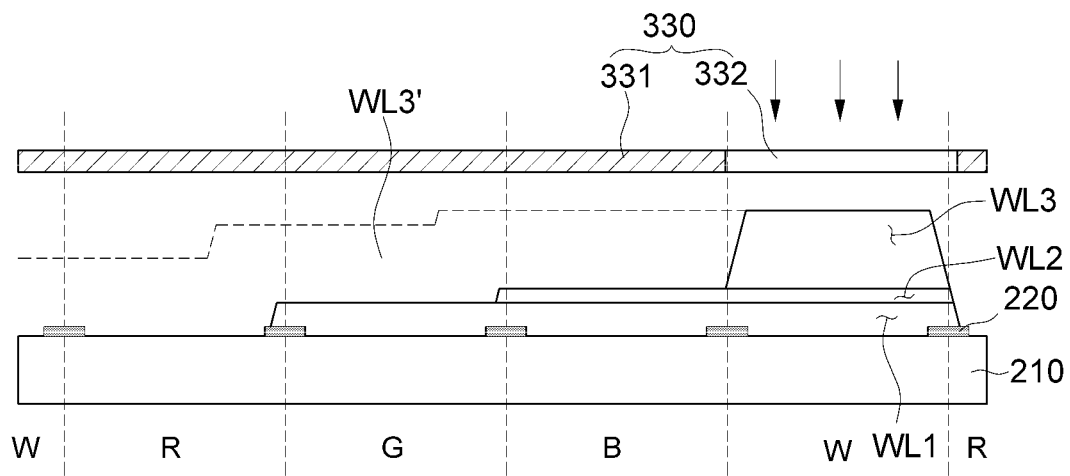

Referring to FIG. 14D, a light transmitting resin WL3' is coated on the second substrate 210 on which the first and second organic layer patterns WL1 and WL2 are formed. Herein, the light transmitting resin WL3' may include a material substantially the same as the material included in the light transmitting resin WL1' and WL2'. A thickness of the organic layer is determined in consideration of the thickness $D_{W3}$ of the third organic layer W3.

Then, an exposure mask 330 for forming a third organic layer pattern WL3 is placed on the light transmitting resin WL3'. Herein, the exposure mask 330 has an opening 332 corresponding to the W display area PX4, and a light blocking portion 331 corresponding to the R, G and B display areas PX1, PX2 and PX3.

Then, the light transmitting resin WL3' is irradiated with a UV light using the exposure mask 330 to selectively expose the light transmitting resin WL3', and a predetermined cleaning process is performed on the resultant structure to form the third organic layer pattern WL3 at the white display area PX4. The third organic layer pattern WL3 has a thickness $D_{W3}-D_{W2}$ which is a difference value between the thickness $D_{W3}$ of the third organic layer W3 and the thickness $D_{W2}$ of the second organic layer W2.

Accordingly, the first organic layer W1 having the thickness $D_{W1}$ is formed at the G display area PX2, the second organic layer W2 having the thickness $D_{W2}$ is formed at the B display area PX3, and the third organic layer W3 having the thickness $D_{W3}$ is formed at the W display area PX4. In addition, the first organic layer W1 includes the first organic layer pattern WL1, the second organic layer W2 includes the first organic layer pattern WL1 and the second organic layer pattern WL2, and the third organic layer W3 includes the first organic layer pattern WL1, the second organic layer pattern WL2, and the third organic layer pattern WL3.

Figure 14E:
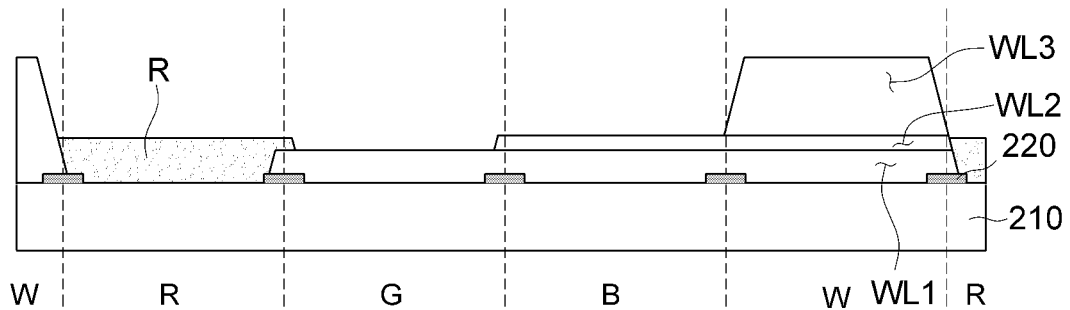

Referring to FIG. 14E, the red color filter R is formed at the R display area PX1 on the second substrate 210 on which the first, second, and third organic layers W1, W2, and W3 are formed. A red color resin is coated over an entire surface of the second substrate 210, and then selectively exposed to form the red color filter R at a desired portion of the R display area PX1. The red color filter G may overlap the first and third organic layers W1 and W3 at a boundary therebetween.

Figure 14F:
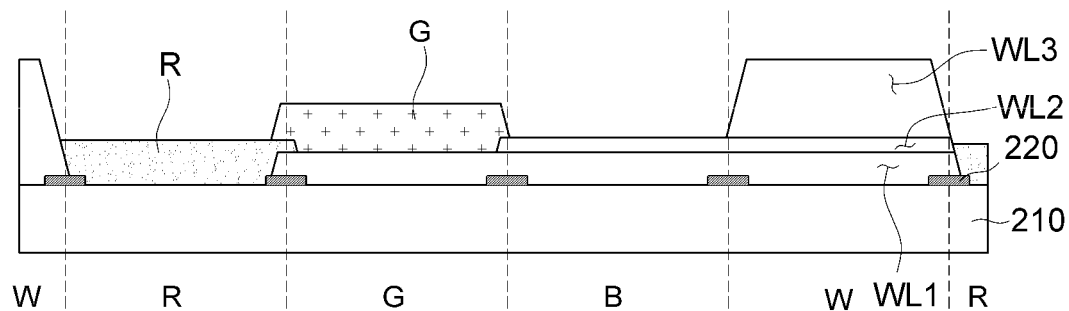

Referring to FIG. 14F, a green color resin is coated over an entire surface of the second substrate 210 on which the red color filter R is formed, and then selectively exposed to form the green color filter G. The green color filter G may overlap the red color filter R at a boundary therebetween.

Figure 14G:
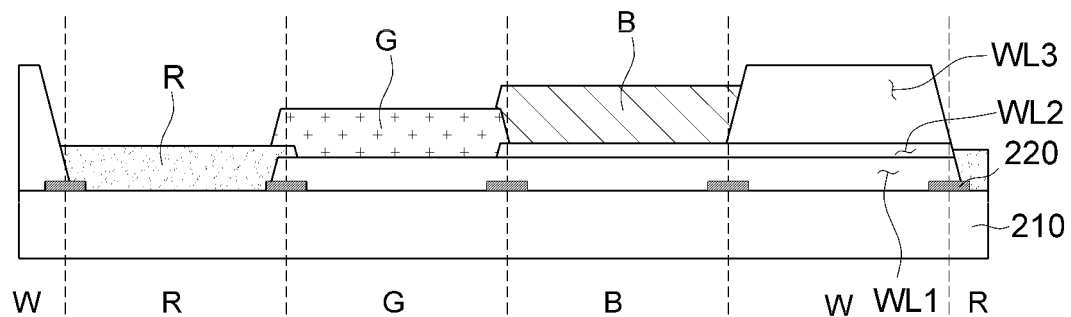

Referring to FIG. 14G, a blue color resin is coated over an entire surface of the second substrate 210 on which the red and green color filters R and G are formed, and then selectively exposed to form the blue color filter B. The blue color filter B may overlap the green color filter G and the white color filter W at a boundary therebetween.

The thicknesses $D_R$, $D_G$ and $D_B$ of the red, green and blue color filters R, G and B may be substantially equal to or different from each other.

Herein, examples of methods of manufacturing the red, green and blue color filters R, G, and B may include a method of manufacturing a dye type color filter and a method of manufacturing a pigment type color filter. Examples of the method of manufacturing a dye type color filter may include a dyeing method or a dye-dispersing method. Examples of the method of manufacturing a pigment type color filter may include a pigment dispersion method, a printing method, and an adhesive method.

Thereafter, the capping layer 230 may be formed on the red, green, and blue color filters R, G, and B and the third organic layer W3, and the common electrode 231 may be formed on the capping layer 230. In addition, the column spacer 232 may be formed on the common electrode 231.

FIGS. 15A to 15D are cross-sectional views illustrating a process of manufacturing a color filter according to another embodiment of the present inventive concept.

Figure 15A:
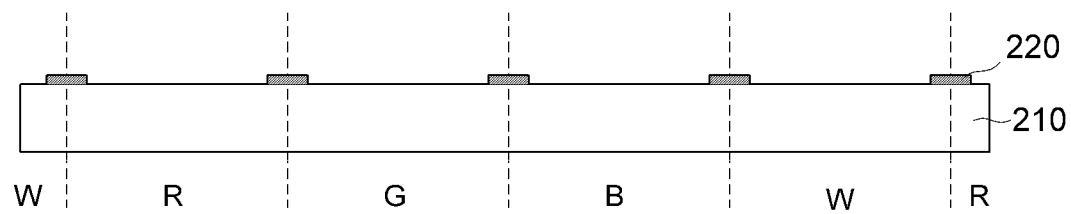
FIGS. 15A, 15B, 15C and 15D are cross-sectional views illustrating a process of manufacturing a color filter according to another embodiment of the present inventive concept.

Referring to FIG. 15A, the light blocking member 220 is formed on a surface of the second substrate 210. The light blocking member 220 may serve to partition the second substrate into the red, green, blue, and white display areas PX1, PX2, PX3, and PX4. Although not illustrated, an overcoat layer having a planar upper surface may be formed on the light blocking member 220.

Figure 15B:
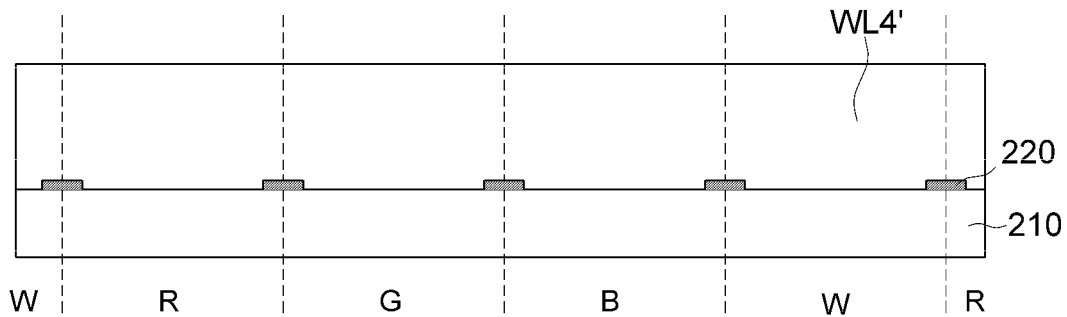

Referring to FIG. 15B, a light transmitting resin WL4' is coated over an entire surface of the second substrate 210 on which the light blocking member 220 is formed. Herein, the light transmitting resin WL4' may be a photosensitive polymer material or a negative photoresist that is photocurable. A thickness of the light transmitting resin WL4' is determined in consideration of the thickness $D_{W3}$ of the third organic layer W3.

Figure 15C:
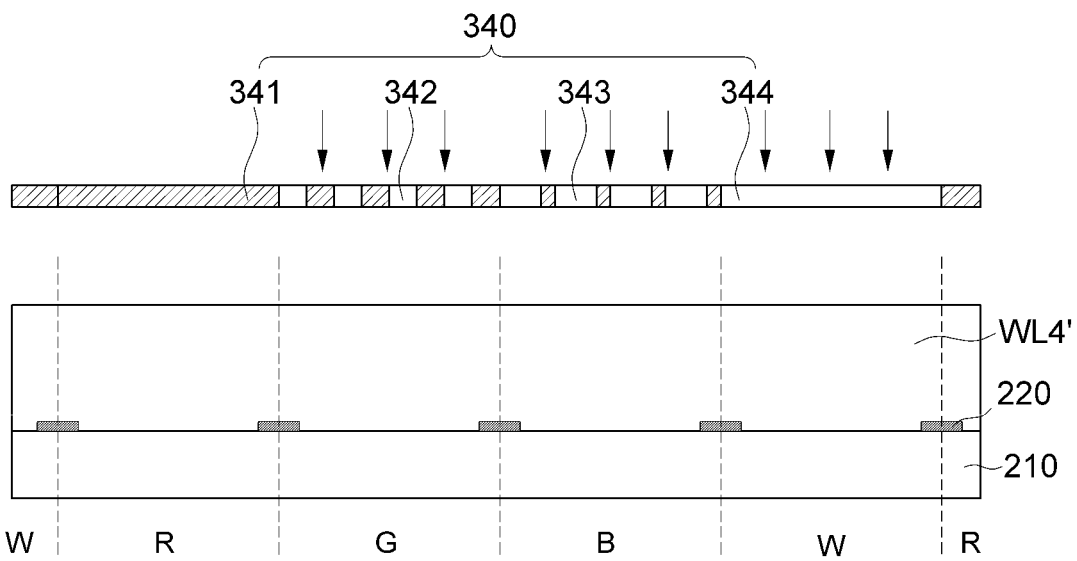

Referring to FIG. 15C, an exposure mask 340 for forming a pattern WL4 for the first, second, and third organic layers W1, W2, and W3 is placed on the light transmitting resin WL4' which is the negative photoresist in the embodiment. The exposure mask 340 is a half-tone mask having a transmissive area (opening) and a semi-transmissive area (slit opening). The exposure mask 340 includes an opening 344 corresponding to the W display area PX4, a first slit opening 343 corresponding to the B display area PX3, a second slit opening 342 corresponding to the G display area PX2, and a light blocking portion 311 corresponding to the R display area PX1. An aperture ratio (transmittance) of the first slit opening 342 is less than an aperture ratio (transmittance) of the second slit opening 343.

Figure 15D:
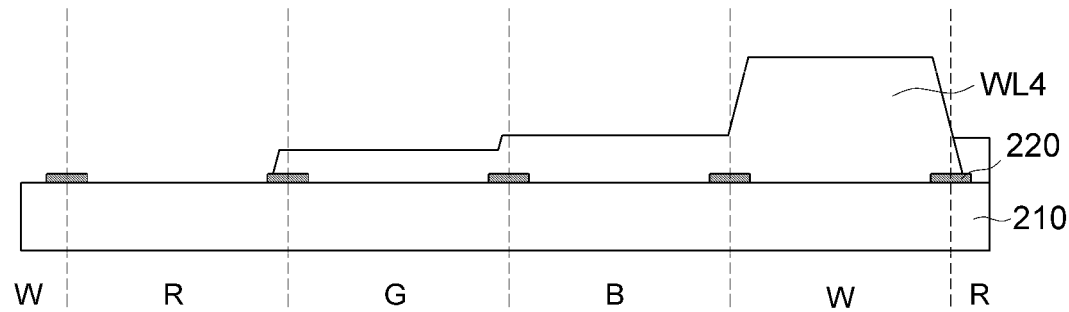

Referring to FIG. 15D, the pattern WL4 for the first, second, and third organic layers W1, W2, and W3 is substantially simultaneously formed by patterning the light transmitting resin WL4'.

In detail, the light transmitting resin WL4' is irradiated with a UV light using the exposure mask 340 to selectively expose the organic layer. In such an embodiment, since the light transmitting resin WL4' is of a negative type, a portion irradiated with light remains after development.

Accordingly, the third organic layer W3 having a greatest thickness is formed at the W display area PX4 that has a highest aperture ratio, the second thick organic layer W2 having a second greatest thickness is formed at the B display area PX3 having a second highest aperture ratio, the first thick organic layer W1 having a smallest thickness is formed at the G display area PX2 having a third highest aperture ratio, and no organic layer is formed at the R display area PX1 that is shielded.

Next, a predetermined cleaning process is performed on the resultant structure, and thus the first organic layer W1 having the thickness $D_{W1}$, the second organic layer W2 having the thickness $D_{W2}$, and the third organic layer W3 having the thickness $D_{W3}$ are formed substantially simultaneously.

In a case where the thicknesses $D_{W1}$ and $D_{W2}$ of the first organic layer W1 and the second organic layer W2 are substantially equal to each other, the aperture ratio of the first slit opening 342 and the aperture ratio of the second slit opening 343 may be substantially equal to each other.

Next, as illustrated in FIGS. 14E to 14G, the red, green and blue color filters R, G, and B are formed.

Figure 16A:
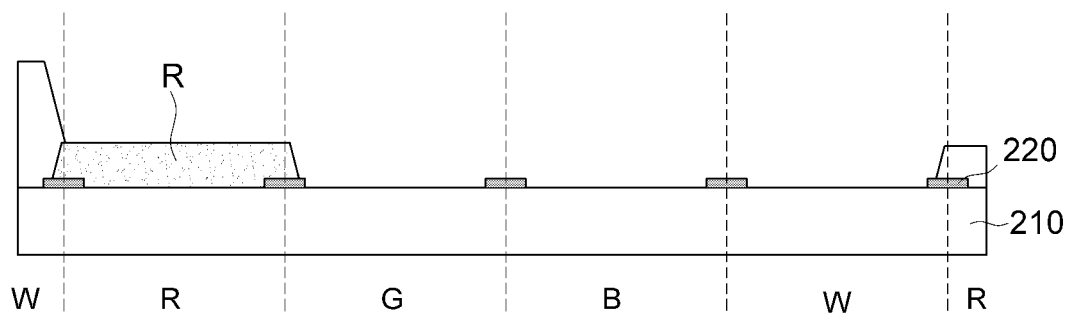
FIGS. 16A, 16B and 16C are cross-sectional views illustrating a process of manufacturing a color filter according to another embodiment of the present inventive concept.
Figure 16B:
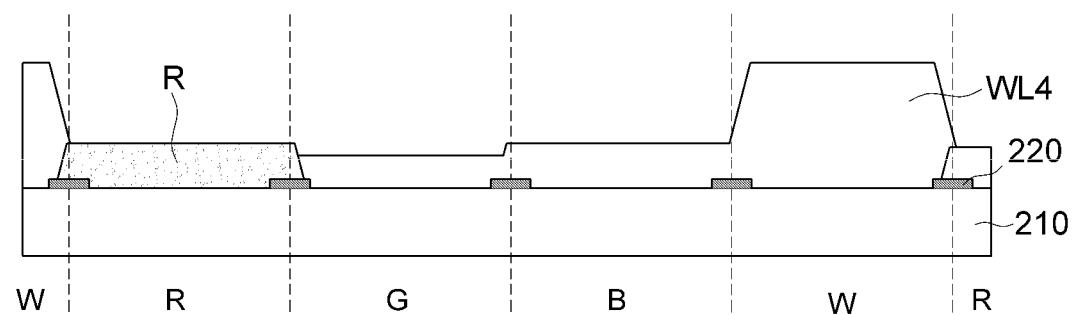

FIGS. 16A to 16B are cross-sectional views illustrating a process of manufacturing a color filter according to another embodiment of the present inventive concept.

Referring to FIG. 16A, the light blocking member 220 is formed on a surface of the second substrate 210, and the red color filter R is formed at the R display area PX1. The red color filter R may be formed through the process described in FIG. 14E.

Referring to FIG. 16B, the first organic layer W1 having the thickness $D_{W1}$, the second organic layer W2 having the thickness $D_{W2}$, and the third organic layer W2 having the thickness $D_{W3}$ are formed on the second substrate 210 on which the red color filter R is formed. The process of manufacturing the first, second, and third organic layers W1, W2, and W3 may employ the process described hereinabove with reference to FIGS. 14B to 14D, or the process described hereinabove with reference to FIGS. 15B to 15D.

Figure 16C:
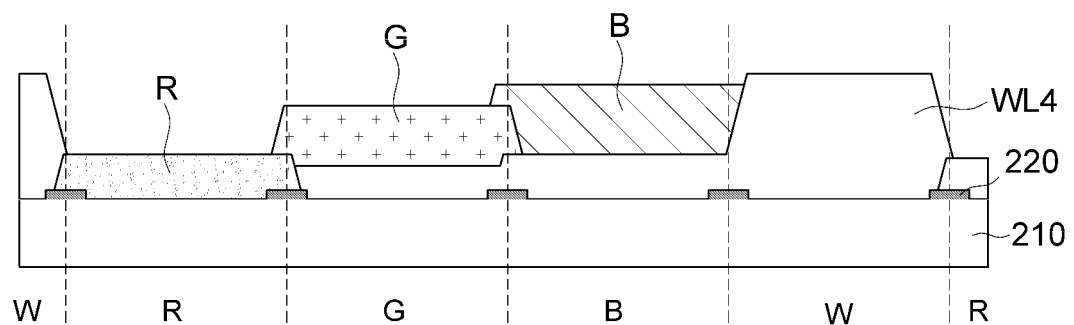

Referring to FIG. 16C, the green color filter G and the blue color filter B are formed on the first organic layer W1 and the second organic layer W2, respectively. The green color filter G and the blue color filter B may be formed through the processes described hereinabove with reference to FIGS. 14F to 14G.

Figure 17A:
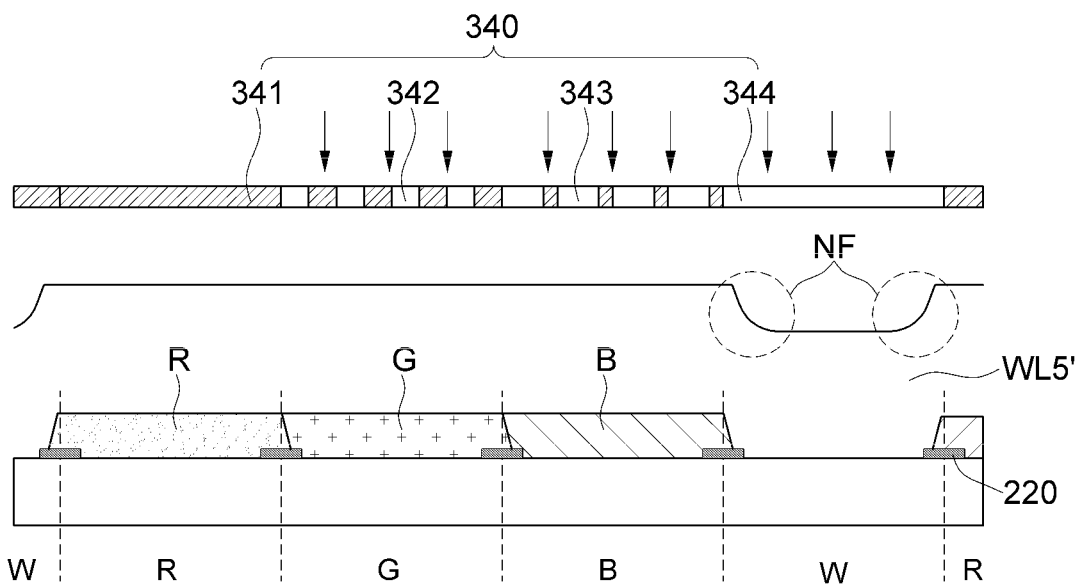
FIGS. 17A and 17B are cross-sectional views illustrating a process of manufacturing a color filter for comparison with an embodiment of the present inventive concept.
Figure 17B:
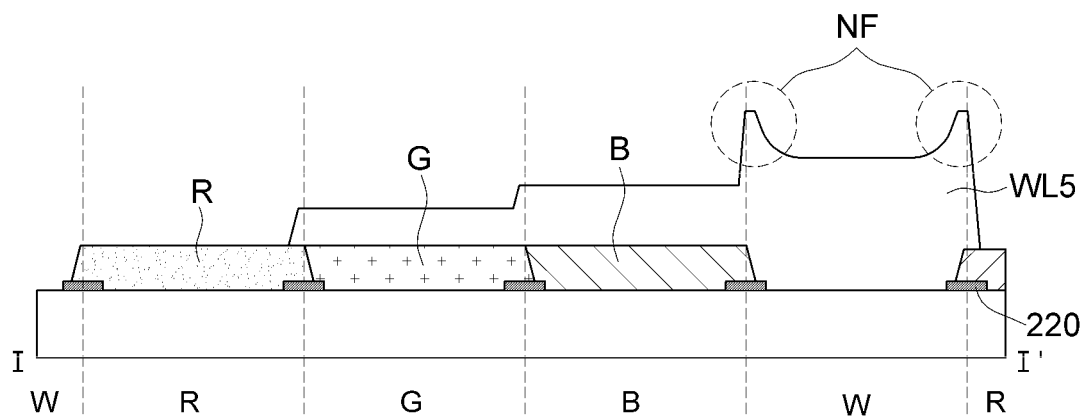

FIGS. 17A to 17B are cross-sectional views illustrating a process of manufacturing a color filter for comparison with an embodiment of the present inventive concept.

Referring to FIG. 17A, the light blocking member 220 is formed on a surface of the second substrate 210, and the red, green, and blue color filters R, G, and B are formed sequentially on the red, green, and blue display areas PX1, PX2, and PX3.

A light transmitting resin WL5' is coated over an entire surface of the second substrate 210 on which the red, green, and blue color filters R, G, and B are formed. Then, an exposure mask 340, as in FIG. 15C, for forming a pattern for the first, second, and third organic layers W1, W2, and W3 is placed on the light transmitting resin WL5'.

Referring to FIG. 17B, the pattern for the first, second, and third organic layers W1, W2, and W3 is substantially simultaneously formed by patterning the light transmitting resin WL5'.

However, when the light transmitting resin WL5' is coated on the second substrate 210 on which the red, green and blue color filters R, G and B are formed as illustrated in FIGS. 17A and 17B, a curved surface that is not flat may be formed at the W display area PX4 that is concave, due to the viscosity of the light transmitting resin WL5'. That is, due to a height difference between the second substrate 210 and the color filters R and B adjacent to the W display area PX4, it is difficult to apply the light transmitting resin WL5' to be flat at the W display area PX4. Accordingly, a portion of the upper surface of the third organic layer W3 that is formed by exposing the light transmitting resin WL5' may not be planar. Accordingly, a cell gap $G_W$ at the W display area PX4 is uneven, and the image quality of the LCD device may be degraded.

According to an embodiment of the present inventive concept, however, the first, second, and third organic layers for achieving multiple cell gaps are formed before forming the red, green, and blue color filters R, G, and B, so that each of the display areas PX1, PX2, PX3, and PX4 may have more uniform cell gaps $G_R$, $G_G$, $G_B$, and $G_W$.

Hereinafter, a reflective LCD device that has a color filter on array (COA) structure in which the color filters R, G, B, W1, W2, and W3 are disposed on the lower substrate (array substrate) 100 on which the thin film transistor TFT is formed will be descried with reference to FIGS. 18 to 31. Hereinafter, the description of the configuration described hereinabove with reference to FIGS. 1 to 17B will be omitted.

Figure 18:
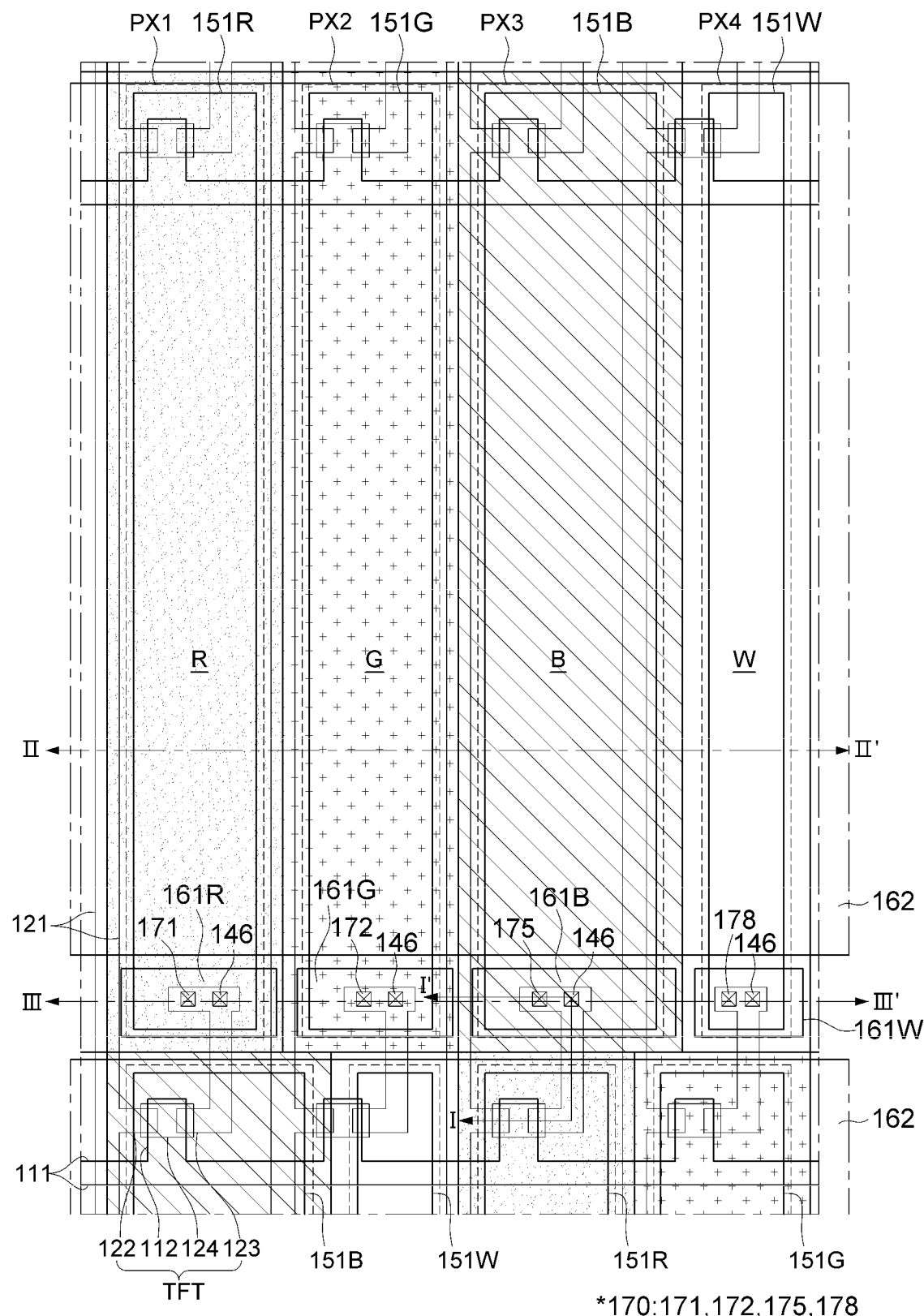
FIG. 18 is a plan view schematically illustrating a reflective LCD device according to an embodiment of the present inventive concept.
Figure 19A:
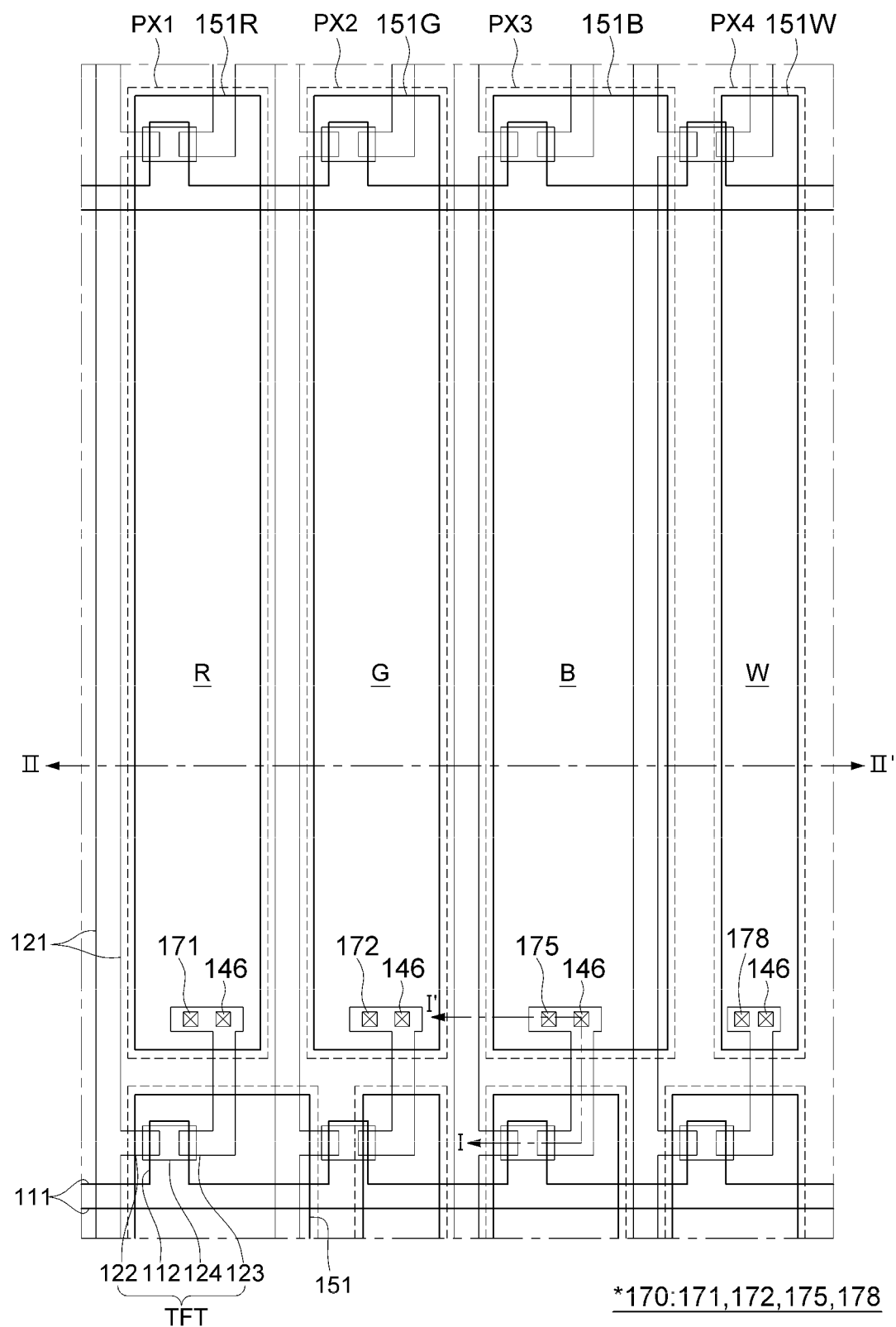
FIG. 19A is a plan view schematically illustrating a gate wiring, a data wiring, and a pixel electrode of a lower substrate (array substrate) of FIG. 18.
Figure 19B:
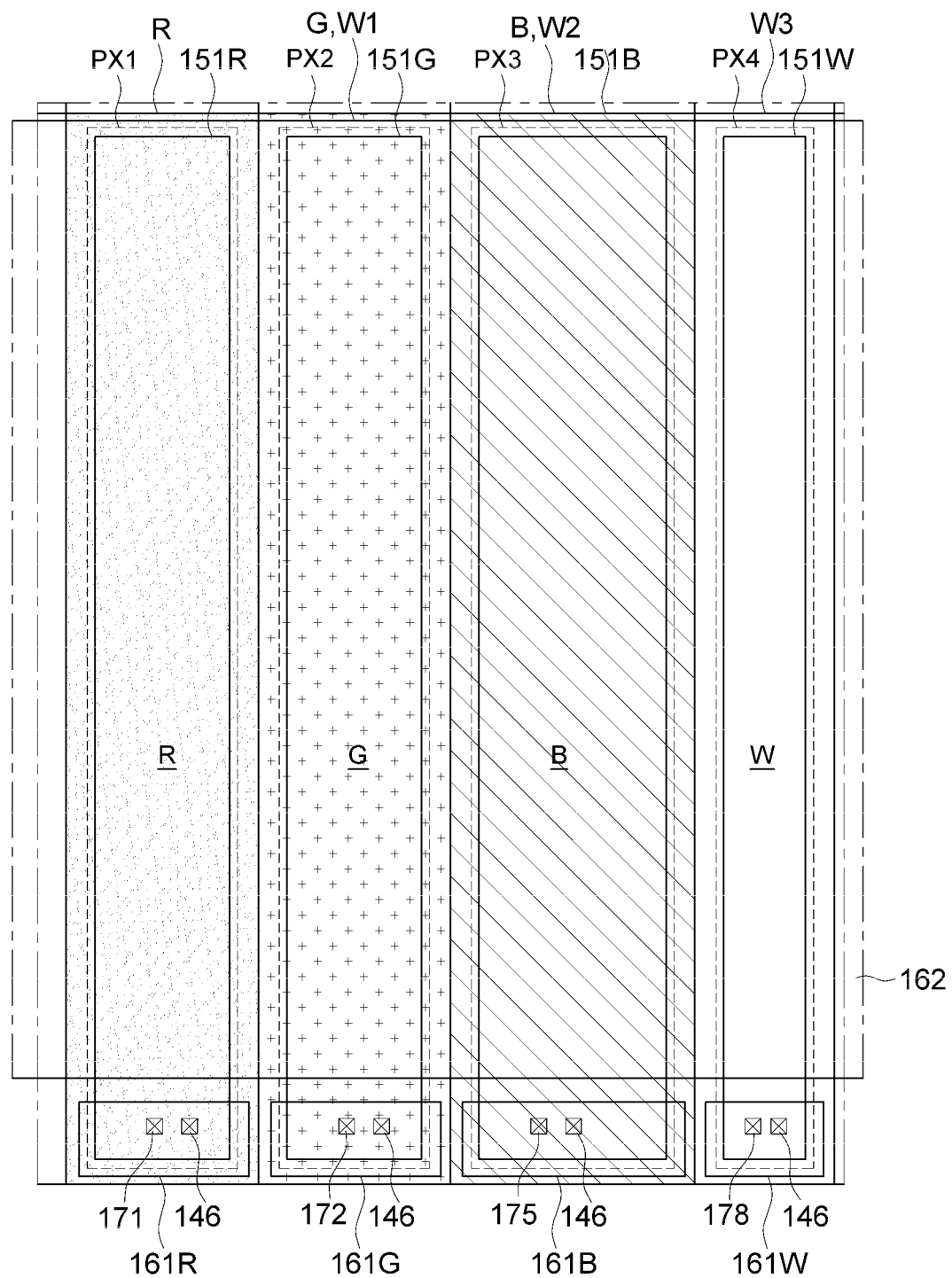
FIG. 19B is a plan view schematically illustrating a color filter, a pixel electrode, and a reflective layer of the lower substrate (array substrate) of FIG. 18.
Figure 20:
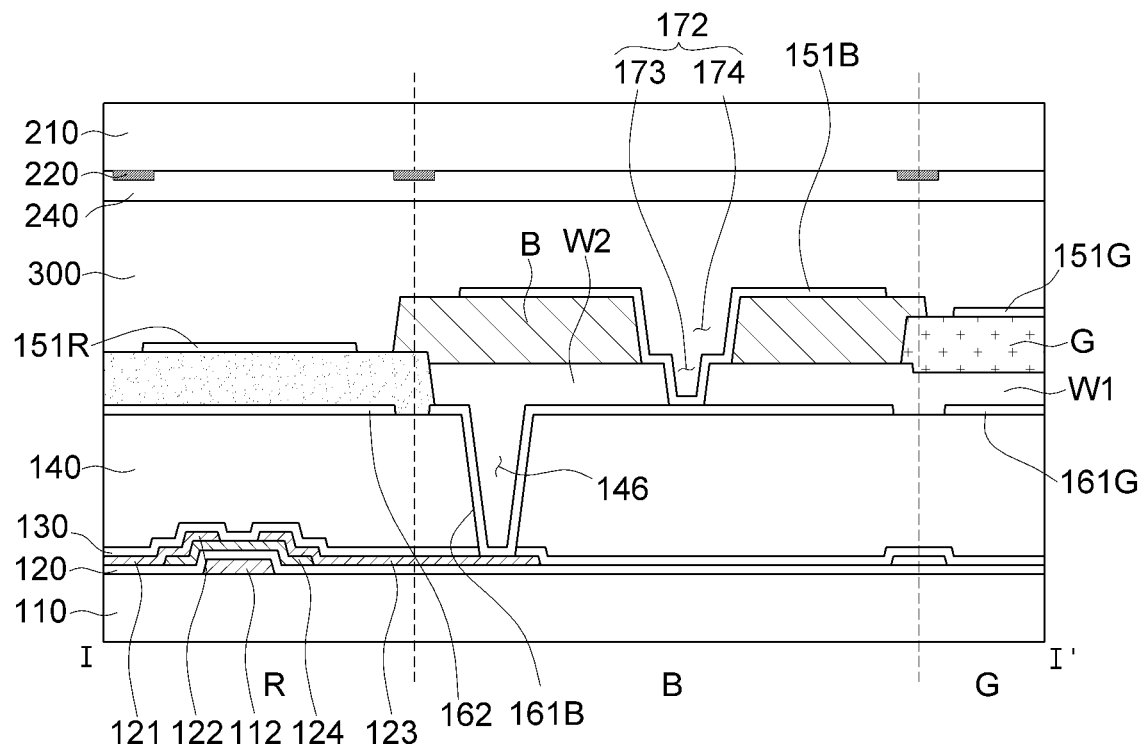
FIG. 20 is a cross-sectional view illustrating a display device taken along line I-I' in FIG. 18.
Figure 21:
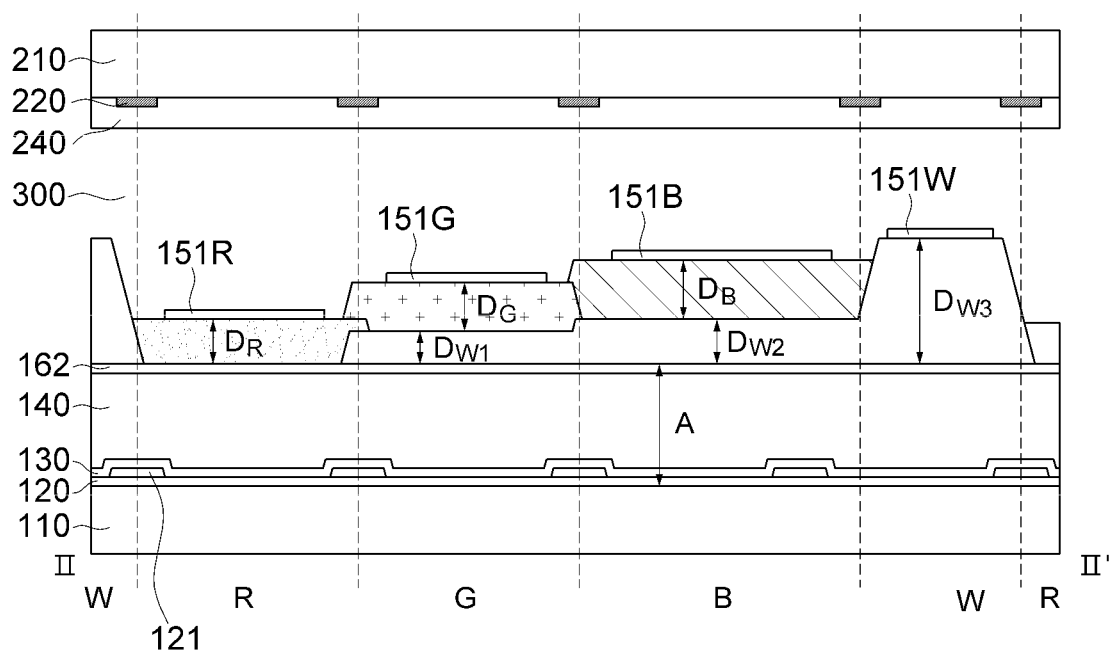
FIG. 21 is a cross-sectional view illustrating a display device taken along line II-II' in FIG. 18.
Figure 22:
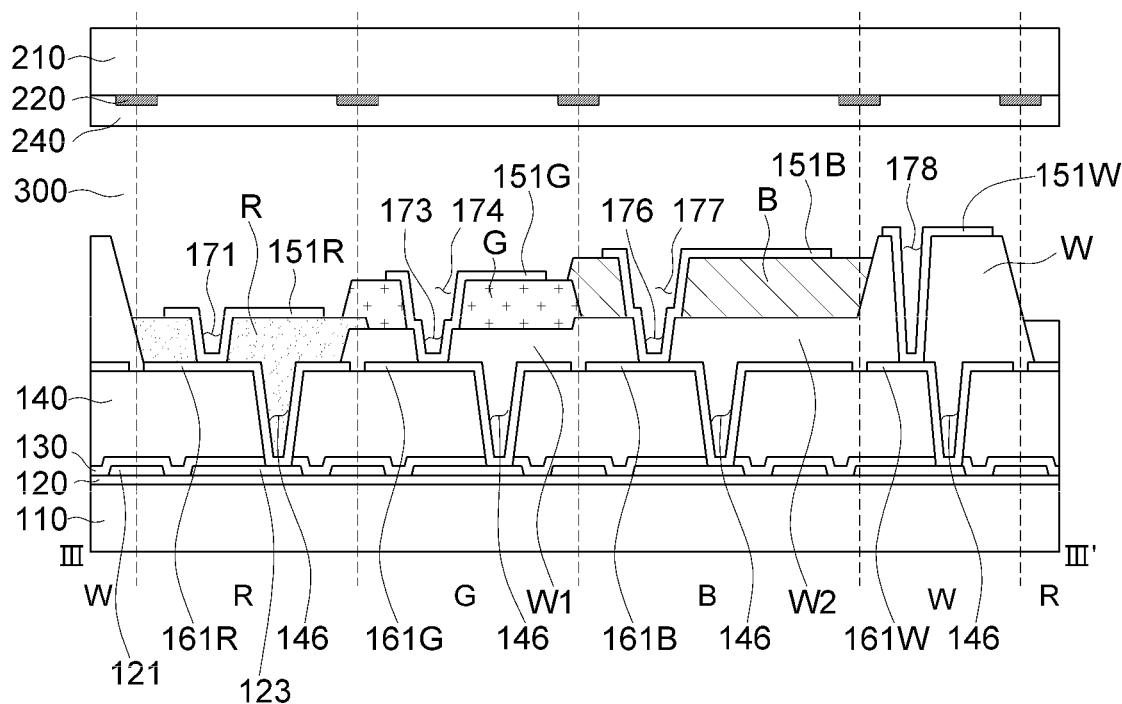
FIG. 22 is a cross-sectional view illustrating a display device taken along line III-III' in FIG. 18.

FIG. 18 is a plan view schematically illustrating a reflective LCD device according to an embodiment of the present inventive concept, FIG. 19A is a plan view schematically illustrating a gate wiring, a data wiring, and a pixel electrode of a lower substrate (array substrate) of FIG. 18, FIG. 19B is a plan view schematically illustrating a color filter, a pixel electrode, and a reflective layer of the lower substrate (array substrate) of FIG. 18, FIG. 20 is a cross-sectional view illustrating a display device taken along line I-I' in FIG. 18, FIG. 21 is a cross-sectional view illustrating a display device taken along line II-II' in FIG. 18, and FIG. 22 is a cross-sectional view illustrating a display device taken along line III-III' in FIG. 18.

Referring to FIGS. 18 to 22, a reflective LCD device according to an embodiment of the present inventive concept includes a lower substrate 110, an upper substrate 210 facing the lower substrate 210, and a liquid crystal layer 300 interposed between the lower substrate 110 and the upper substrate 210.

As described above, first, second, third, and fourth pixels PX1, PX2, PX3, and PX4 may be defined as an R display area PX1 outputting a red light R, a G display area PX2 outputting a green light G, a B display area PX3 outputting a blue light B, and a W display area PX4 outputting a white light W, respectively.

Referring to FIG. 18, the first, second, third, and fourth pixels or the R, G, B and W display areas PX1, PX2, PX3, and PX4 are disposed horizontally in parallel to each other in a same row (hereinafter, an upper row illustrated in FIG. 18 will be referred to as a first row). That is, the R, G, B and W display areas PX1, PX2, PX3, and PX4 may be arranged into a combination of one row and four columns, and this combination is repeated in the same row. The combination of the R, G, B and W display areas PX1, PX2, PX3, and PX4 in the first row and another combination of R, G, B and W display areas PX1, PX2, PX3, and PX4 in a row adjacent to and below the first row (hereinafter, a second row) are arranged alternately with each other as illustrated in FIGS. 11 and 12. The R, G, B and W display areas PX1, PX2, PX3, and PX4 of the first row are adjacent to the B, W, R and G display areas PX3, PX4, PX1 and PX2 of the second row, respectively.

When viewed in a plan view, an area of the B display area PX3 may be larger than an area of the R display area PX1, an area of the G display area PX2, and an area of the W display area PX4. When viewed in a plan view, the area of the R display area PX1 and the area of the G display area PX2 may be larger than the area of the W display area PX4. When viewed in a plan view, one of the combinations of the R, G, B and W display areas PX1, PX2, PX3, and PX4, the area of the R display area PX1 and the area of the G display area PX2 may be substantially equal to each other.

A first substrate 110, a plurality of gate wires 111 and 112, a plurality of data wires 121, 122, and 123, a thin film transistor, a passivation layer 130, a planarization layer 140, reflective layers 161 and 162, color filters R, G, B, W1, W2, and W3 and pixel electrodes 151R, 151G, 151B, and 151W may be disposed at the lower substrate 100.

The gate wires 111 and 112 may include a plurality of gate lines 111 and a plurality of gate electrodes 112. The data wires 121, 122, and 123 may include a plurality of data lines 121, a plurality of source electrodes 122, and a plurality of drain electrodes 123.

Referring to FIG. 18, the plurality of gate lines 111 are arranged at regular intervals in a vertical direction, and may extend in a horizontal direction. The gate wires 111 and 112 corresponding to or electrically connected to the display areas PX1, PX2, PX3, and PX4 of the first row may extend in the horizontal direction in the display areas PX1, PX2, PX3, and PX4 of the second row.

Referring to FIG. 18, the plurality of data lines 121 are arranged at regular intervals in the horizontal direction, and extend in the vertical direction. The data line 121 may extend along a vertical boundary between the R and G display areas PX1 and PX2, between the G and B display areas PX2 and PX3, and between the W and R display areas PX4 and PX1. The vertical boundary between the B display area PX3 and the W display area PX4 may be located between two adjacent data lines 121. The data line (the data line 121 corresponding to the W display area PX4) that extends along the vertical boundary between the R and G display areas PX1 and PX2 of the first row may be disposed in the B display area PX3 of the second row.

However, it should be understood that the above descriptions are merely given by way of example, and embodiments are not limited thereto. Each gate line 111 and each data line 121 may extend along boundaries of the display areas PX1, PX2, PX3, and PX4. The pixels (or display areas) PX1, PX2, PX3, and PX4 may be defined by areas surrounded by the gate lines 111 and the data lines 121. The pixels PX1, PX2, PX3, and PX4 defined by the plurality of gate lines 111 and the plurality of data lines 121 may have a constant/uniform size.

At least one gate electrode 112 is connected to each gate line 111 for each pixel.

At least one source electrode 122 is connected to each data line 121 for each pixel. The drain electrode 123 may be spaced apart from the source electrode 122 with respect to the semiconductor layer 124. The drain electrode 123 extends from the display areas PX1, PX2, PX3, and PX4 of the second row to the display areas PX1, PX2, PX3, and PX4 of the first row, and is connected to the reflective layer 161 through a contact hole 146 defined through the passivation layer 130 and the planarization layer 140.

A gate insulating layer 120 may be disposed between the gate wires 111 and 112 and the data wires 121, 122, and 123.

The semiconductor layer 124 may be disposed on the gate insulating layer 120 so as to overlap at least a portion of the gate electrode 112. The semiconductor layer 124 constitutes a thin film transistor TFT together with the gate electrode 112, the source electrode 122, and the drain electrode 123. The thin film transistor TFT electrically connected to the display areas PX1, PX2, PX3, and PX4 of the first row may be disposed at the display areas PX1, PX2, PX3, and PX4 of the second row adjacent to the first row.

When the gate electrode 111 receives a gate-on signal and a channel is formed at the semiconductor layer 124, the thin film transistor TFT is turned on, and the drain electrode 123 may receive a data signal from the source electrode 122 and transmit the data signal to the pixel electrodes 151R, 151G, 151B, and 151W through the reflective layer 161.

The passivation layer 130 is disposed on the data wires 121, 122, and 123 and an exposed portion of the semiconductor layer 124. The contact hole 146 may be defined at the passivation layer 130 and the planarization layer 140, to be described below, and expose at least a portion of the drain electrode 123. At least a portion of the drain electrode 123 that is exposed through the contact hole 146 may contact the reflective layer 161. Through the connection, the drain electrode 123 and the reflective layer 161 may be electrically connected to each other. However, the above description is merely given by way of example, and the passivation layer 130 may be omitted.

The planarization layer 140 may be disposed on the passivation layer 130. The planarization layer 140 has the contact hole 146 that exposes at least a portion of the drain electrode 123. The planarization layer 140 may be omitted (see FIG. 31).

The reflective layers 161 and 162 may be disposed on the planarization layer 140. The reflective layers 161 and 162 are disposed over the first substrate 110 and serve to reflect light incident from the outside. To this end, the reflective layers 161 and 162 may include metals having high reflectivity, e.g., a silver (Ag) or aluminum (Al) metal layer, but embodiments are not limited thereto. The reflective layers 161 and 162 may be formed by laminating two or more metal layers or reflective layers.

The reflective layers 161 and 162 include first reflective layers 161R, 161G, 161B, and 161W that connect the drain electrode 123 of each pixel to the pixel electrodes 151R, 151G, 151B, and 151W, respectively, and a second reflective layer 162 that is separated from the first reflective layers 161R, 161G, 161B, and 161W is disposed to overlap the thin film transistor TFT. The reflective layers 161 and 162 are planar in most of the display areas PX1, PX2, PX3, and PX4 except for the contact holes 146.

Part of the first reflective layers 161R, 161G, 161B, and 161W are also disposed in the contact holes 146. The part of the first reflective layers 161R, 161G, 161B, and 161W disposed in the contact holes 146 may contact the drain electrode 123 to be electrically connected thereto. The first reflective layers 161R, 161G, 161B, and 161W are electrically connected to the pixel electrodes 151R, 151G, 151B, and 151W of the display areas, respectively, through a contact hole 170 defined at the color filters R, G, B, W1, W2, and W3 to be described below.

The first reflective layers 161R, 161G, 161B, and 161W are spaced apart from each other in the horizontal direction. Vertical boundaries of the first reflective layers 161R, 161G, 161B, and 161W may correspond to vertical boundaries of the display areas PX1, PX2, PX3, and PX4, respectively. Lower sides of horizontal boundaries of the first reflective layers 161R, 161G, 161B, and 161W correspond to lower horizontal boundaries of the display areas PX1, PX2, PX3, and PX4, respectively, and upper sides thereof may be close to a lower horizontal boundary of the second reflective layer 162.

The second reflective layer 162 may extend in the horizontal direction across all display areas PX1, PX2, PX3, and PX4 located in a same row. One side of the horizontal boundaries of the second reflective layer 162 may be adjacent to the upper horizontal boundaries of the first reflective layers 161R, 161G, 161B, and 161W, and the other side of the horizontal boundaries of the second reflective layer 162 may correspond to upper horizontal boundaries of the display areas PX1, PX2, PX3, and PX4. The gate line 111 and the data line 121 are covered by the second reflective layer 162 so that the loss of the aperture ratio by the gate line 111 and the data line 121 may be substantially prevented or minimized.

A common voltage may be applied to the second reflective layer 162. In such an embodiment, a common electrode 231 (see FIG. 29) disposed on the second substrate 210 may be omitted. When the data voltage is applied to the pixel electrodes 151R, 151G, 151B, and 151W to be described below, an electric field is formed by the pixel electrodes 151R, 151G, 151B, and 151W together with the second reflective layer 162 to control the alignment direction of liquid crystal molecules included in the liquid crystal layer 300 (PLS mode). In such an embodiment, the common electrode 231 (see FIG. 29) may be disposed on the second substrate 210. When the data voltage is applied to the pixel electrodes 151R, 151G, 151B, and 151W, an electric field is formed by the pixel electrodes 151R, 151G, 151B, and 151W together with the common electrode 231 (see FIG. 5) to control the alignment direction of liquid crystal molecules included in the liquid crystal layer 300 (VA mode).

The color filters R, G, B, W1, W2, and W3 are disposed on the reflective layers 161 and 162.

Referring to FIGS. 18 to 22, in a planar structure, the red color filter G is disposed at the R display area PX1, the green color filter G and the first organic layer W1 are disposed at the G display area PX2, the blue color filter G and the second organic layer W2 are disposed at the B display area PX3, and the third organic layer W3 is disposed at the W display area PX4.

The color filters R, G, B and W3 at the display areas PX1, PX2, PX3, and PX4 are horizontally and/or vertically contact the color filters R, G, B and W3 at other display areas PX1, PX2, PX3, and PX4. In addition, boundaries of the display areas PX1, PX2, PX3, and PX4 may be defined by the light blocking member 220, and the boundaries of the color filters R, G, B and W3 may contact the light blocking member 220 in a plan view. The horizontal boundaries between the color filters R, G, B and W3 may not overlap the gate line 111. The vertical boundaries between the color filters R, G, B and W3 may overlap the data line 121 except the boundaries between the blue and white color filters B.

In a vertical structure, the red color filter G, the first organic layer W1, the second organic layer W2, and the third organic layer W3 are disposed on the reflective layers 161 and 162. The red color filter G, the first organic layer W1, the second organic layer W2, and the third organic layer W3 may also be disposed in the contact hole 146 defined at the planarization layer 140. The green color filter G is disposed on the first organic layer W1, and the blue color filter B is disposed on the second organic layer W2.

An opening or a contact hole (hereinafter, a contact hole 170) is defined at the color filters R, G, B, W1, W2, and W3 of each of the display areas PX1, PX2, PX3, and PX4 so that the first reflective layers 161R, 161G, 161B, and 161W are connected to the pixel electrodes 151R, 151G, 151B, and 151W, respectively. All the contact holes 170 may be defined at a substantially same time after all the color filters R, G, B, W1, W2, and W3 are patterned, or may be formed at the time of patterning each color filter.

Referring to FIGS. 18 to 19B, contact holes 171, 172, 175 and 178 are defined at the R, G, B and W display areas PX1, PX2, PX3, and PX4, respectively. The contact holes 171, 172, 175 and 178 defined at the color filters R, G, B, W1, W2, and W3 do not overlap the contact hole 146 defined at the planarization layer 140 in a plan view.

Referring to FIG. 22, the first reflective layer 161R of the R display area PX1 is connected to the pixel electrode 151R through the contact hole 171 defined at the red color filter R.

The contact hole 172 of the G display area PX2 includes a contact hole 173 defined at the first organic layer W1 and a contact hole 174 defined at the green color filter G. The contact hole 173 defined at the first organic layer W1 and the contact hole 174 defined at the green color filter G overlap each other. An area of the contact hole 173 defined at the first organic layer W1 may be larger or less than an area of the contact hole 174 defined at the green color filter G. The contact hole 173 defined at the first organic layer W1 and the contact hole 174 defined at the green color filter G overlap each other to expose the first reflective layer 161G at the G display area PX2. The exposed portion of the first reflective layer 161G at the G display area PX2 is connected to the pixel electrode 151G.

The contact hole 175 of the B display area PX3 includes a contact hole 176 defined at the second organic layer W2 and a contact hole 177 defined at the blue color filter B. The contact holes 176 defined at the second organic layer W2 and the contact holes 177 defined at the blue color filter B overlap each other. An area of the contact hole 176 defined at the second organic layer W2 may be larger or less than an area of the contact hole 177 defined at the blue color filter B. The contact hole 176 defined at the second organic layer W2 and the contact hole 177 defined at the blue color filter B overlap each other to expose the first reflective layer 161B of the B display area PX3. The exposed portion of the first reflective layer 161B at the B display area PX3 is connected to the pixel electrode 151B.

The first reflective layer 161W at the W display area PX4 is connected to the pixel electrode 151W through the contact hole 178 defined at the white color filter W3.

The pixel electrodes 151R, 151G, 151B, and 151W may be disposed on the red, green, blue, and white color filters R, G, B, and W3, respectively. The pixel electrodes 151R, 151G, 151B, and 151W may be disposed at the display area PX1, PX2, PX3, and PX4, respectively.

Each of the pixel electrodes 151R, 151G, 151B, and 151W may have a planar shape (VA mode, the common electrode 231 disposed on the second substrate 210) or a slit shape (PLS mode, the second reflective layer 162 serving as a common electrode).

To describe the slit shape more specifically, each of the pixel electrodes 151R, 151G, 151B, and 151W may have a plurality of line shape spaced apart from each other. For example, the pixel electrodes 151R, 151G, 151B, and 151W may include a linear stem electrode and a linear branch electrode. The stem electrode extends in one direction. In addition, the stem electrode is disposed substantially parallel to the gate line 111. One side of the stem electrode is connected to the drain electrode 123. The branch electrode protrudes from the stem electrode. Further, the branch electrode is disposed substantially parallel to the data line. The branch electrode may be provided in plural, and in such an embodiment, they may be spaced apart from each other along a longitudinal direction of the stem electrode.

The pixel electrodes 151R, 151G, 151B, and 151W may overlap the thin film transistor TFT. The pixel electrodes 151R, 151G, 151B, and 151W may have different areas corresponding to different areas of the color filters R, G, B, and W3, respectively.

However, it should be understood that the above descriptions are merely given by way of example embodiments are not limited thereto. For example, each of the pixel electrodes 151R, 151G, 151B, and 151W may have a substantially same shape and a substantially same size, as illustrated in FIG. 1. In addition, the pixel electrodes 151R, 151G, 151B, and 151W may have a substantially same shape and a substantially same size, irrespective of the sizes of the color filters R, G, B, and W3. In other words, when viewed from a plan view, the areas of the pixel electrodes 151R, 151G, 151B, and 151W arranged for each unit pixel may have a constant value.

Part of the pixel electrodes 151R, 151G, 151B, and 151W are also disposed in the contact hole 170 defined at the color filters R, G, B, W1, W2, and W3. The part of the pixel electrodes 151R, 151G, 151B, and 151W disposed at the contact hole 170 may contact the first reflective layer 161 and be electrically connected thereto.

When the data voltage is applied to the pixel electrodes 151R, 151G, 151B, and 151W, an electric field is formed by the pixel electrodes 151R, 151G, 151B, and 151W together with the second reflective layer 162 or the common electrode (not illustrated) disposed on the second substrate 210 to control the alignment direction of the liquid crystal molecules included in the liquid crystal layer 300.

The pixel electrodes 151R, 151G, 151B, and 151W may include a transparent conductive material such as ITO or IZO.

A capping layer (not illustrated, see 230 in FIG. 5) may be disposed between the color filters R, G, B, and W3 and the pixel electrodes 151R, 151G, 151B, and 151W.

The second substrate 210, the light blocking member 220, and the overcoat layer 240 may be disposed on the upper substrate 200.

The light blocking member 220 may be disposed at areas corresponding to the boundaries between each of the red color filters R, the green color filter, the blue color filter B, and the white color filter W3 disposed on the lower substrate 100. The light blocking member 220 may be disposed in a lattice shape including a vertical light blocking member and a horizontal light blocking member that crosses the vertical light blocking member at areas corresponding to the aforementioned boundaries. Each of the unit pixel areas PX1, PX2, PX3, and PX4 or each of the R, G, B and W display areas PX1, PX2, PX3, and PX4 may be defined by openings of the lattice-shaped blocking member 220. In an embodiment, the light blocking member 220 may be disposed on the reflective layers 161 and 162 of the first substrate 110.

An overcoat layer 240 may be disposed on the second substrate 210 and the light blocking member 220. The overcoat layer may serve to planarize an upper portion of the light blocking member 220.

The common electrode (see 231 in FIG. 5) may be disposed on the overcoat layer 240. The common electrode 231 may be electrically connected to the reflective layer 162 disposed on the lower substrate 100 which is disposed separately from the pixel electrodes 151R, 151G, 151B, and 151W.

A column spacer (not illustrated, see 232 in FIG. 5) may be formed on the overcoat layer 240.

An alignment layer (not illustrated) may be disposed both on one surface of the lower substrate 100 and on one surface of the upper substrate 200 that face the liquid crystal layer 300. That is, an alignment layer (not illustrated) that may align the liquid crystal layer 300 may be disposed on the pixel electrodes 151R, 151G, 151B, and 151W, the color filters R, G, B, and W3, the overcoat layer 240, and the column spacer (not illustrated).

The liquid crystal layer 300 including the liquid crystal molecules (not illustrated) having positive dielectric anisotropy or negative dielectric anisotropy may be interposed between the lower substrate 100 and the upper substrate 200.

The detailed structure of the color filters R, G, B, W1, W2, and W3 has been described above with reference to FIGS. 5 to 13, and thus a detailed description thereof will be omitted. For example, the thicknesses $D_R$, $D_G$, $D_B$, $D_{W1}$, $D_{W2}$ and $D_{W3}$ of the color filters R, G, B, W1, W2, and W3 described above with reference to FIGS. 5 to 10 may all be applicable to the present embodiment. In addition, the arrangements of the color filters R, G, B, and W3 described above with reference to FIGS. 11 and 12 may all be applicable to the present embodiment. In addition, the method of manufacturing the color filter described above with reference to FIGS. 14A to 16C may be applicable to the present embodiment.

At the G display area PX2, a lower surface of the first organic layer W1 contacts the reflective layers 161 and 162, and an upper surface thereof is substantially planar. Further, at the G display area PX2, a distance between the upper surface and the lower surface of the first organic layer W1, i.e., a thickness of the first organic layer W1, is $D_{W1}$. Similarly, at the B display area PX3, a lower surface of the second organic layer W2 contacts the reflective layers 161 and 162, and an upper surface thereof is substantially planar. Further, at the B display area PX3, a distance between the upper surface and the lower surface of the second organic layer W2, i.e., a thickness of the second organic layer W2, is $D_{W2}$. At the W display area PX4, a lower surface of the third organic layer W3 contacts the reflective layers 161 and 162, and an upper surface thereof is substantially planar. Further, at the W display area PX4, a distance between the upper surface and the lower surface of the third organic layer W3, i.e., a thickness of the third organic layer W3, is $D_{W3}$.

At the R display area PX1, a lower surface of the red color filter R contacts the reflective layers 161 and 162, and an upper surface thereof is substantially planar. Further, at the R display area PX1, a distance between the upper surface and the lower surface of the red color filter R, i.e., a thickness of the red color filter R, is $D_R$.

At the G display area PX2, a lower surface of the green color filter G contacts the upper surface of the first organic layer W1, and the upper surface thereof is substantially planar. Further, at the G display area PX2, a distance between the upper surface and the lower surface of the green color filter R, i.e., a thickness of the green color filter G, is $D_G$. At the B display area PX3, a lower surface of the blue color filter B contacts the upper surface of the second organic layer W2, and the upper surface thereof is substantially planar. Further, at the B display area PX3, a distance between the upper surface and the lower surface of the blue color filter R, i.e., a thickness of the blue color filter B, is $D_B$.

At each of the display areas PX1, PX2, PX3, and PX4, the lower surfaces of the red color filter R and the first, second, and third organic layers W1, W2, and W3 all contact the reflective layers 161 and 162. At each of the display areas PX1, PX2, PX3, and PX4, the lower surfaces of the red color filter R and the first, second, and third organic layers W1, W2, and W3 all have a substantially equal height from the first substrate 110. The lower surfaces of the red color filter R and the first, second, and third organic layers W1, W2, and W3 may be spaced apart from the reflective layers 161 and 162 at the display areas PX1, PX2, PX3, and PX4.

The thicknesses $D_R$, $D_G$, $D_B$, $D_{W1}$, $D_{W2}$ and $D_{W3}$ of the respective color filters R, G, B, W1, W2, and W3 may have various values.

Cell gaps $G_R$, $G_G$, $G_B$ and $G_W$ of the display areas PX1, PX2, PX3, and PX4 are defined as thicknesses of the liquid crystal layer 300 at the display areas PX1, PX2, PX3, and PX4, respectively. Accordingly, referring to FIG. 21, the cell gaps $G_R$, $G_G$, $G_B$, and $G_W$ of the display areas PX1, PX2, PX3, and PX4 may be defined as distances between an upper surface of the overcoat layer 240 and upper surfaces of the pixel electrodes 151R, 151G, 151B, and 151W at the display areas, respectively.

The overcoat layer 240 has a planar upper surface with a uniform height. Each of the pixel electrodes 151R, 151G, 151B, and 151W has height differences according to heights of the upper surfaces of the red, green, blue, and white color filters R, G, B, and W3.

Accordingly, differences between the cell gaps $G_R$, $G_G$, $G_B$, and $G_W$ of the display areas PX1, PX2, PX3, and PX4 are determined by differences between heights of the upper surfaces of the red, green, and blue color filters and the third organic layers R, G, B and W3. Accordingly, the differences between the cell gaps $G_R$, $G_G$, $G_B$, and $G_W$ of the display areas PX1, PX2, PX3, and PX4 are determined by differences between the respective thicknesses $D_R$, $D_G$, $D_B$, $D_{W1}$, $D_{W2}$, and $D_{W3}$ of the color filters R, G, B, W1, W2, and W3.

The respective thicknesses $D_R$, $D_G$, $D_B$, $D_{W1}$, $D_{W2}$ and $D_{W3}$ of the color filters R, G, B, W1, W2, and W3, the respective heights $D_R$, $D_G+D_{W1}$, $D_B+D_{W2}$, and $D_{W3}$ of the upper surfaces of the color filters R, G, B, and W3, and the respective cell gaps at the display areas PX1, PX2, PX3, and PX4 are as follow, which has been described above in detail with reference to FIGS. 5 to 10, and a description thereof will be omitted.

<See FIG. 5>

$$D_R=D_G=D_B$$

$$D_{W1}<D_{W2}<D_{W3}$$

$$D_R<D_G+D_{W1}<D_B+D_{W2}<D_{W3}$$

$$G_R>G_G>G_B>G_W$$

$G_R$, $G_G$, $G_B$ and $G_W$ are about 2.8 μm, about 2.3 μm, about 2.15 μm, and about 2.0 μm, respectively.

<See FIG. 6>

$$D_R=D_G=D_B$$

$$D_{W1}<D_{W2}<D_{W3}$$

$$D_R<D_{W3}=D_G+D_{W1}<D_B+D_{W2}$$

$$G_R>G_G=G_W>G_B$$

$G_R$, $G_G$, $G_B$ and $G_W$ are about 2.8 μm, about 2.3 μm, about 2.15 μm, and about 2.3 μm, respectively.

<See FIG. 7>

$$D_{W1}=D_{W2}$$

$$D_R=D_G=D_B$$

$$D_R<D_G+D_{W1}=D_B+D_{W2}<D_{W3}$$

$$G_R>G_G=G_B>G_W$$

$G_R$, $G_G$, $G_B$ and $G_W$ are about 2.8 μm, about 2.3 μm, about 2.3 μm, and about 2.0 μm, respectively.

<See FIG. 8>

$$D_{W1}=D_{W2}$$

$$D_R=D_G=D_B$$

$$D_R<D_{W3}<D_G+D_{W1}=D_B+D_{W2}$$

$$G_R>G_W>G_G=G_B$$

$G_R$, $G_G$, $G_B$ and $G_W$ are about 2.8 µm, about 2.3 µm, about 2.3 µm, and about 2.5 µm, respectively.

<See FIG. 9>

$$D_{W1}=D_{W2}$$

$$D_R=D_G<D_B$$

$$D_R<D_G+D_{W1}<D_B+D_{W2}<D_{W3}$$

$$G_R>G_G>G_B>G_W$$

$G_R$, $G_G$, $G_B$ and $G_W$ are about 2.8 µm, about 2.3 µm, about 2.15 µm, and about 2.0 µm, respectively.

<See FIG. 10>

The heights of the upper surfaces of the color filters R, G, B, and W3 are $A+D_R$, $A+D_G+D_{W1}$, $A+D_B+D_{W2}$, $A+D_{W3}$, respectively. In addition, the thicknesses $D_R$, $D_G$, $D_B$, $D_{W1}$, $D_{W2}$ and $D_{W3}$ of the color filters R, G, B, W1, W2, and W3 and the cell gaps of the display areas PX1, PX2, PX3, and PX4 are substantially the same as those in embodiments described above.

Figure 23:
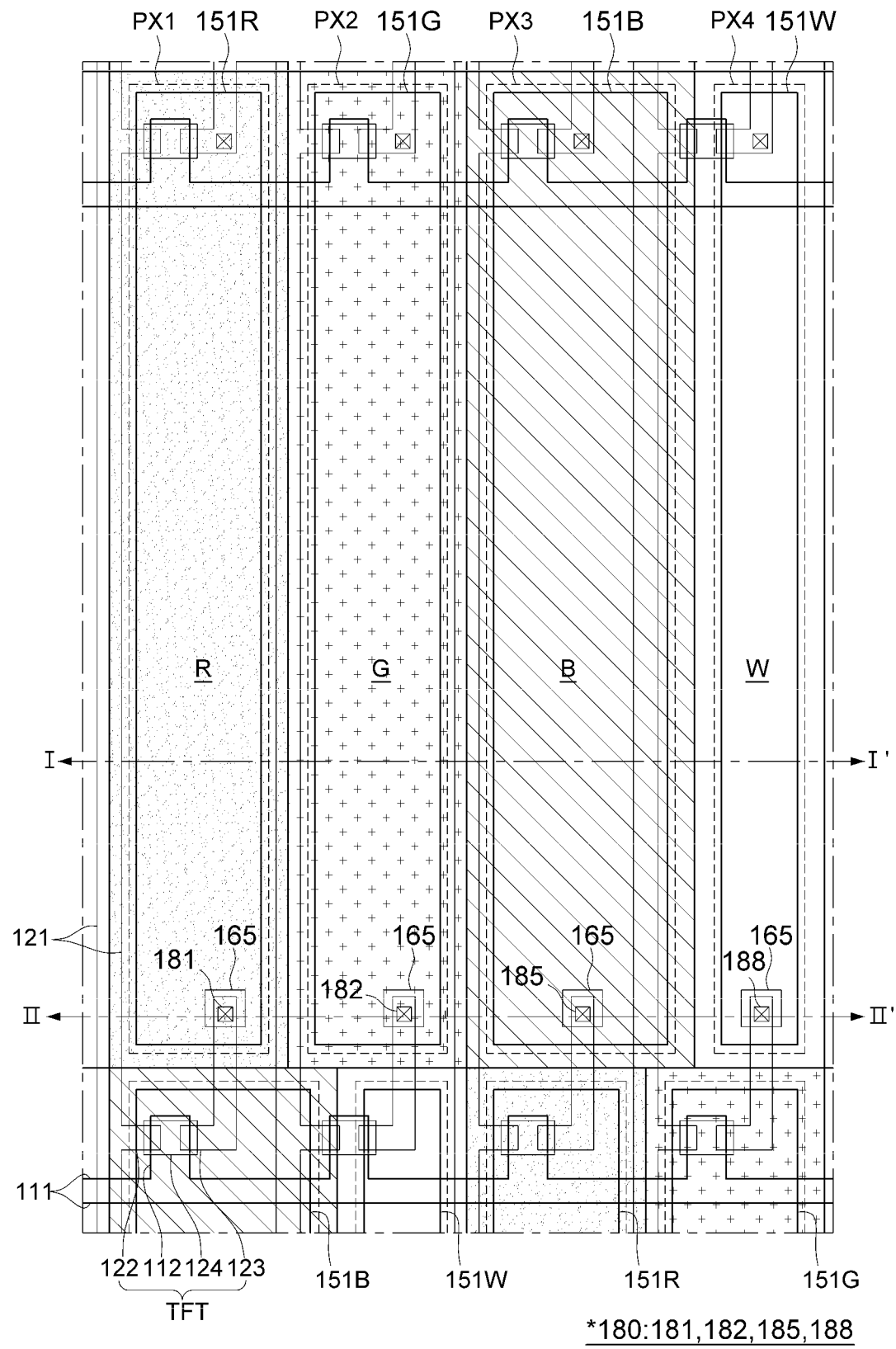
FIG. 23 is a plan view schematically illustrating a reflective LCD device according to an embodiment of the present inventive concept.
Figure 24A:
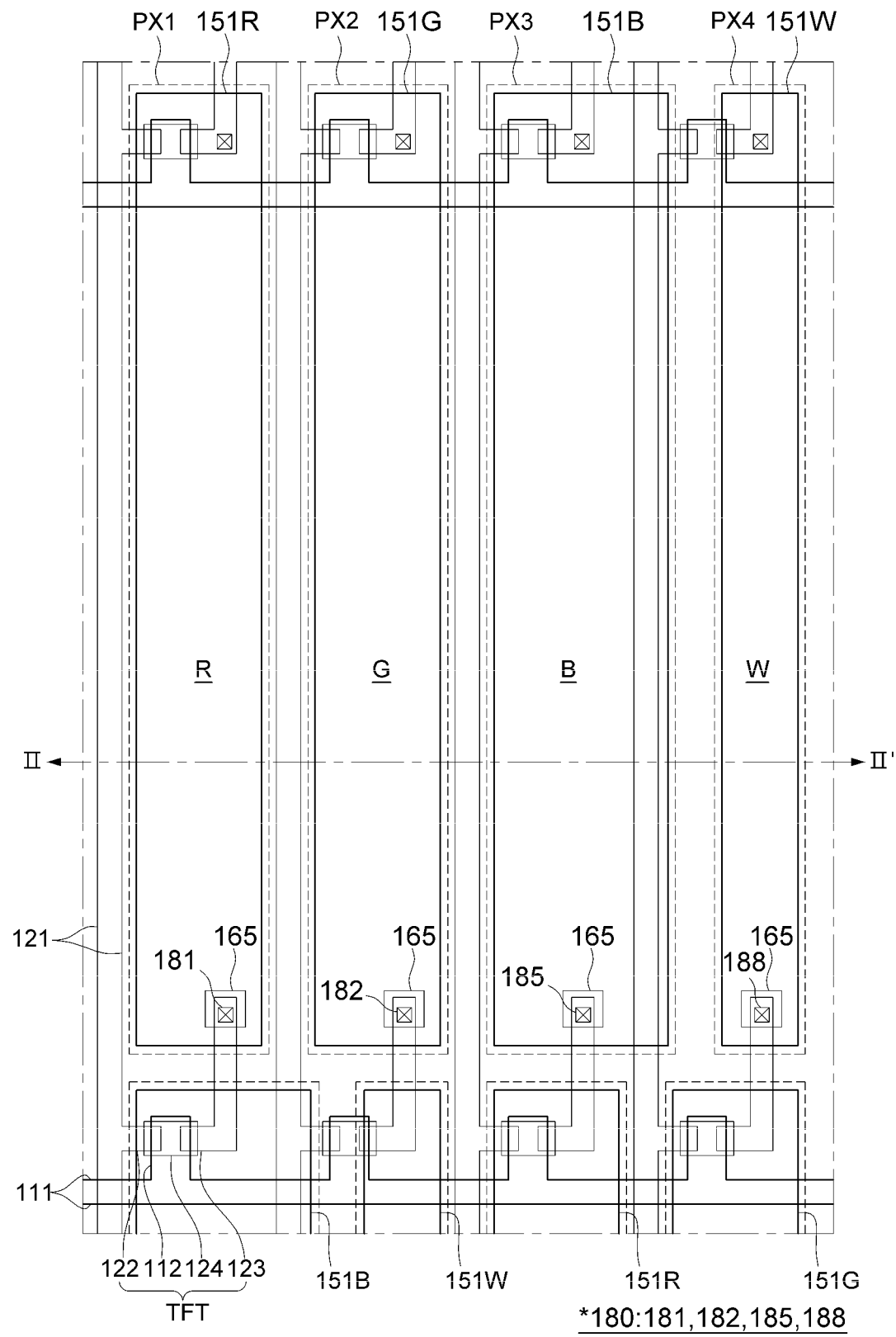
FIG. 24A is a plan view schematically illustrating a gate wiring, a data wiring, and a pixel electrode of a lower substrate (array substrate) of FIG. 23.
Figure 24B:
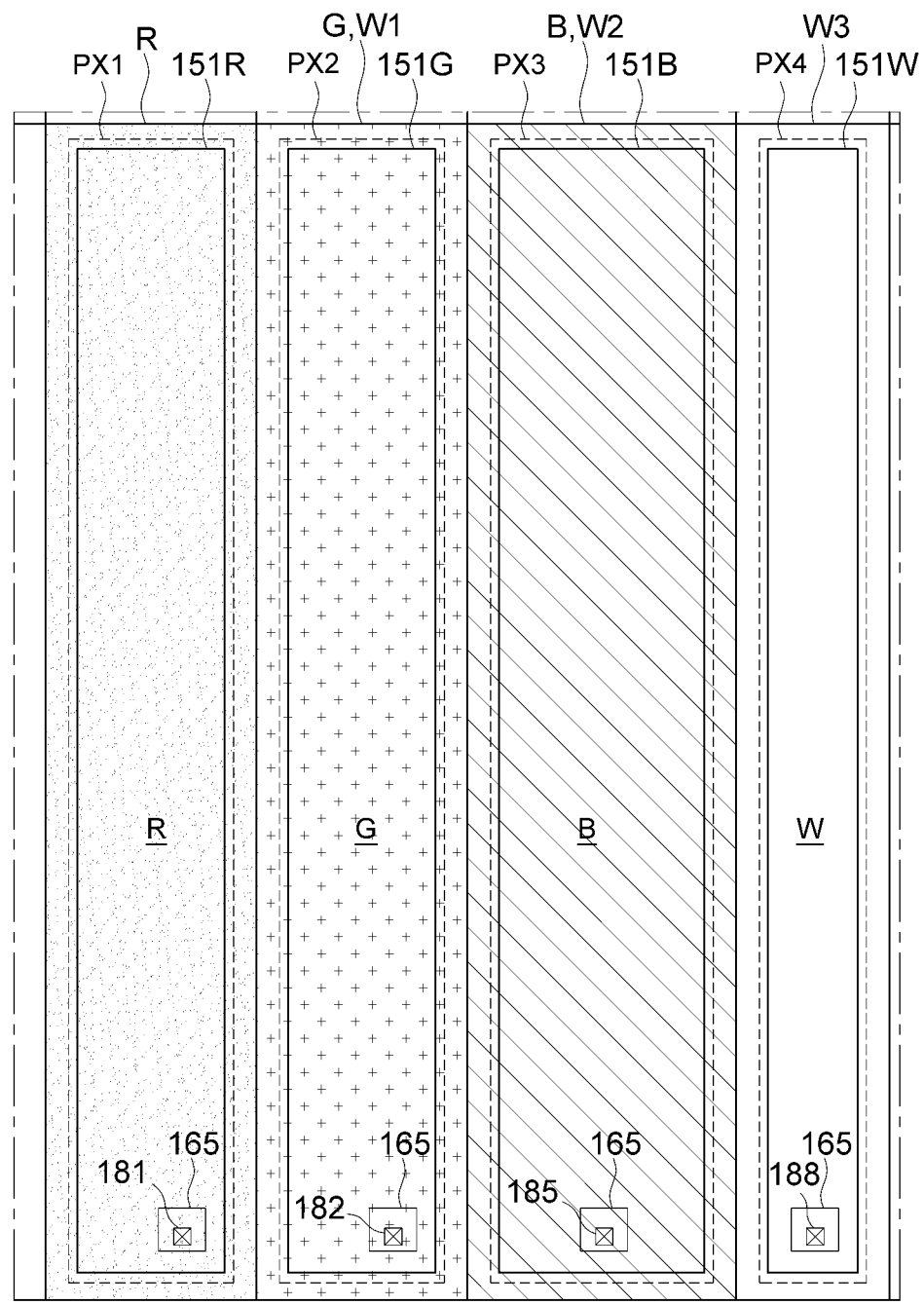
FIG. 24B is a plan view schematically illustrating a color filter, a pixel electrode, and a reflective layer of the lower substrate (array substrate) of FIG. 23.
Figure 25:
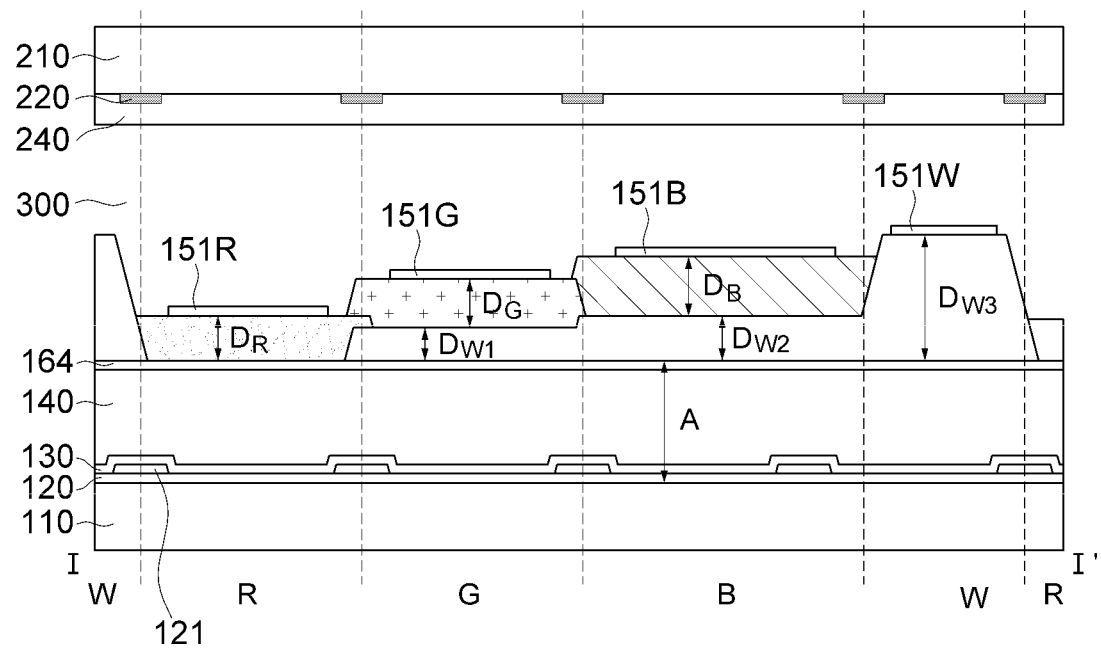
FIG. 25 is a cross-sectional view illustrating a display device taken along line I-I' in FIG. 23.
Figure 26:
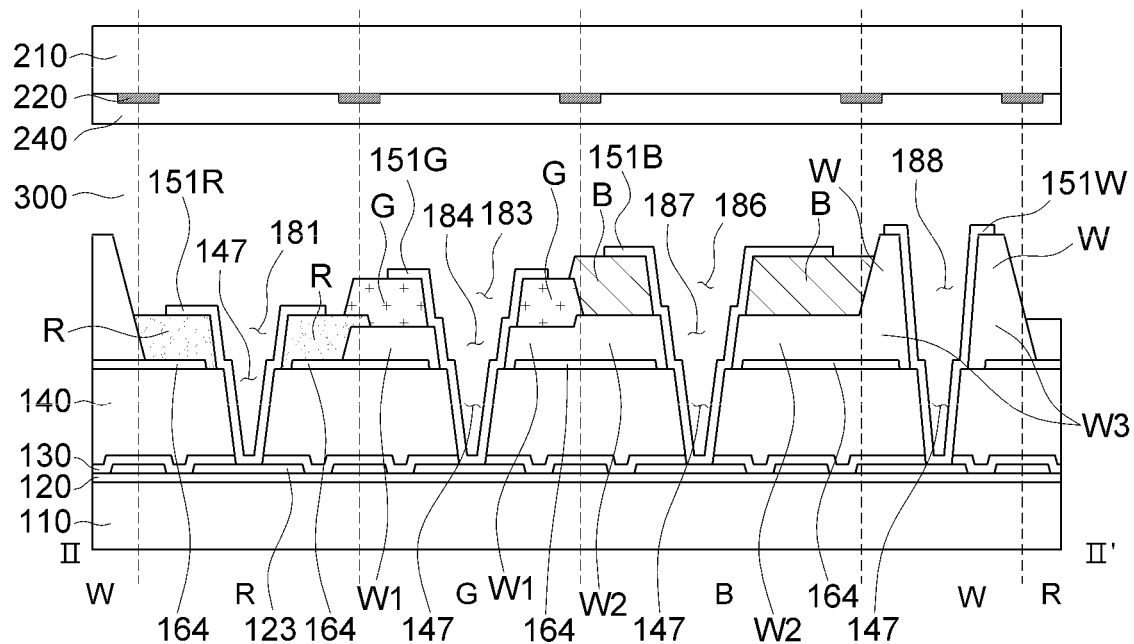
FIG. 26 is a cross-sectional view illustrating a display device taken along line II-II' in FIG. 23.

FIG. 23 is a plan view schematically illustrating a reflective LCD device according to an embodiment of the present inventive concept, FIG. 24A is a plan view schematically illustrating a gate wiring, a data wiring, and a pixel electrode of a lower substrate (array substrate) of FIG. 23, FIG. 24B is a plan view schematically illustrating a color filter, a pixel electrode, and a reflective layer of the lower substrate (array substrate) of FIG. 23, FIG. 25 is a cross-sectional view illustrating a display device taken along line I-I' in FIG. 23, and FIG. 26 is a cross-sectional view illustrating a display device taken along line II-II' in FIG. 23.

Description of the same configuration as that of an embodiment described above with reference to FIGS. 18 to 22 will be omitted.

Referring to FIGS. 23 to 26, a first substrate 110, a plurality of gate wires 111 and 112, a gate insulating layer 120, a plurality of data wires 121, 122, and 123, a thin film transistor TFT, a passivation layer 130, a planarization layer 140, a reflective layer 164, color filters R, G, B, W1, W2, and W3 and pixel electrodes 151R, 151G, 151B, and 151W may be disposed at a lower substrate 100.

When the gate electrode 111 receives a gate-on signal and a channel is formed at the semiconductor layer 124, the thin film transistor TFT is turned on, and the drain electrode 123 may receive a data signal from the source electrode 122 and transmit the data signal to the pixel electrodes 151R, 151G, 151B, and 151W through a contact hole 180 defined at the passivation layer 130, the planarization layer 140 and the color filters R, G, B, W1, W2, and W3.

The contact hole 180 is defined in an opening 165 of the reflective layer 164 to be described below and an exposed portion of the drain electrode 123 does not contact the reflective layer 164.

The planarization layer 140 has a contact hole 147 that exposes at least a portion of the drain electrode 123.

The reflective layer 164 is disposed on the planarization layer 140.

The reflective layer 164 may have an opening 165 for connection between the pixel electrodes 151R, 151G, 151B, and 151W and the drain electrode 123. The opening 165 of the reflective layer 164 may be defined for each of the display areas PX1, PX2, PX3, and PX4. A size of the opening 165 may be larger than a size of a contact hole 147 defined at the planarization layer 140. In such an embodiment, as illustrated in FIG. 24B, the contact hole 147 may be located in the opening 165 defined at the reflection layer 164. The reflective layer 164 may be unitarily formed throughout the entire display areas PX1, PX2, PX3, and PX4 except for the aforementioned opening 165.

A common voltage may be applied to the reflective layer 164. In such an embodiment, the common electrode 231 on the second substrate 210 may be omitted (PLS mode). Alternatively, the reflective layer 164 may be floated. In such an embodiment, the common electrode (see 231 in FIG. 29) may be provided on the second substrate 210 (VA mode).

The color filters R, G, B, W1, W2, and W3 are disposed on the reflective layer 164.

Similarly to FIGS. 18 to 22, in a planar structure, the red color filter G is disposed at the R display area PX1, the green color filter G and the first organic layer W1 are disposed at the G display area PX2, the blue color filter G and the second organic layer W2 are disposed at the B display area PX3, and the third organic layer W3 is disposed at the W display area PX4.

In a vertical structure, the red color filter G, the first organic layer W1, the second organic layer W2, and the third organic layer W3 are disposed on the reflective layer 164. The green color filter G is disposed on the first organic layer W1, and the blue color filter B is disposed on the second organic layer W2.

A contact hole 180 is defined at the color filters R, G, B, W1, W2, and W3 of the display areas PX1, PX2, PX3, and PX4, and the contact hole 180 overlaps the contact hole 147 defined at the planarization layer 140. All the contact holes 147 and 180 may be defined at a substantially same time after all of the color filters R, G, B, W1, W2, and W3 are patterned, or may be formed at the time of patterning each color filter.

Referring to FIG. 26, contact holes 181, 182, 185, and 188 are defined at the red, green, blue, and white display areas PX1, PX2, PX3, and PX4, respectively. The contact holes 181, 182, 185, and 188 defined at the color filters R, G, B, W1, W2, and W3 overlap the contact hole 147 defined at the planarization layer 140 in a plan view.

Referring to FIG. 26, the pixel electrode 151R of the R display area PX1 is connected to the drain electrode 123 through the contact hole 147 defined at the passivation layer 130 and the planarization layer 140 and the contact hole 181 defined at the red color filter R. The contact hole 147 defined at the planarization layer 140 may be larger or less than the contact hole 181 defined at the red color filter R. The contact hole 181 defined at the red color filter R is less than the opening 165, and accordingly, the reflective layer 164 of the R display area PX1 is not exposed.

The contact hole 182 of the G display area PX2 includes a contact hole 183 defined at the green color filter G and a contact hole 184 defined at the first organic layer W1. The contact hole 183 defined at the green color filter G, the contact hole 184 defined at the first organic layer W1, and the contact hole 147 defined at the planarization layer 140 overlap each other, and expose the drain electrode 123. The pixel electrode 151G of the G display area PX2 is connected to an exposed portion of the drain electrode 123 through the contact holes 147, 183 and 184 that overlap each other. The contact hole 184 defined at the first organic layer W1 or the contact hole 183 defined at the green color filter G is less than the opening 165, and thus the reflective layer 164 of the G display area PX2 is not exposed.

The contact hole 185 of the B display area PX3 includes a contact hole 187 defined at the second organic layer W2 and a contact hole 186 defined at the blue color filter B. The contact hole 187 defined at the second organic layer W2, the contact hole 186 defined at the blue color filter B and the contact holes 147 defined at the passivation layer 130 and the planarization layer 140 overlap each other, and exposes the drain electrode 123. The pixel electrode 151G of the blue display area PX2 is connected to an exposed portion of the drain electrode 123 through the contact holes 147, 186 and 187 that overlap each other. The contact hole 187 defined at the second organic layer W2 or the contact hole 186 defined at the blue color filter B is less than the opening 165, and accordingly, the reflective layer 164 of the B display area PX3 is exposed is not exposed.

The contact hole 188 defined at the third organic layer W3 and the contact hole 147 defined at the passivation layer 130 and the planarization layer 140 overlap each other, and expose the drain electrode 123. The pixel electrode 151W of the W display area PX4 is connected to an exposed portion of the drain electrode 123 through the contact holes 147 and 188 that overlap each other. The contact hole 187 defined at the third organic layer W3 is less than the opening 165, and accordingly, the reflective layer 164 of the white display area PX3 is not exposed.

Part of the pixel electrodes 151R, 151G, 151B, and 151W are also disposed in the contact hole 147 of the planarization layer 140 and the contact hole 180 of the color filters R, G, B, W1, W2, and W3 that overlap each other. The part of the pixel electrodes 151R, 151G, 151B, and 151W disposed in the contact holes 147 and 180 may contact the drain electrode 123 and be electrically connected thereto.

A common voltage may be applied to the reflective layer 164. In such an embodiment, the common electrode (see 231 in FIG. 29) disposed on the second substrate 210 may be omitted. As described above, when the data voltage is applied to the slit-shaped pixel electrodes 151R, 151G, 151B, and 151W, an electric field is formed by the pixel electrodes 151R, 151G, 151B, and 151W together with the second reflective layer 164 to control the alignment direction of liquid crystal molecules included in the liquid crystal layer 300 (PLS mode). Alternatively, the reflective layer 164 may be floated. In such an embodiment, the common electrode (see 231 in FIG. 29) may be provided on the second substrate 210 (VA mode). When the data voltage is applied to the pixel electrodes 151R, 151G, 151B, and 151W, an electric field is formed by the pixel electrodes 151R, 151G, 151B, and 151W together with the common electrode (see 231 in FIG. 29) to control the alignment direction of the liquid crystal molecules included in the liquid crystal layer 300 (VA mode).

A second substrate 210, a light blocking member 220, and an overcoat layer 240 may be disposed on the upper substrate 200.

The respective thicknesses $D_R$, $D_G$, $D_B$, $D_{W1}$, $D_{W2}$ and $D_{W3}$ of the color filters R, G, B, W1, W2, and W3, the respective heights $D_R$, $D_G+D_{W1}$, $D_B+D_{W2}$, and $D_{W3}$ of the upper surfaces of the color filters R, G, B, and W3, and the respective cell gaps at the display areas PX1, PX2, PX3, and PX4 are substantially the same as those in an embodiment described with reference to FIGS. 18 to 22.

Figure 27:
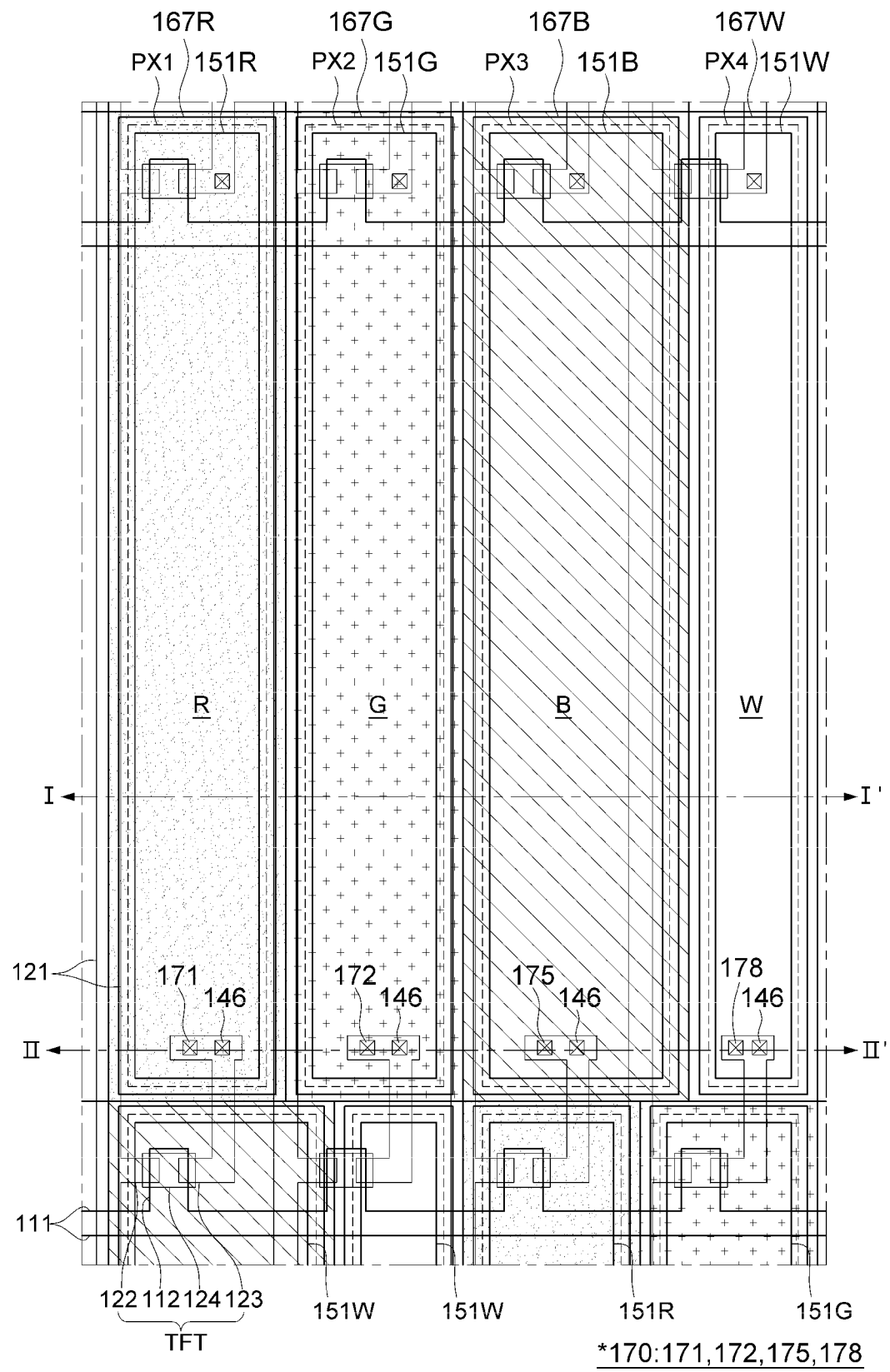
FIG. 27 is a plan view schematically illustrating a reflective LCD device according to an embodiment of the present inventive concept.
Figure 28A:
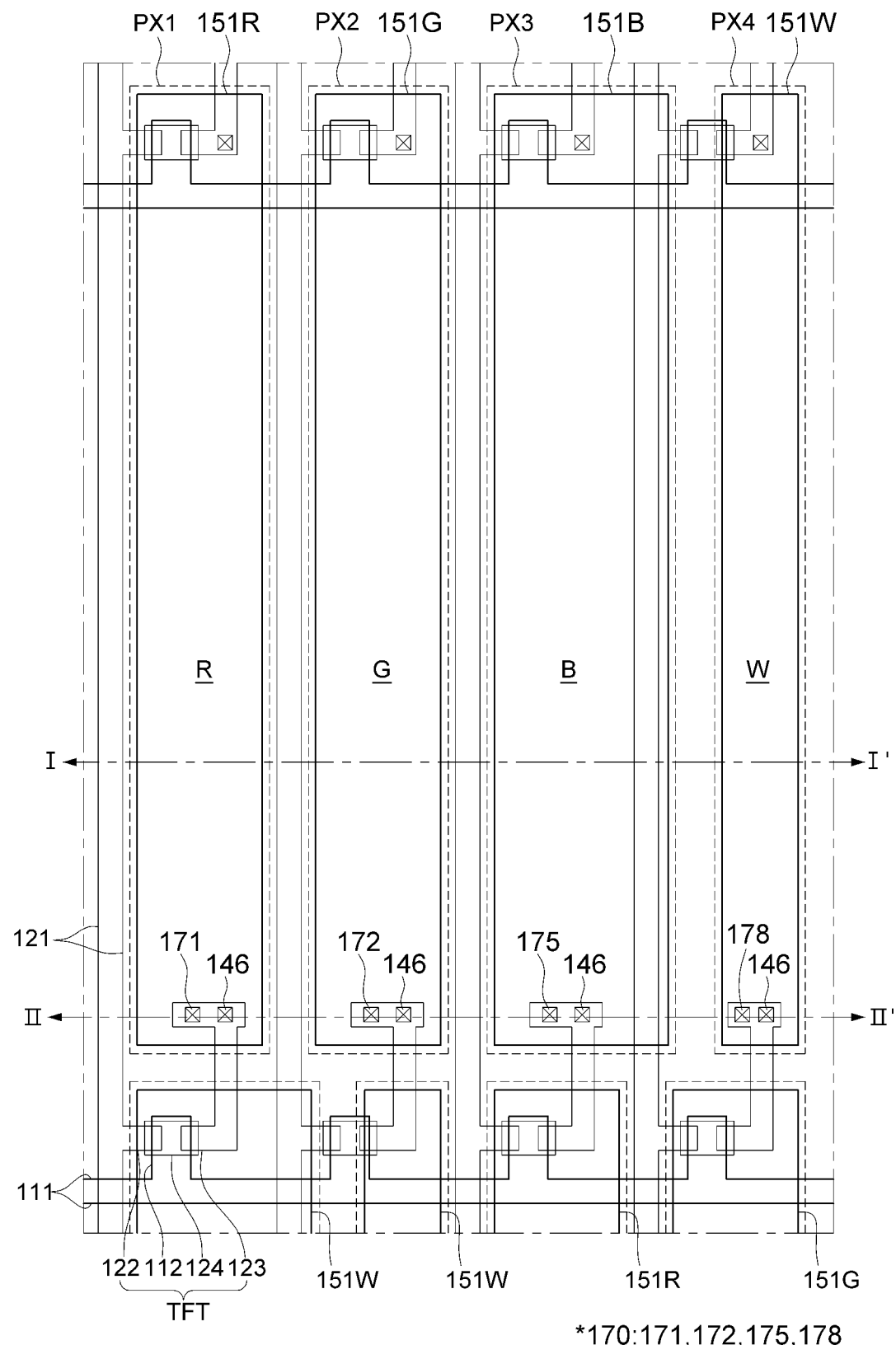
FIG. 28A is a plan view schematically illustrating a gate wiring, a data wiring, and a pixel electrode of a lower substrate (array substrate) of FIG. 27.
Figure 28B:
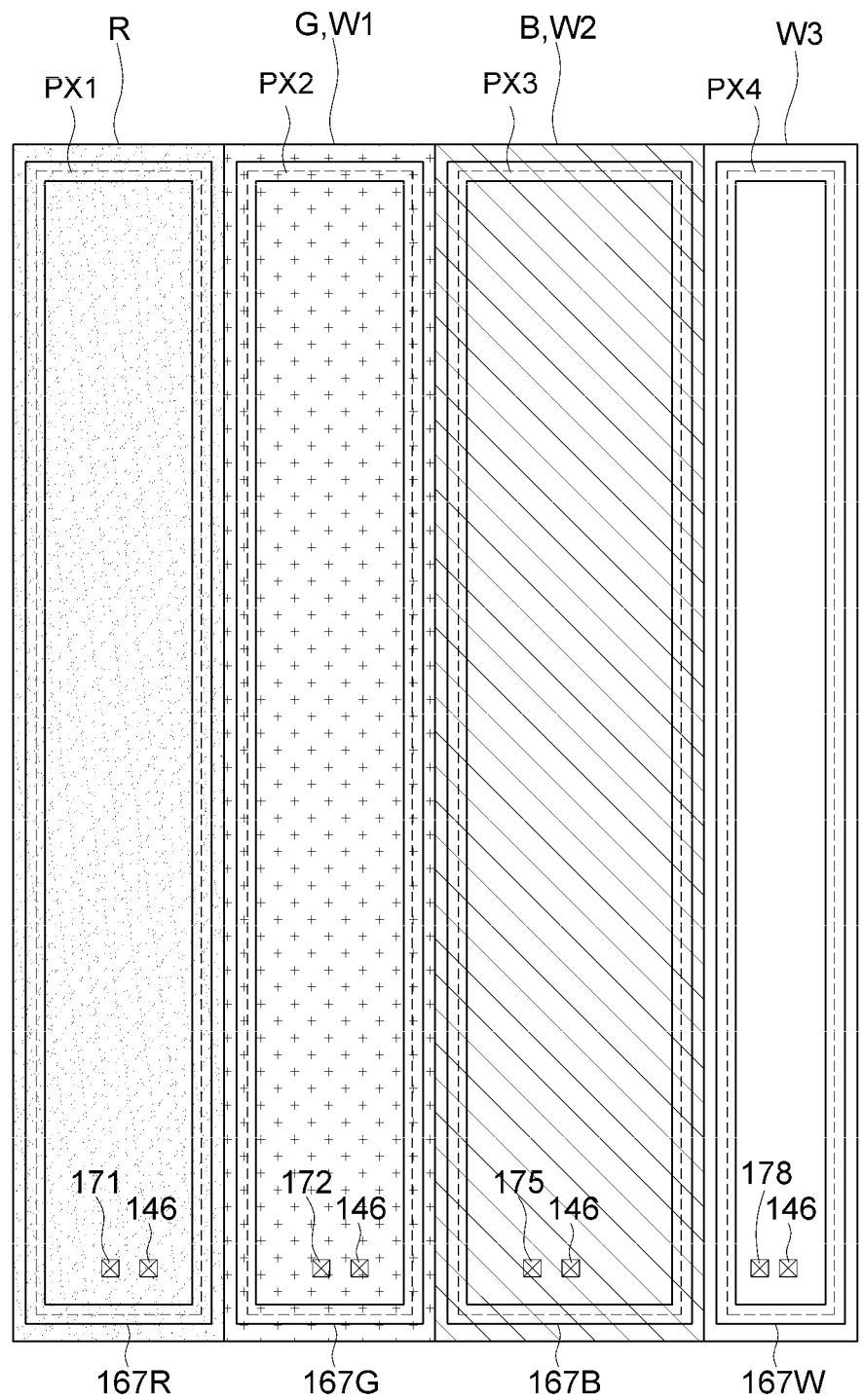
FIG. 28B is a plan view schematically illustrating a color filter, a pixel electrode, and a reflective layer of the lower substrate (array substrate) of FIG. 27.
Figure 29:
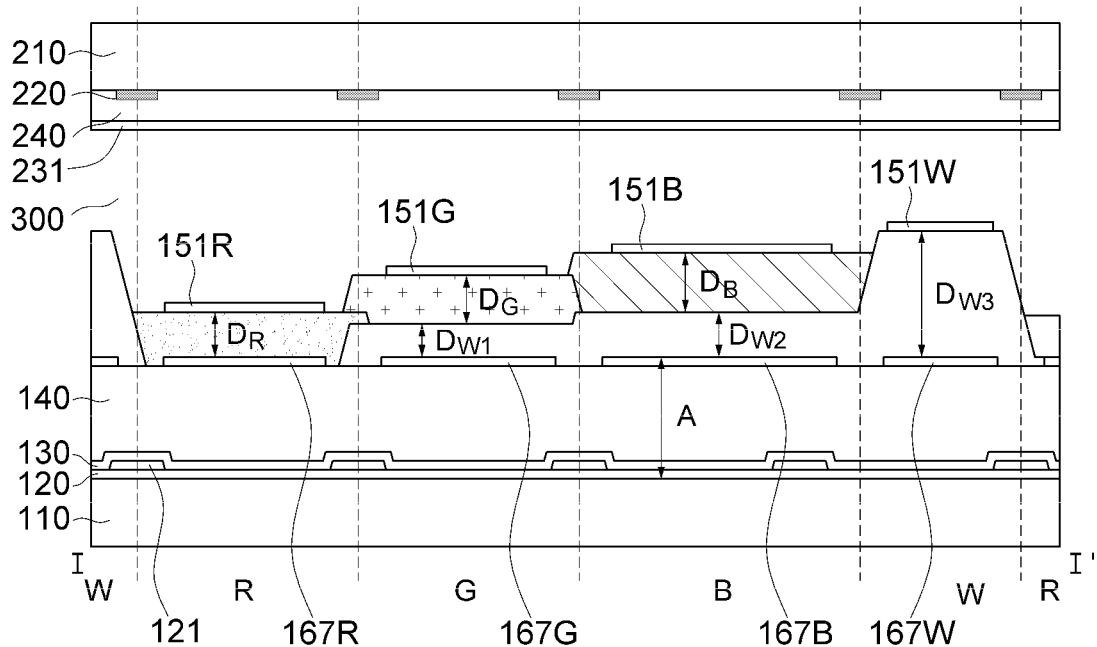
Figure 30:
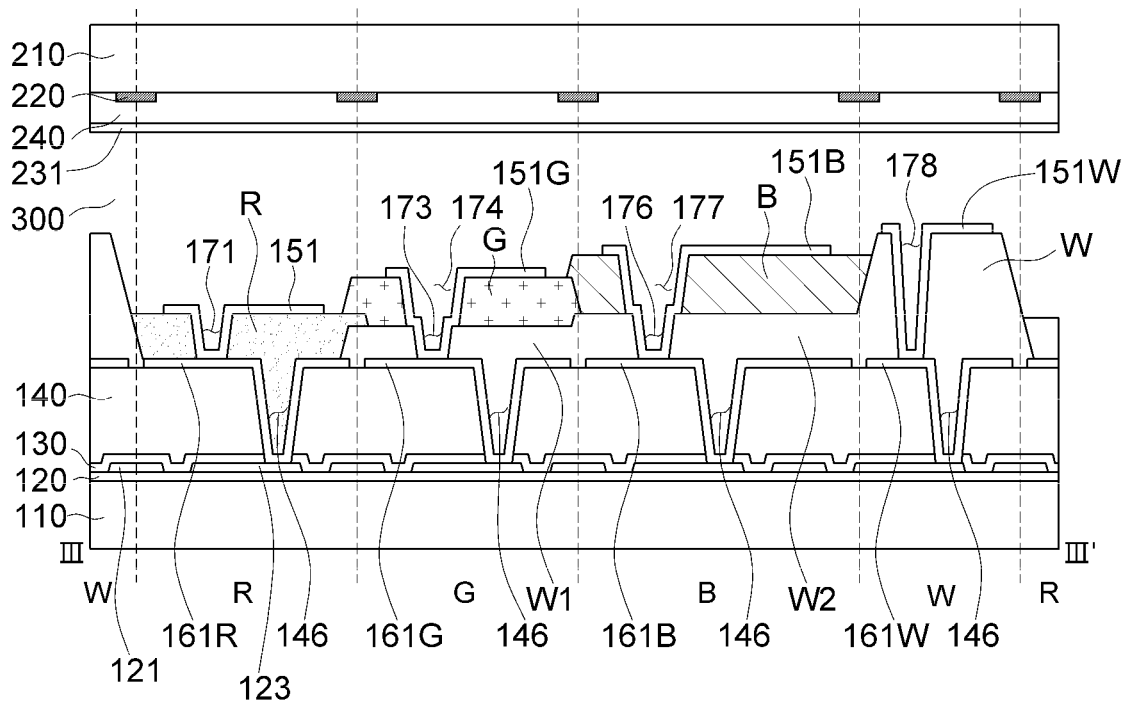
FIG. 30 is a cross-sectional view illustrating a display device taken along line II-IF in FIG. 23.

FIG. 27 is a plan view schematically illustrating a reflective LCD device according to an embodiment of the present inventive concept, FIG. 28A is a plan view schematically illustrating a gate wiring, a data wiring, and a pixel electrode of a lower substrate (array substrate) of FIG. 27, FIG. 28B is a plan view schematically illustrating a color filter, a pixel electrode, and a reflective layer of the lower substrate (array substrate) of FIG. 27, FIG. 29 is a cross-sectional view illustrating a display device taken along line I-I' in FIG. 23, and FIG. 30 is a cross-sectional view illustrating a display device taken along line II-IF in FIG. 23.

Description of the same configuration as that of an embodiment described above with reference to FIGS. 18 to 22 will be omitted. The present embodiment is different from an embodiment described with reference to FIGS. 18 to 22 in that the second reflective layer 162 is not provided and reflective layers 167R, 167G, 167B, and 167W that are greater than the first reflective layers 161R, 161G, 161B, and 161W are provided.

Referring to FIGS. 27 to 30, the reflective layers 167R, 167G, 167B, and 167W are separated from each other and each extend across the entire display areas PX1, PX2, PX3, and PX4. For example, boundaries of the reflective layers 167R, 167G, 167B, and 167W correspond to boundaries of the display areas PX1, PX2, PX3, and PX4, respectively, and are spaced apart from boundaries of other adjacent reflective layers 167R, 167G, 167B, and 167W.

Similar to the first reflective layers 161R, 161G, 161B, and 161W in FIGS. 18 to 22, the reflective layers 167R, 167G, 167B, and 167W connect the drain electrode 123 in each pixel to the pixel electrodes 151R, 151G, 151B, and 151W, respectively Part of the first reflective layers 167R, 167G, 167B, and 167W are also disposed in a contact hole 146. Part of the first reflective layers 167R, 167G, 167B, and 167W disposed in the contact hole 146 may contact the drain electrode 123 and be electrically connected thereto. The first reflective layers 167R, 167G, 167B, and 167W are connected to the pixel electrodes 151R, 151G, 151B, and 151W of the display areas through a contact hole 170 defined at color filters R, G, B, W1, W2, and W3, respectively.

The color filters R, G, B, W1, W2, and W3 are disposed on the reflective layers 167R, 167G, 167B, and 167W.

The respective thicknesses $D_R$, $D_G$, $D_B$, $D_{W1}$, $D_{W2}$ and $D_{W3}$ of the color filters R, G, B, W1, W2, and W3, the respective heights $D_R$, $D_G+D_{W1}$, $D_B+D_{W2}$, and $D_{W3}$ of the upper surfaces of the color filters R, G, B, and W3, and the respective cell gaps at the display areas PX1, PX2, PX3, and PX4 are substantially the same as those in an embodiment described with reference to FIGS. 18 to 22.

A common electrode 231 may be disposed on a second substrate 210 or on an overcoat layer 240. When a data voltage is applied to the pixel electrode 151, an electric field is formed by the pixel electrode 151 together with the common electrode 231 to control the alignment direction of liquid crystal molecules included in a liquid crystal layer 300 (VA mode).

Figure 31:
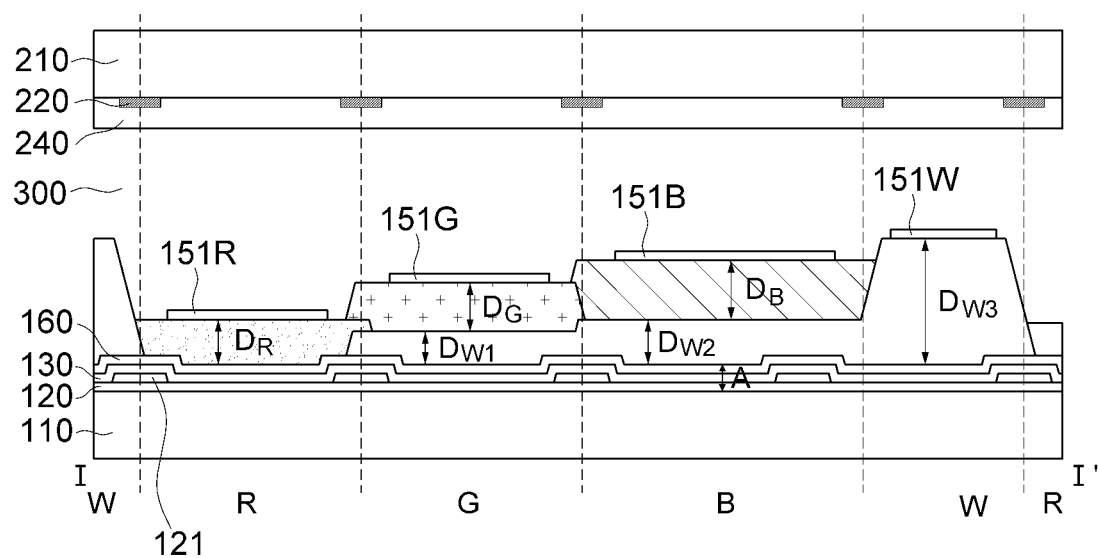
FIG. 31 is a plan view schematically illustrating a reflective LCD device according to an embodiment of the present inventive concept.

FIG. 31 is a plan view schematically illustrating a reflective LCD device according to an embodiment of the present inventive concept. FIG. 31 may correspond to a cross-sectional view taken along line I-I' in FIGS. 18, 23, and 27.

According to an embodiment of the present inventive concept, a reflective layer 160 may be disposed immediately on a passivation layer 130. That is, dissimilar to an embodiment described with reference to FIGS. 18 to 30, a planarization layer 140 is omitted. Respective upper surfaces of color filters R, G, B, and W3 in display areas PX1, PX2, PX3, and PX4 may be substantially planar. That is, the color filters R, G, B, W1, W2, and W3 may serve as the planarization layer 140.

A shape and a connection structure of a reflection layer are substantially the same as those in an embodiment described with reference to FIGS. 18 to 22, in an embodiment described with reference to FIGS. 23 to 26, or in an embodiment described with reference to FIGS. 27 to 30.

A common voltage may be applied to the reflective layer 160. In such an embodiment, a common electrode (see 231 in FIG. 29) disposed on a second substrate 210 may be omitted. As described above, when the data voltage is applied to slit-shaped pixel electrodes 151R, 151G, 151B, and 151W, an electric field is formed by the pixel electrodes 151R, 151G, 151B, and 151W together with the reflective layer 160 to control the alignment direction of liquid crystal molecules included in a liquid crystal layer 300 (PLS mode). Alternatively, the reflective layer 160 may be floated. In such an embodiment, the common electrode (see 231 in FIG. 29) may be provided on the second substrate 210 (VA mode). When the data voltage is applied to the pixel electrodes 151R, 151G, 151B, and 151W, an electric field is formed by the pixel electrodes 151R, 151G, 151B, and 151W together with the common electrode (see 231 in FIG. 29) to control the alignment direction of the liquid crystal molecules included in the liquid crystal layer 300 (VA mode).

The respective thicknesses $D_R$, $D_G$, $D_B$, $D_{W1}$, $D_{W2}$ and $D_{W3}$ of the color filters R, G, B, W1, W2, and W3, the respective heights $D_R$, $D_G+D_{W1}$, $D_B+D_{W2}$, and $D_{W3}$ of the upper surfaces of the color filters R, G, B, and W3, and the respective cell gaps at the display areas PX1, PX2, PX3, and PX4 are substantially the same as those in an embodiment described with reference to FIGS. 18 to 22.

As set forth hereinabove, the display device according to one or more embodiments may provide the following effects.

According to one or more embodiments of the present inventive concept, the cell gap of each pixel may be adjusted without increasing the thickness of each color filter. Accordingly, luminance degradation may be reduced in each color pixel.

In addition, according to one or more embodiments of the present inventive concept, by forming the white color filter before forming the chromatic color filter, the cell gap of the white color pixel may be adjusted more uniformly and accurately.

While the present inventive concept has been illustrated and described with reference to the embodiments thereof, it will be apparent to those of ordinary skill in the art that various changes in form and detail may be formed thereto without departing from the spirit and scope of the present inventive concept.

What is claimed is:

1. A display device comprising:
a substrate at which red, green, blue, and white display areas are defined;
first, second, and third organic layers having transmittance for white light and disposed on the substrate at the green, blue, and white display areas, respectively;
a red color filter on the substrate at the red display area;
a green color filter on the first organic layer at the green display area; and
a blue color filter on the second organic layer at the blue display area,
wherein a thickness of the third organic layer in the white display area is greater than a sum of thicknesses of the second organic layer and the blue color filter in the blue display area.

2. The display device of claim 1, wherein an upper surface of the third organic layer is higher than upper surfaces of the red, green, and blue color filters.

3. The display device of claim 2, wherein a height difference between the upper surface of the third organic layer and the upper surface of the red color filter is in a range from about 0.64 μm to about 0.96 μm.

4. The display device of claim 1, wherein upper surfaces of the green and blue color filters are higher than an upper surface of the red color filter.

5. The display device of claim 4, wherein a height difference between the upper surface of the green color filter and the upper surface of the red color filter is in a range from about 0.4 μm to about 0.6 μm.

6. The display device of claim 4, wherein the upper surface of the green color filter and the upper surface of the blue color filter have a substantially equal height.

7. The display device of claim 4, wherein the upper surface of the blue color filter is higher than the upper surface of the green color filter.

8. The display device of claim 7, wherein the first and second organic layers have a substantially equal thickness, and the blue color filter is thicker than the green color filter.

9. The display device of claim 7, wherein the second organic layer is thicker than the first organic layer, and the blue color filter and the green color filter have a substantially equal thickness.

10. The display device of claim 1, wherein a lower surface of the red color filter and lower surfaces of the first, second, and third organic layers have a substantially equal height.

11. The display device of claim 1, wherein the red, green, and blue color filters have a substantially equal thickness.

12. The display device of claim 1, wherein the red, green, and blue color filters and the third organic layer are disposed in a first direction in a plan view, and
any one of the red, green, and blue color filters and the third organic layer contacts two of the others of the red, green, and blue color filters and the third organic layer.

13. The display device of claim 1, wherein the first, second, and third organic layers are formed in one piece.

14. The display device of claim 1, wherein each of the second and third organic layers includes a plurality of organic layers.

15. The display device of claim 1, further comprising a fourth organic layer between the substrate and the red color filter and between the substrate and the first, second, and third organic layers.

16. The display device of claim 1, further comprising a reflective layer between the substrate and the red color filter and between the substrate and the first, second, and third organic layers.

17. The display device of claim 1, further comprising an opposing substrate that opposes the substrate; and
a liquid crystal layer between the substrate and the opposing substrate,
wherein a sum of thicknesses of the liquid crystal layer and the red color filter at the red display area,
a sum of thicknesses of the liquid crystal layer, the green color filter, and the first organic layer at the green display area,
a sum of thicknesses of the liquid crystal layer, the blue color filter, and the second organic layer at the blue display area, and a sum of thicknesses of the liquid crystal layer and the third organic layer at the white display area are substantially equal to each other.

18. A reflective liquid crystal display device comprising:
a first substrate and a second substrate at which red, green, blue, and white display areas are defined and which oppose each other; and
a liquid crystal layer between the first substrate and the second substrate,
wherein the first substrate comprises:
a reflective layer on the first substrate;
first, second, and third organic layers having transmittance for white light and disposed on the reflective layer at the green, blue, and white display areas, respectively;
a red color filter on the reflective layer at the red display area;
a green color filter on the first organic layer at the green display area; and
a blue color filter on the second organic layer at the blue display area, and
wherein a thickness of the third organic layer in the white display area is greater than a sum of thicknesses of the second organic layer and the blue color filter in the blue display area.

19. The reflective liquid crystal display device of claim 18, further comprising a planarization layer on the first substrate,
wherein the reflective layer is disposed on the planarization layer.

20. The reflective liquid crystal display device of claim 18, further comprising a pixel electrode disposed on each of the red, green, and blue color filters and the third organic layer.

21. The reflective liquid crystal display device of claim 18, wherein a common voltage is applied to at least a portion of the reflective layer.

22. The reflective liquid crystal display device of claim 18, wherein at least a portion of the reflective layer is connected to the pixel electrode.

23. The reflective liquid crystal display device of claim 18, wherein an upper surface of the third organic layer is higher than upper surfaces of the red, green, and blue color filters.

24. The reflective liquid crystal display device of claim 18, wherein an upper surface of the green color filter and an upper surface of the blue color filter have a substantially equal height.

25. The reflective liquid crystal display device of claim 18, wherein an upper surface of the blue color filter is higher than an upper surface of the green color filter.

26. The reflective liquid crystal display device of claim 25, wherein the first and second organic layers have a substantially equal thickness, and
the blue color filter is thicker than the green color filter.

27. The reflective liquid crystal display device of claim 25, wherein the second organic layer is thicker than the first organic layer, and
the blue color filter and the green color filter have a substantially equal thickness.

28. The reflective liquid crystal display device of claim 18, wherein the red, green, and blue color filters have a substantially equal thickness.

29. The reflective liquid crystal display device of claim 18, wherein a sum of thicknesses of the liquid crystal layer and the red color filter at the red display area, a sum of thicknesses of the liquid crystal layer, the green color filter, and the first organic layer at the green display area,
a sum of thicknesses of the liquid crystal layer, the blue color filter, and the second organic layer at the blue display area, and
a sum of thicknesses of the liquid crystal layer and the third organic layer at the white display area are substantially equal to each other.

30. The reflective liquid crystal display device of claim 18, wherein the red, green, and blue color filters and the third organic layer are disposed in a first direction in a plan view, and
any one of the red, green, and blue color filters and the third organic layer contacts two of the others of the red, green, and blue color filters and the third organic layer.

31. A method of manufacturing a display device, the method comprising:
preparing a substrate at which red, green, blue, and white display areas are defined;
forming first, second, and third organic layers on the substrate at the green, blue, and white display areas, respectively;
forming a red color filter on the substrate at the red display area;
forming a green color filter on the first organic layer at the green display area; and
forming a blue color filter on the second organic layer at the blue display area,
wherein a thickness of the third organic layer in the white display area is greater than a sum of thicknesses of the second organic layer and the blue color filter in the blue display area.

32. The method of claim 31, wherein the first, second, and third organic layers are formed substantially simultaneously using a same mask having a transmissive area corresponding to the white display area and a semi-transmissive area corresponding to the green and blue display areas.

33. The method of claim 31, wherein a transmittance of the semi-transmissive area corresponding to the green display area is less than a transmittance of the semi-transmissive area corresponding to the blue display area.

34. The method of claim 31, wherein forming of the first, second, and third organic layers comprises:
forming a first organic layer on the substrate at the green, blue, and white display areas;
forming a second organic layer on the first organic layer at the blue and white display areas; and
forming a third organic layer on the second organic layer at the white display area.

35. The method of claim 31, wherein forming of the first, second, and third organic layers comprises:
forming a first organic layer on the substrate at the green, blue, and white display areas; and
forming a second organic layer on the first organic layer at the white display area.

36. A display device comprising:
a substrate at which first, second, third, and fourth display areas are defined;
first, second, and third organic layers on the substrate at the second, third, and fourth display areas, respectively;
a first color filter on the substrate at the first display area;
a second color filter on the first organic layer at the second display area; and
a third color filter on the second organic layer at the third display area, wherein the first, second, and third color filters have different chromatic colors, and wherein a thickness of the third organic layer in the fourth display area is greater than a sum of thicknesses of the second organic layer and the third color filter in the third display area.

* * * * *